US008248666B2

(12) United States Patent
Kenji

(10) Patent No.: US 8,248,666 B2
(45) Date of Patent: Aug. 21, 2012

(54) INFORMATION INPUT/OUTPUT DEVICE INCLUDING A STAGE SURFACE ON WHICH A REFLECTING MEDIUM INCLUDING A PRINTED DOT PATTERN IS DISPOSED

(76) Inventor: Yoshida Kenji, Tokyo (JP)

(*) Notice: Subject to any disclaimer, the term of this patent is extended or adjusted under 35 U.S.C. 154(b) by 805 days.

(21) Appl. No.: 11/997,529

(22) PCT Filed: Aug. 2, 2006

(86) PCT No.: PCT/SG2006/000219
§ 371 (c)(1),
(2), (4) Date: Jan. 31, 2008

(87) PCT Pub. No.: WO2007/021249
PCT Pub. Date: Feb. 22, 2007

(65) Prior Publication Data
US 2008/0192300 A1 Aug. 14, 2008

(30) Foreign Application Priority Data

Aug. 3, 2005 (JP) .................................. 2005-225616
Mar. 30, 2006 (JP) .................................. 2006-121239

(51) Int. Cl.
H04N 1/40 (2006.01)
(52) U.S. Cl. ........................................ 358/3.29; 273/237
(58) Field of Classification Search .................. None
See application file for complete search history.

(56) References Cited

U.S. PATENT DOCUMENTS

| 7,431,297 | B2 * | 10/2008 | Kaji et al. ..................... 273/237 |
| 2001/0015524 | A1 * | 8/2001 | Shinbo et al. ............ 273/126 A |
| 2003/0062675 | A1 * | 4/2003 | Noro et al. ..................... 273/237 |
| 2005/0093829 | A1 * | 5/2005 | Shaked et al. ................. 345/173 |
| 2005/0245302 | A1 * | 11/2005 | Bathiche et al. .................. 463/1 |
| 2008/0231611 | A1 * | 9/2008 | Bathiche et al. ............. 345/175 |

FOREIGN PATENT DOCUMENTS

WO WO2007/021249 2/2007

OTHER PUBLICATIONS

International Search Report, WO2007/021249 A3, Feb. 22, 2007, Yoshida.

* cited by examiner

*Primary Examiner* — Twyler Haskins
*Assistant Examiner* — Christopher D Wait
(74) *Attorney, Agent, or Firm* — Duane Morris LLP

(57) ABSTRACT

To achieve an information output device in which information of a medium disposed on a stage surface can be surely and efficiently read out, and a stage effect and a security are high. In the information output device, media are disposed on a stage surface in a state where the media are opposite to the stage surface, the media where dot patterns are printed on medium surfaces on the basis of a predetermined rule, the dot patterns are read by imaging units disposed in a space below the stage and converted into code values or coordinate values indicating the dot patterns from photographed images obtained by the imaging units, and information corresponding to the code values or the coordinate values is outputted. Further, light transmitting reading holes are respectively provided at a plurality of medium disposing locations on the stage surface, and the imaging units are disposed in the space below the stage corresponding the respective reading holes such that the imaging units photograph the medium surfaces of the media disposed on the reading holes.

28 Claims, 83 Drawing Sheets

FIG. 6A

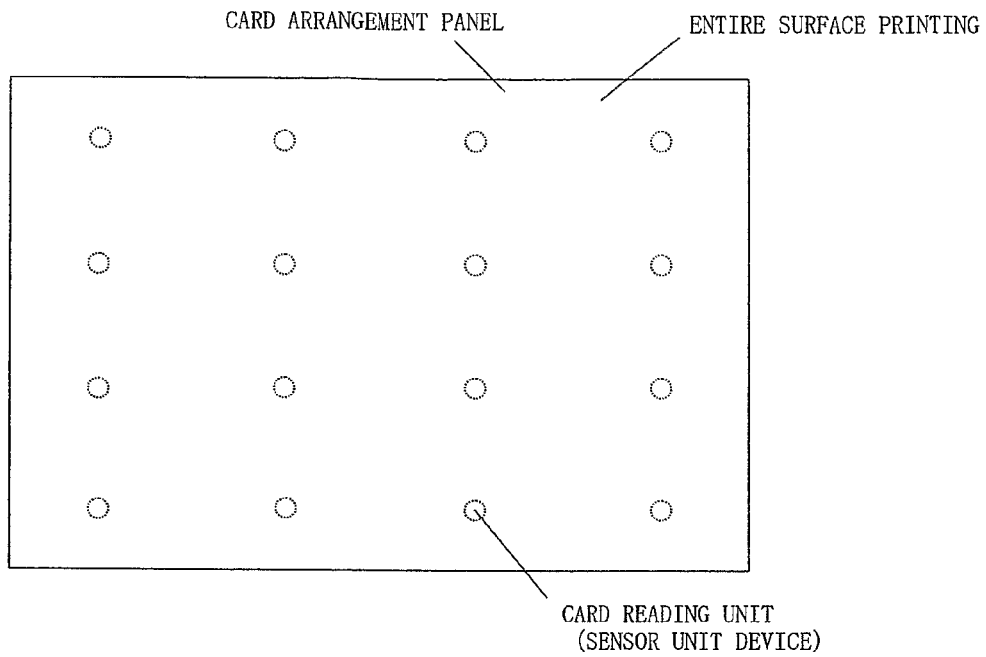

CARD ARRANGEMENT PANEL
ENTIRE SURFACE PRINTING
CARD READING UNIT (SENSOR UNIT DEVICE)

FIG. 6B

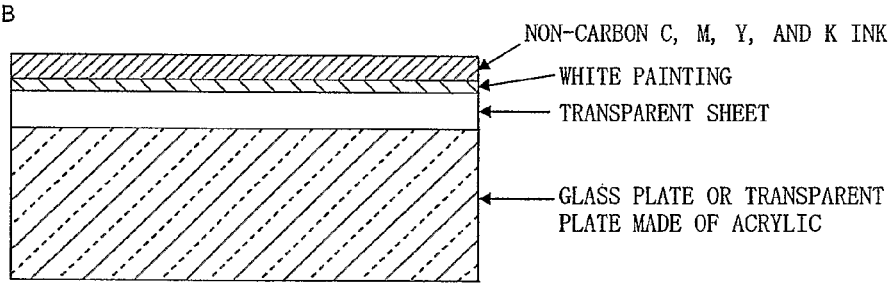

NON-CARBON C, M, Y, AND K INK
WHITE PAINTING
TRANSPARENT SHEET
GLASS PLATE OR TRANSPARENT PLATE MADE OF ACRYLIC

FIG. 6C

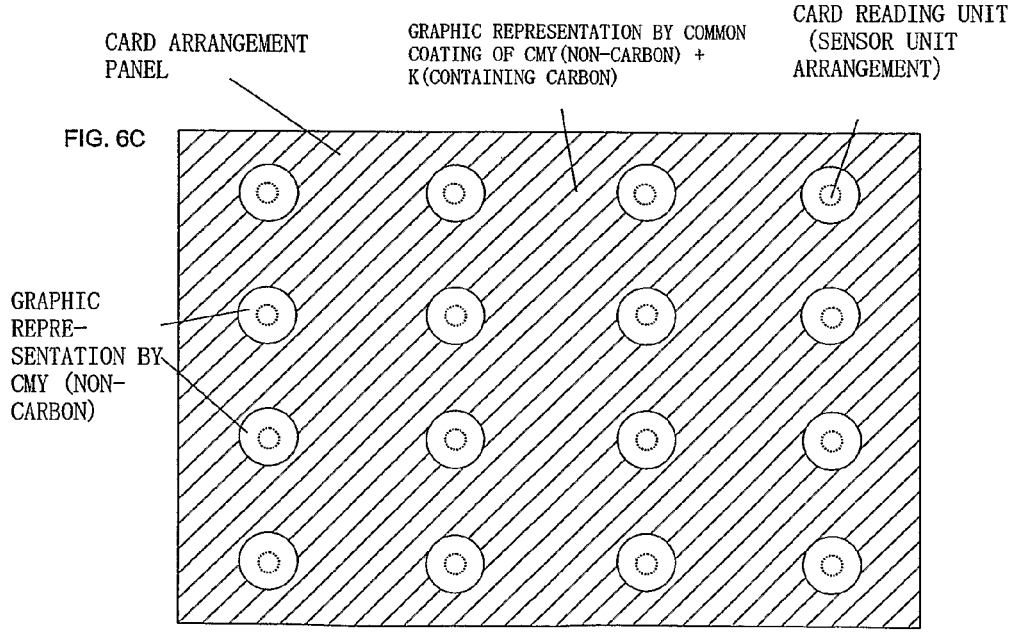

CARD ARRANGEMENT PANEL
GRAPHIC REPRESENTATION BY COMMON COATING OF CMY(NON-CARBON) + K(CONTAINING CARBON)
CARD READING UNIT (SENSOR UNIT ARRANGEMENT)
GRAPHIC REPRESENTATION BY CMY (NON-CARBON)

FIG. 7A
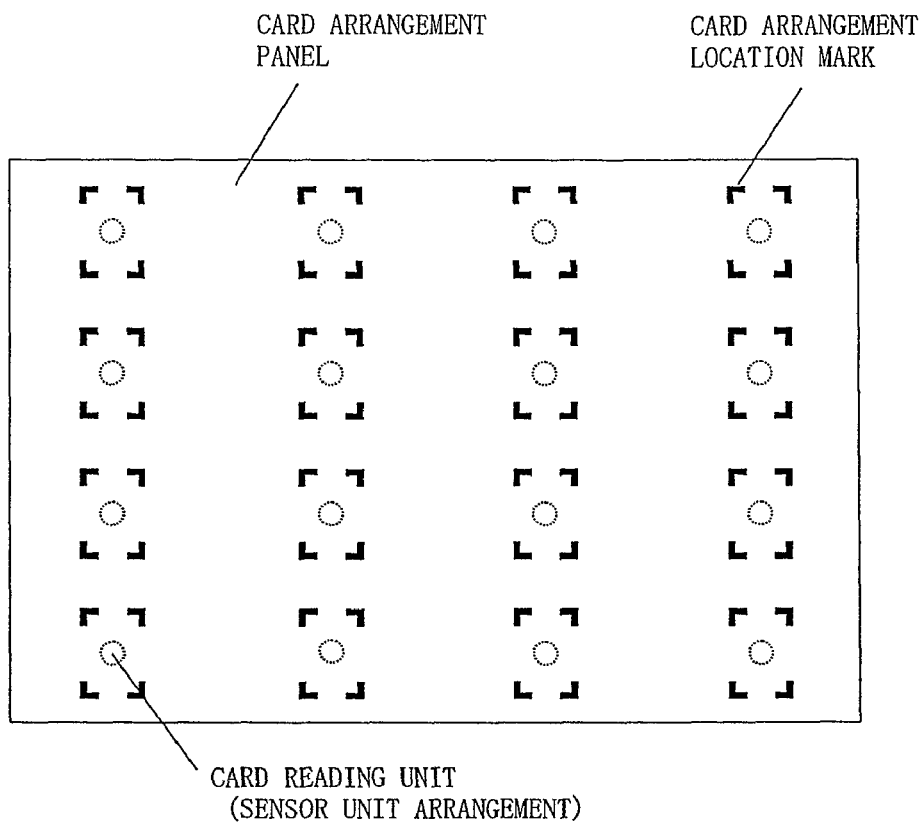
FIG. 7B
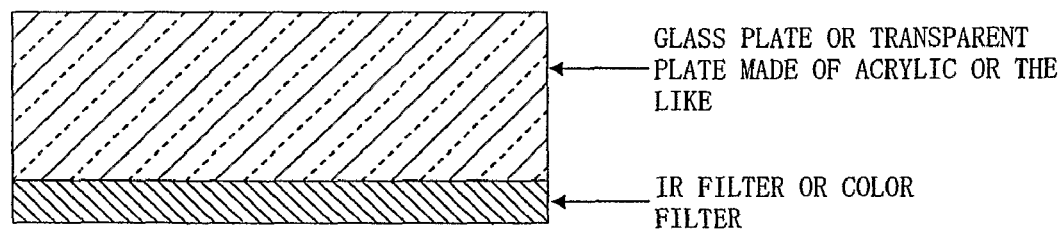
(c)
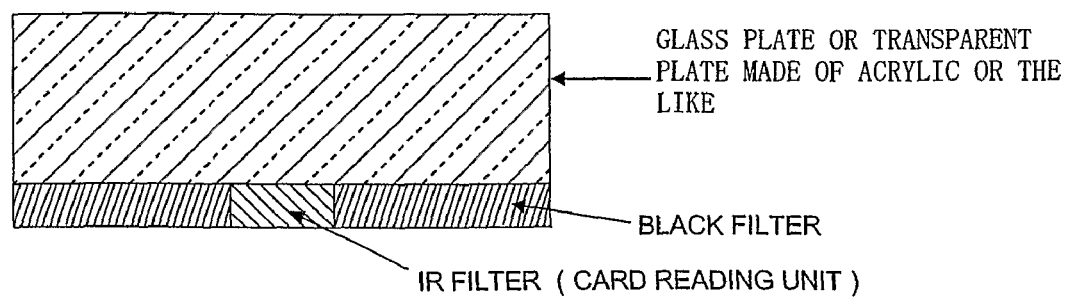

ENTIRE SURFACE GLASS OR TRANSPARENT PLATE MADE OF ACRYLIC OR THE LIKE + IR FILTER OR CARBON FILTER

CARD ARRANGEMENT PANEL

GLASS PLATE OR TRANSPARENT PLATE MADE OF ACRYLIC OR THE LIKE

IR FILTER OR COLOR FILTER

FIG.20A            FIG.20B            FIG.20C
00100001           01100110           11010101
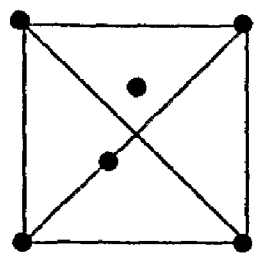 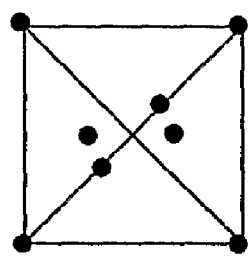 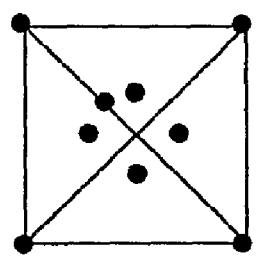
FIG. 21A
| $I_3$ | $I_4$ | $I_5$ |
|---|---|---|
| $I_2$ | $I_1$ | $I_6$ |
2×3
FIG. 21B
| $I_3$ | $I_4$ | $I_5$ |
|---|---|---|
| $I_2$ | $I_1$ | $I_6$ |
| $I_9$ | $I_8$ | $I_7$ |
3×3
FIG. 21C
| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |
3×4
FIG. 21D
| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |
6×6

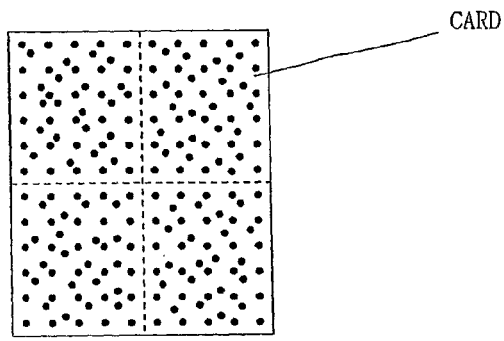
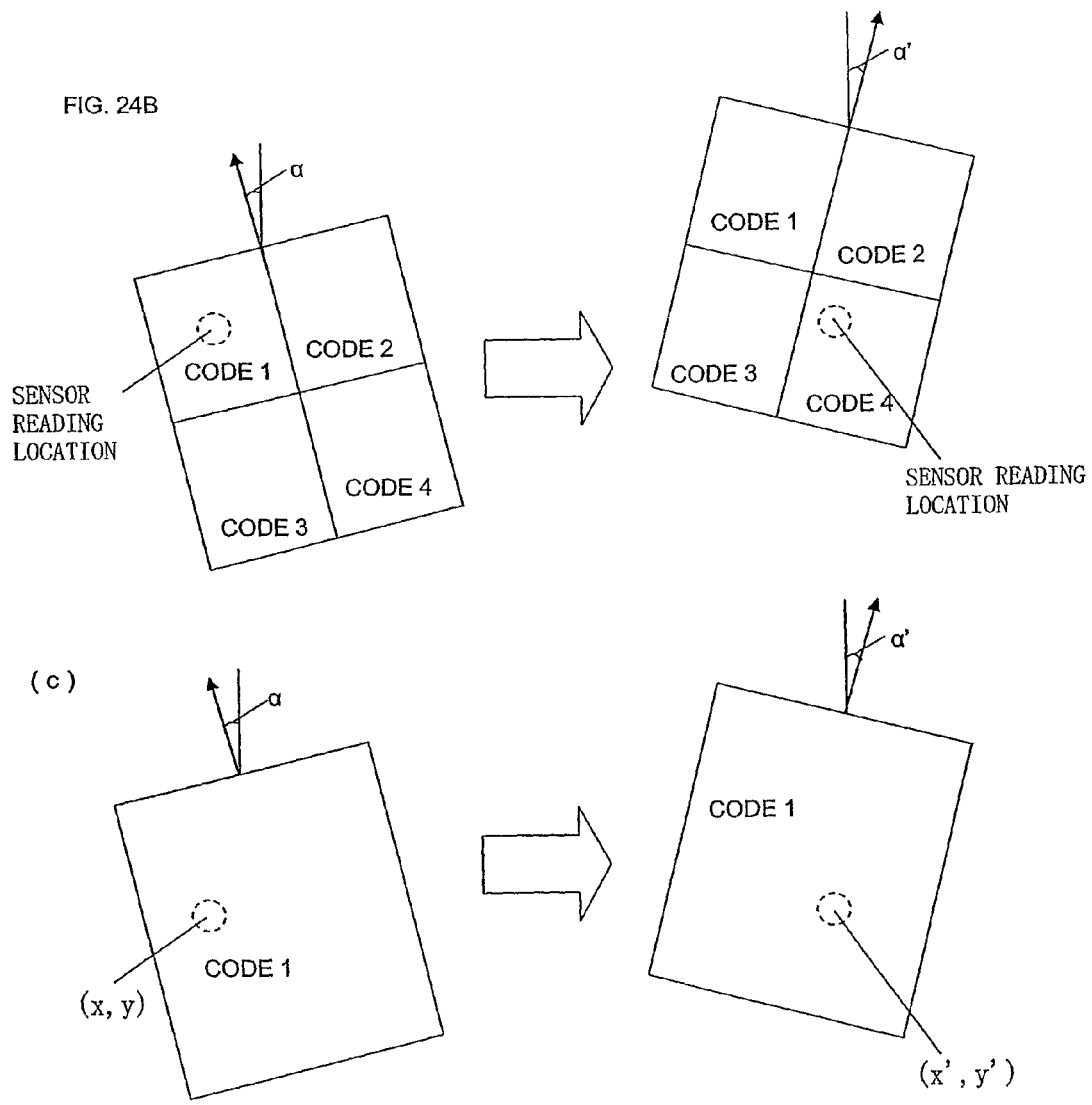

FIG. 25A
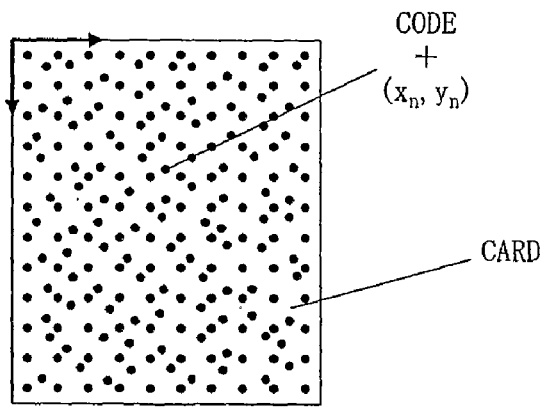
CODE + $(x_n, y_n)$
CARD
FIG. 25B
| $C_{31}$ | $C_{30}$ | $C_{29}$ | $C_{28}$ | $C_{27}$ | $C_{26}$ | $C_{25}$ | $C_{24}$ | $C_{23}$ | $C_{22}$ | $C_{21}$ | $C_{20}$ | $C_{19}$ | $C_{18}$ | $C_{17}$ | $C_{16}$ |
|---|---|---|---|---|---|---|---|---|---|---|---|---|---|---|---|
| 0 | 0 | 0 | 0 | 0 | 0 | 0 | 0 | 0 | 0 | 0 | 1 | 1 | 0 | 0 | 1 |
| PARITY | CODE |
|---|---|
| 0 ( DECIMAL ) | 25 ( DECIMAL ) |
| $C_{15}$ | $C_{14}$ | $C_{13}$ | $C_{12}$ | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|---|---|---|
| 0 | 0 | 0 | 0 | 1 | 1 | 0 | 0 | 0 | 0 | 1 | 0 | 0 | 1 | 1 | 0 |
| x COORDINATE | y COORDINATE |
|---|---|
| 12 ( DECIMAL ) | 38 ( DECIMAL ) |
(c)
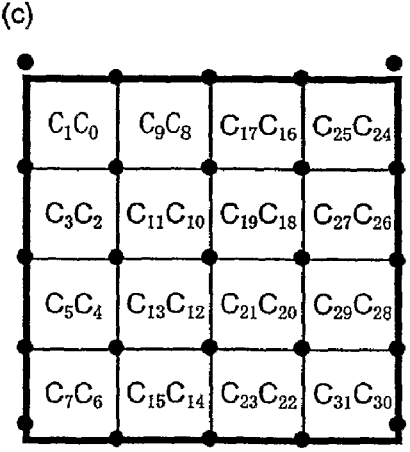
(d)
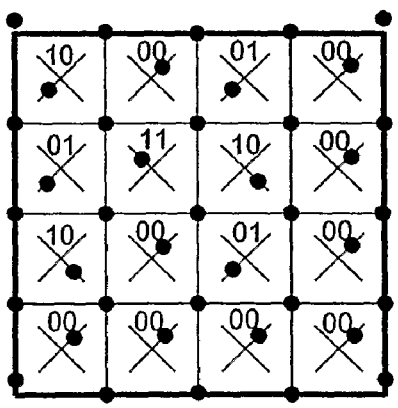

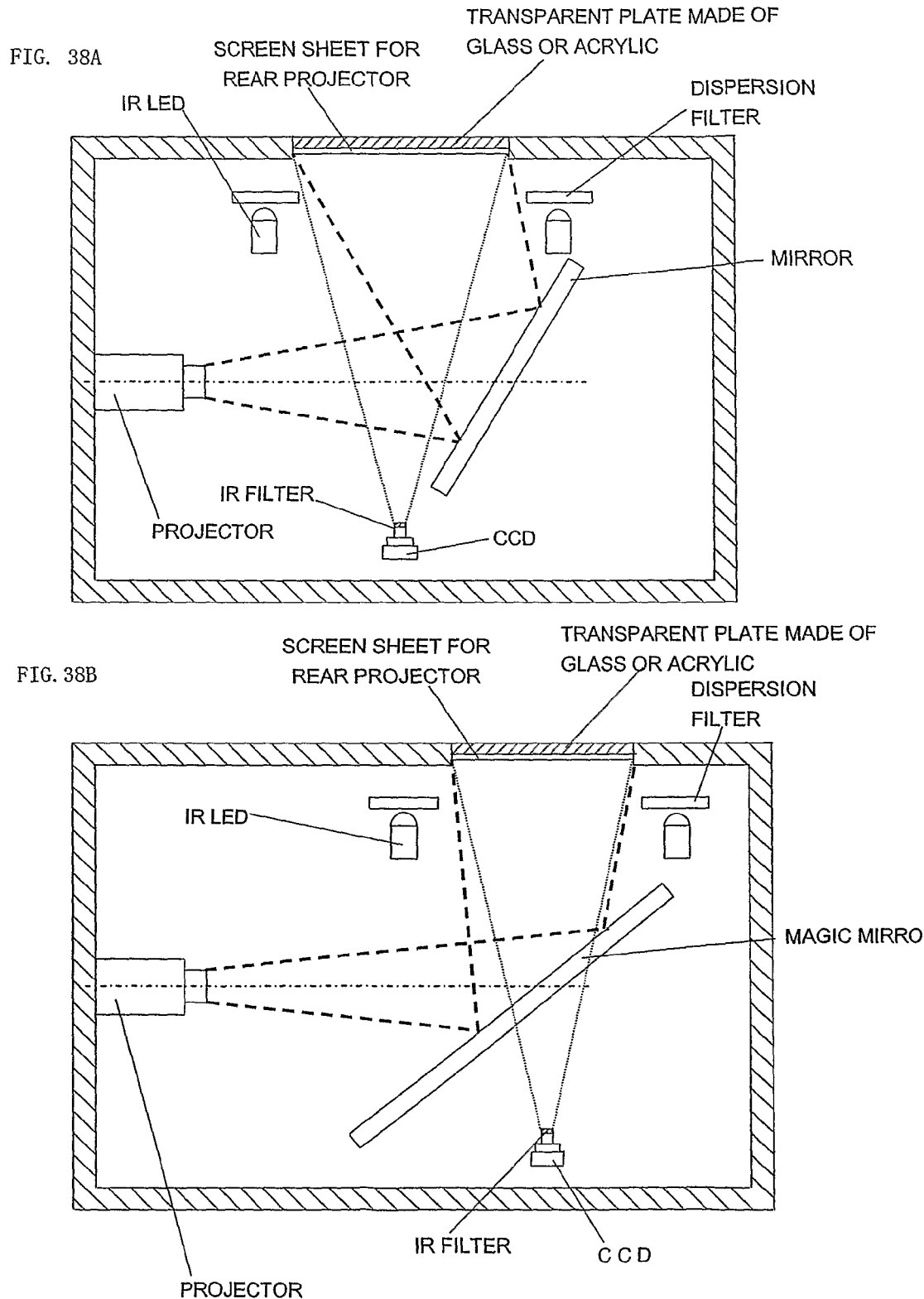

CARD

TRANSPARENT CARD CASE

AT THE TIME OF INFRARED RAY LIGHT SOURCE BEING TURNED ON a: CONTENT OF INFRARED RAY ABSORBING MATERIAL IS LARGE
b: CONTENT OF INFRARED RAY ABSORBING MATERIAL IS MODERATE

AT THE TIME OF LED-A
BEING TURNED ON

AT THE TIME OF LED-B
BEING TURNED ON

AT THE TIME OF LED-C
BEING TURNED ON

AT THE TIME OF LED-A
BEING TURNED ON

AT THE TIME OF LED-B
BEING TURNED ON

AT THE TIME OF LED-C
BEING TURNED ON

AT THE TIME OF INFRARED RAY LIGHT SOURCE BEING TURNED ON

AT THE TIME OF LED-A BEING TURNED ON

AT THE TIME OF INFRARED RAY LIGHT SOURCE BEING TURNED ON

AT THE TIME OF LED-A BEING TURNED ON

AT THE TIME OF WAVELENGTH $A_1$ BEING TURNED ON

AT THE TIME OF WAVELENGTH $A_2$ BEING TURNED ON

AT THE TIME OF WAVELENGTH $A_3$ BEING TURNED ON

AT THE TIME OF WAVELENGTH $A_4$ BEING TURNED ON (a) AT THE TIME OF WAVELENGTH $A_1$ BEING TURNED ON (b) AT THE TIME OF WAVELENGTH $A_2$ BEING TURNED ON

AT THE TIME OF WAVELENGTH $A_3$ BEING TURNED ON

AT THE TIME OF WAVELENGTH $A_4$ BEING TURNED ON

AT THE TIME OF LED-A AND LED-B
BEING TURNED ON

INFRARED RAY FILTER
DOES NOT EXIST

AT THE TIME OF LED-A AND LED-B
BEING TURNED ON

INFRARED RAY FILTER
EXISTS

AT THE TIME OF LED-A AND LED-B
BEING TURNED ON

INFRARED RAY FILTER
DOES NOT EXIST

AT THE TIME OF LED-A AND LED-B
BEING TURNED ON

INFRARED RAY FILTER
EXISTS

FIG. 74A PICTURE CARD
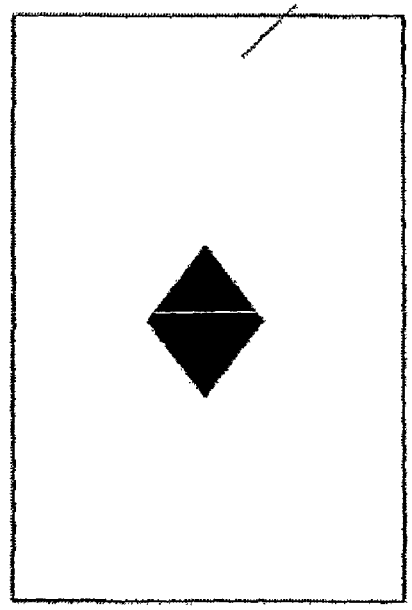
FIG. 74B CHARACTER
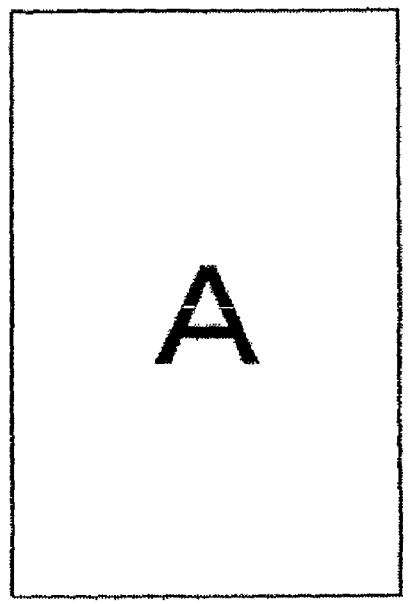
FIG. 74C TWO-DIMENSIONAL CODE
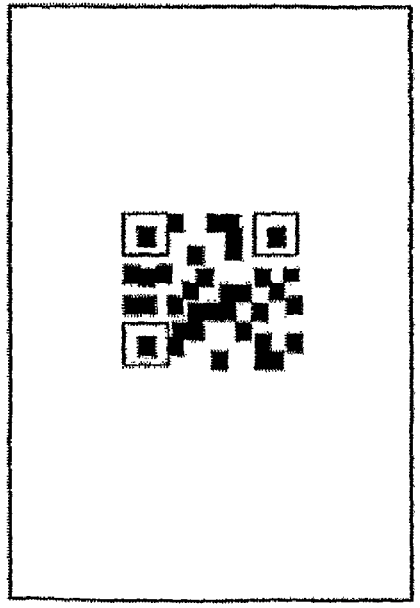
FIG. 74D DOT PATTERN
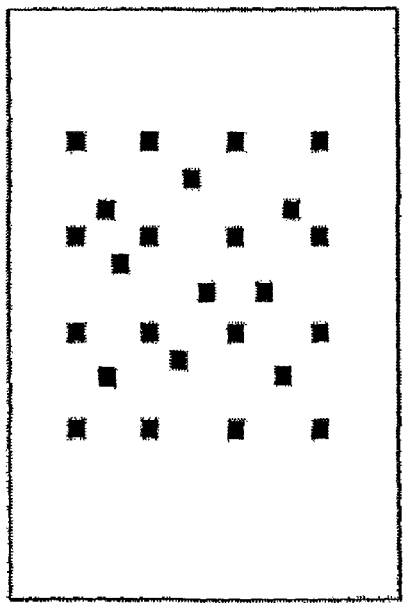

MEDIUM LOADING REGION
(INFRARED IMAGE PHOTOGRAPHIC REGION)

PROJECTION REGION
(PRINTING IS NOT PERFORMED)
SEMI-PROJECTION REGION
(INFRARED RAY TRANSMITTING PRINTING)
PROJECTION REGION
(PRINTING IS NOT PERFORMED)

NON-PROJECTION REGION
(NON-PROJECTION/INFRARED RAY TRANSMITTING
PRINTING+ INFRARED RAY TRANSMITTING GRAPHIC
PRINTING)

DIRECT PRINTING ON PROJECTION PANEL

PRINTING SHEET BONDING

FIG. 83A
ENTIRE PROJECTION REGION

PROJECTION REGION DESIGNATING FRAME (PRINTING)  PROJECTION PANEL

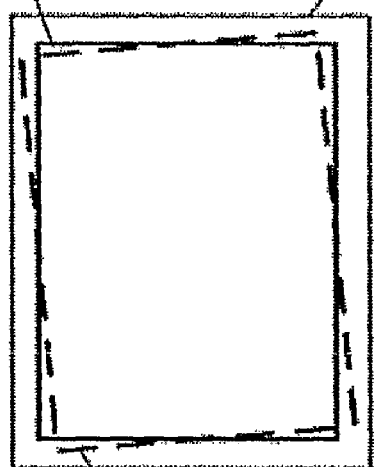

PROJECTION REGION FRAME (PROJECTION IMAGE)

FIG. 83B
ENTIRE PROJECTION REGION

PROJECTION REGION DESIGNATING MARK (PRINTING)

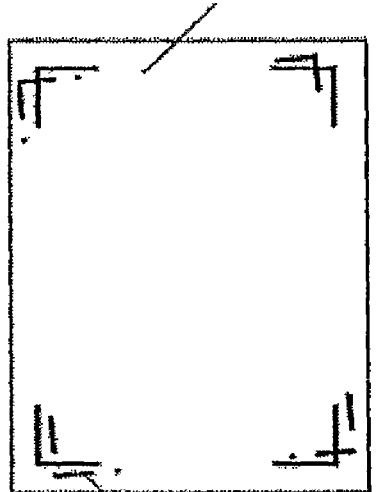

PROJECTION REGION MARK (PROJECTION IMAGE)

FIG. 83C
PARTIAL PROJECTION REGION

PROJECTION REGION DESIGNATING FRAME (PRINTING)

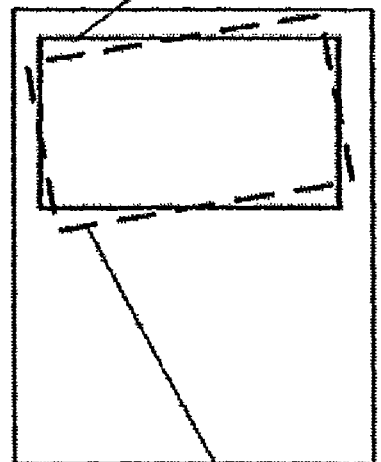

PROJECTION REGION FRAME (PROJECTION IMAGE)

FIG. 83D
PARTIAL PROJECTION REGION

PROJECTION REGION DESIGNATING FRAME (PRINTING)

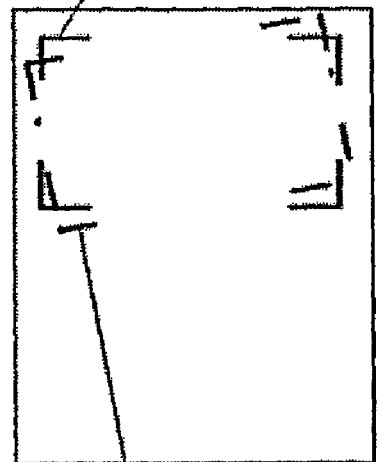

PROJECTION REGION MARK (PROJECTION IMAGE)

FIG. 93A
CARD
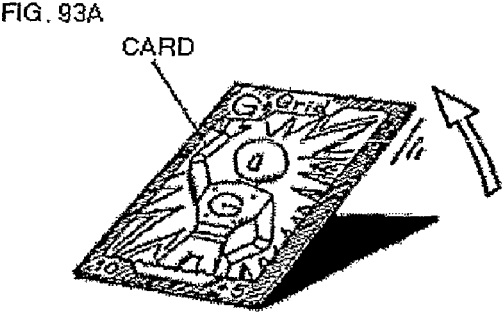
FIG. 93B
HANDLE
CARD
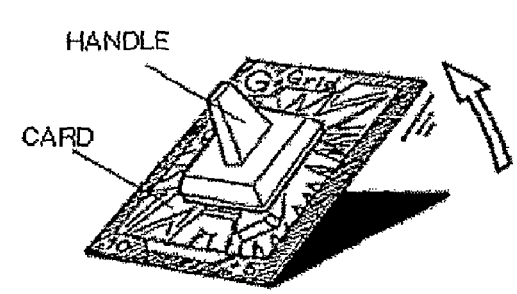
FIG. 93C
FIGURE
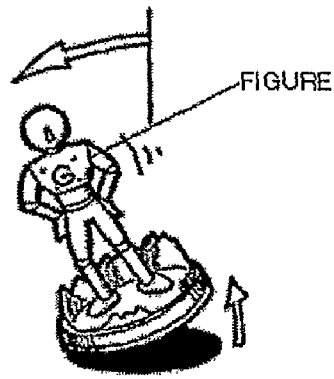
FIG. 93D
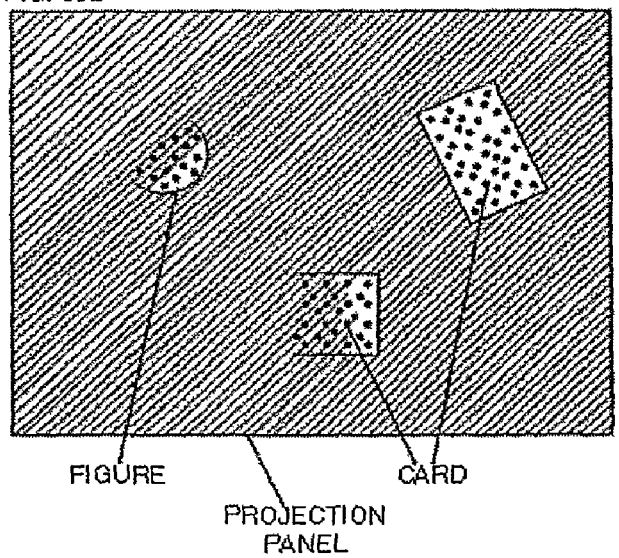
FIGURE  CARD
PROJECTION PANEL
(e)

CARD

CARD

PHOTOGRAPHING IMAGE

CARD

PROJECTION IMAGE

FIG. 95A

| | | | |
|---|---|---|---|
| PARITY (2 BITS) | MEDIUM KIND (CHARACTER CODE) (8 BITS) | MEDIUM SHAPE (4 BITS) | MEDIUM PARAMETER (4 BITS) |

$C_{17}\ C_{16}\ C_{15}\ C_{14}\ C_{13}\ C_{12}\ C_{11}\ C_{10}\ C_9\ C_8\ C_7\ C_6\ C_5\ C_4\ C_3\ C_2\ C_1\ C_0$

1: PARITY (2 BITS) : FOR ERROR CHECKING

LOWER 1 BIT OF $C_{17}=(C_{15}+C_{13}+C_{11}+C_9+C_7+C_5+C_3+C_1)$

LOWER 1 BIT OF $C_{16}=(C_{14}+C_{12}+C_{10}+C_8+C_6+C_4+C_2+C_0)$

2: MEDIUM KIND (8 BITS) : CODES OF 256 KINDS FOR DEFINING MEDIUM. FOR EXAMPLE, CHARACTER MEDIUM, SUCH AS FIGURE OR CARD.

3: MEDIUM SHAPE (4 BITS) : 16 CODES THAT SHOW THREE-DIMENTIONAL SHAPE OF MEDIUM CREATED FOR EACH MEDIUM, SHAPE OF MEDIUM SURFACE, AND MEDIUM MATERIAL( HARD OR REMOVED MATERIAL)

4: MEDIUM PARAMETER (4 BITS) : 16 PARAMETERS DEFINED FOR EACH MEDIUM. ITEM, WEAPON, AND SKILL WHICH CHARACTER HAS.

FIG.95B

| MEDIUM KIND | MEDIUM SHAPE | MEDIUM PARAMETER |
|---|---|---|
| 1 | 0 | 8 |
| 2 | 1 | 9 |
| 3 | 8 | 1 |
| 4 | 9 | 2 |

| MEDIUM KIND | MEDIUM SHAPE | CLASSIFICATION | P1 | P2 | P3 |
|---|---|---|---|---|---|
| 1 | 0 | RECTANGULAR CARD THAT IS FOLDED | 60 | 90 | 0 |
| 2 | 1 | TRIANGULAR CARD THAT IS NOT FOLDED | 60 | 80 | 100 |
| 3 | 8 | FIGURE | 60 | 60 | 120 |
| 4 | 7 | FIGURE | 80 | 120 | 60 |

| MEDIUM KIND | MEDIUM PARAMETER | CONTENT |
|---|---|---|
| 1 | 8 | HIDING SKILL |
| 2 | 9 | TRIANGLAR FLASH |
| 3 | 1 | LASER BEAM |
| 4 | 2 | TURBO ENGINE |

INFORMATION INPUT/OUTPUT DEVICE INCLUDING A STAGE SURFACE ON WHICH A REFLECTING MEDIUM INCLUDING A PRINTED DOT PATTERN IS DISPOSED

TECHNICAL FIELD

The present invention relates to a card game machine.

BACKGROUND ART

Generally, in arcade game machines disposed on a game center or the like or game machines used in a state in which they are connected to household television monitors, card game machines are known in which cards are disposed on stages of the game machines and a card game is performed (for example, see Patent Document 1).

Further, a game machine has been suggested in which information about a game, such as numeric values of cards disposed on a stage by a player or the game result, is displayed as images on the stage by using a projector (for example, see Patent Document 2).

Patent Document 1: JP-A-2005-46649
Patent Document 2: JP-A-2002-102529

DISCLOSURE OF THE INVENTION

Problem that the Invention is to Solve

However, in the game machine disclosed in Patent Document 1, only one camera is provided in a casing of the game machine, and thus a variety of information, such as directions or coordinates of cards, different codes, and the like, cannot be precisely read.

Further, in the game machine disclosed in Patent Document 2, a column support is provided in a casing of the game machine in which a stage on which cards are disposed is provided, and a display device, such as a projector, is disposed on the column support, which results in increasing a size in a device. Therefore, it is difficult for the game machine to be disposed in the game center.

Accordingly, in order to solve the above-mentioned problems, an object of the invention is to provide an information output device in which information of a medium disposed on a stage surface can be surely and efficiently read and a stage effect and security are high.

Means for Solving the Problem

In order to achieve the above-mentioned object, the invention adopts the following units.

According to a first aspect of the invention, there is provided an information output device in which media are disposed on a stage surface in a state where the media are opposite to the stage surface, the media where dot patterns are printed on medium surfaces on the basis of a predetermined rule, the dot patterns are read by imaging units disposed in a space below the stage and converted into code values or coordinate values indicating the dot patterns from photographed images obtained by the imaging units, and information corresponding to the code values or the coordinate values is outputted. Further, light transmitting reading holes are respectively provided at a plurality of medium disposing locations on the stage surface, and the imaging units are disposed in the space below the stage corresponding the respective reading holes such that the imaging units photograph the medium surfaces of the media disposed on the reading holes.

In this case, the medium refers to, for example, a card or a figure, and the medium surface refers to, for example, one surface of the card or a bottom surface of a seat of the figure. The medium is not limited to the card or the figure, but may be a seal, a tag, a certificate (an identification certificate and a passport), an exchange ticket for money, a ticket, and the like.

As the information output device, an arrangement-type card game machine may be exemplified. In the card game machine, a top surface is constructed as a stage, and the medium, such as the card, the figure, and the like, is disposed at a predetermined location (reading region) of the stage. As a result, the card game machine (information output device) reads the dot patterns formed on the medium surface of the card or the figure, determines the game result between the players or between the player and the information output device, and progresses the game.

According to the first aspect of the invention, the cameras are provided at locations of the space below the stage, and thus the dot pattern of each medium can be surely read out.

According to a second aspect of the invention, there is provided an information output device in which media are disposed on a stage surface in a state where the media are opposite to the stage surface, the media where dot patterns are printed on medium surfaces on the basis of a predetermined rule, the dot patterns are read by imaging units disposed in a space below the stage and converted into code values or coordinate values indicating the dot patterns from photographed images obtained by the imaging units, and information corresponding to the code values or the coordinate values is outputted. The stage surface has a plurality of medium disposing locations, reading regions are respectively formed at the medium disposing locations, the reading regions where the dot patterns of the media surfaces disposed so as to be opposite to the stage surface are read by using the imaging units that are disposed in the space below the stage, and a characteristic ink for transmitting infrared rays is printed on the stage surface.

According to a third aspect of the invention, in the information output device according to the second aspect of the invention, a characteristic ink that does not transmit infrared rays may be printed on the stage surface, and a characteristic ink that transmits the infrared rays may be printed on only the reading regions.

According to a fourth aspect of the invention, in the information output device according to the third aspect of the invention, a general-purpose ink, which is made of CMY inks not containing a carbon component and a K ink containing the carbon component, may be printed on the stage surface, and printing, which falsely reproduces a K component by using only CMY inks not containing a carbon component, may be performed on only the reading regions.

In the information output device according to the second to fourth aspects of the invention, in at least the reading regions, an ink having characteristic that can transmit the infrared ray is used. For example, in the stage surface, general CMY inks that do not contain the carbon, and a K ink that contains the carbon are used, and in the reading regions, the printing is performed by using only the CMY ink that does not contain the carbon. In the reading regions, a K component is represented by only the CMY inks with carbon not contained without using the K ink, such that the reading region cannot be recognized from the stage surface. As a result, the printing can be performed by using only a low-priced general ink (CMY inks that do not contain the carbon, and a K ink that contains the carbon).

If the infrared component of the external light permeates into an inner portion of the game machine, a noise may occur when the dot pattern is read. However, as described above, the substantially entire surface of the stage surface is allowed to have an infrared ray non-transmission property, and only the reading regions are allowed to have an infrared ray transmitting property. As a result, it is possible to reduce the noise.

According to a fifth aspect of the invention, there is provided an information output device in which media are disposed on a stage surface in a state where the media are opposite to the stage surface, the media where dot patterns are printed on medium surfaces on the basis of a predetermined rule, the dot patterns are read by imaging units disposed in a space below the stage and converted into code values or coordinate values indicating the dot patterns from photographed images obtained by the imaging units, and information corresponding to the code values or the coordinate values is outputted. Further, the stage surface has a plurality of medium disposing locations, reading regions are respectively formed at the medium disposing locations, the reading regions where dot patterns of the medium surfaces disposed so as to be opposite to the stage surface are read by using the imaging units that are disposed in the space below the stage, and an upper layer of the stage surface is composed of a transparent plate, IR filters that transmit wavelength light of infrared ray regions of infrared ray irradiating units disposed in a space below the stage are provided at locations corresponding to at least the reading regions of a lower layer of the stage surface.

According to a sixth aspect of the invention, in the information output device according to the fifth aspect of the invention, a color filter may be provided on a region other than the reading regions or an entire surface.

In this case, the IR filter refers to an optical filter that can transmit only an infrared wavelength (700 nm or more) among the optical components.

According to the fifth and sixth aspects of the invention, the IR filter is provided below the stage surface, and thus the information output device can be constructed without providing the IR filter in an individual infrared ray irradiating unit or an imaging unit in the space below the stage. Further, the IR filter or the color filter is provided, such that the inner space below the stage can be made not to be viewed from the upper side of the stage surface.

According to a seventh aspect of the invention, there is provided an information output device in which media are disposed on a stage surface in a state where the media are opposite to the stage surface, the media where dot patterns are printed on medium surfaces on the basis of a predetermined rule, the dot patterns are read by imaging units disposed in a space below the stage and converted into code values or coordinate values indicating the dot patterns from photographed images obtained by the imaging units are converted into, and information corresponding to the code values or the coordinate values is outputted. Further, in the space below the stage, at locations that avoid imaging light irradiated onto a bottom surface of the stage by the imaging units, light irradiation light sources that irradiate irradiated light onto the dot patterns of the medium surfaces on the stage surface, and a dispersion filter that disperses the irradiated light by the light irradiation light source into the bottom surface of the stage are provided.

According to an eighth aspect of the invention, in the information output device according to the seventh aspect of the invention, the dispersion filter may be composed of a frame that protrudes in an inward direction of sidewalls that define the space below the stage.

As such, at the locations where the imaging light is avoided from the bottom surface of the stage, light irradiation light sources that irradiate light on the dot pattern of the medium surface on the stage surface, and a dispersion filter that disperses the irradiated light by the light irradiation light source on the bottom surface of the stage are provided, and the irradiation light can be efficiently irradiated onto the bottom surface of the stage. Further, the dispersion filter is provided in a frame shape, and the installing structure can be simplified.

According to a ninth aspect of the invention, there is provide a medium in which predetermined irradiated light is irradiated onto at least medium surfaces by imaging units, dot patterns printed on the medium surfaces are optically photographed by reading reflective light by the imaging units and converted into code values or coordinate values indicating the dot patterns from the imaging units, and information corresponding to the code values or the coordinate values is outputted to an information output device. The medium surface is divided into regions where two or more of dot patterns indicating at least two or more of different code values or coordinate values are printed.

According to a tenth aspect of the invention, in the medium according to the ninth aspect of the invention, the medium may be a playing card, and at least one surface of the playing card may be divided into two or more of code regions, such that dot patterns are printed.

According to an eleventh aspect of the invention, in the medium according to the ninth aspect of the invention, on one surface of the playing card, dot patterns capable of detecting a direction of the card on the stage surface may be printed.

According to a twelfth aspect of the invention, in the medium according to the tenth or eleventh aspect of the invention, the medium may be a playing card, and any one of a RFID tag, a magnetic storage unit, and a memory composed of an IC chip may be built in the medium.

The medium surface, such as the card, is divided into regions where two or more of dot patterns indicating two or more of different code values or coordinate values are printed, and the different information can be outputted according to the reading locations of the medium surface. Further, the different code for each pixel can be represented by the dot pattern while managing the entire surface of the medium surface of the card or the like by XY coordinates.

In the medium, a RFID tag, a magnetic storage unit, or a memory unit composed of an IC chip or the like are built. A rotation angle of the card, a trace where the card moves, coordinates, target items, score, remaining points after the game (for example, the game can be performed until 500 points, and remaining points in a case in which the points is reduced whenever the card game is performed) can be recorded on each medium (card) or reflected to the game.

According to a thirteenth aspect of the invention, there is provided an information output device in which media are disposed on a stage surface in a state where the media are opposite to the stage surface, the media where dot patterns are printed on medium surfaces on the basis of a predetermined rule, the dot patterns are read by imaging units disposed in a space below the stage, code values indicating the dot patterns and directions of the media obtained from the analyzed result of the dot patterns are calculated from photographed images obtained by the imaging units and locations of the media disposed on the stage surface defined by XY coordinates are calculated, and information corresponding to the calculation results is outputted.

According to a fourteenth aspect of the invention, in the information output device according to the thirteenth aspect of the invention, the imaging unit may detect brightness of a checking pixel group set at a predetermined interval among pixel matrices of the predetermined number, determines that the medium is disposed on the pixel matrix, when the brightness is equal to or greater than a predetermined threshold value, and code analysis of dot patterns is performed with respect to only a pixel matrix group that has been determined that the medium is disposed.

As such, with respect to not all pixels but a pixel group for check, it is determined by the brightness whether the medium exists or not, and thus it is efficiently determined whether the card exists or not. Further, with respect to only the pixel matrix group on which the medium is disposed, the code analysis of the dot pattern is performed, and the analysis of the dot pattern can be efficiently performed.

According to a fifteenth aspect of the invention, there is provided an information output device in which media are disposed on a stage surface in a state where the media are opposite to the stage surface, the media where dot patterns are printed on medium surfaces on the basis of a predetermined rule, the dot patterns are read by an imaging unit disposed in a space below the stage, code values indicating the dot patterns and directions of the media obtained from the analyzed result of the dot patterns are calculated from photographed images obtained by the imaging unit and locations of the media disposed on the stage surface defined by XY coordinates are calculated, and information corresponding to the calculated results is outputted. Further, in the space below the stage, a projection unit is disposed, in addition to the imaging unit, and the projection unit controls images or moving pictures projected on the stage surface by calculating the code values of the dot patterns obtained from the photographed images by the imaging unit and the direction of the card obtained from the analyzed results of the dot patterns and calculating the location of the medium disposed on the stage surface defined by XY coordinates.

According to a sixteenth aspect of the invention, in the information output device according to the fifteenth aspect of the invention, an upper layer of the stage may be composed of a transparent plate, and a lower layer of the stage may be composed of a projection sheet for a projection unit.

According to a seventeenth aspect of the invention, in the information output device according to the seventh or sixteenth aspect of the invention, in the space below the stage, at locations that avoid projected light from the projection unit to the stage surface, light irradiation light sources that irradiate irradiated light onto the dot patterns of the medium surface on the stage surface, and a dispersion filter that disperses the irradiated light of the light irradiation light source into the bottom surface of the stage may be provided.

According to an eighteenth aspect of the invention, in the information output device according to the fifteenth aspect of the invention, a magic mirror may be obliquely provided in the space below the stage, a projection unit may be disposed at one surface side of the magic mirror, projection images or moving pictures from the projection unit may be reflected on the one surface to be projected onto the stage surface, and an imaging unit may be disposed on the other surface side of the magic mirror, and photographed light of the dot patterns of the medium surface on the stage surface transmits the magic mirror to be incident on the imaging unit.

According to a nineteenth aspect of the invention, in the information output device according to the fifteenth aspect of the invention, mirrors may be obliquely provided in the space below the stage, a projection unit and an imaging unit may be disposed on one surface side of the mirror, and projection images or moving pictures from the projection unit may be reflected on the one surface to be projected onto the bottom surface of the stage.

As such, in addition to the imaging units, a projection unit in which the images or the moving pictures projected onto the stage surface are controlled by the code values or the coordinate values of the dot patterns obtained from the photographing images by the imaging unit are provided in the space below the stage surface. The images or the moving pictures projected onto the stage surface where the medium is disposed can be controlled by the dot patterns of the medium surface. When the game is performed by using the medium such as the card, the game production or the score can be displayed by the images or the moving pictures of the stage surface where the cards are disposed.

Accordingly, the medium, such as, the card or the like, on which the dot pattern is printed may be used as a controller of moving picture or image display.

As for the mirror, if the metal material is deposited on the metal mirror, since it intercepts the infrared rays, it is preferable that the deposition material for transmitting the infrared ray (non-carbon black) be deposited.

Further, the number of mirrors is not limited to one, and a plurality of mirrors may obliquely provided (with multistage).

As such, if the mirrors are provided with a multistage structure, a projection unit and an imaging unit are disposed on the side of one surface of a mirror of a final stage.

Further, the projection unit (projector) may make projected light reflected on all mirrors having a multistage structure, such that projection images or moving pictures may be displayed on a bottom surface of the stage. Meanwhile, the imaging unit may make the imaging light from the bottom surface of the stage reflected on only a mirror of a middle stage, such that the bottom surface of the stage may be photographed.

As such, the reason why the stage number of the imaging unit is smaller than that of the projection unit is as follows. Since the imaging unit preferably set the focal distance to be shorter than that of the projection unit, the stage number of the mirrors becomes smaller, and thus photographing can be performed with high precision (refer to FIG. 38C).

According to a twentieth aspect of the invention, there is provided an information output device in which an illumination unit irradiates irradiation light onto a medium where dot patterns to be reactive with predetermined irradiation light are printed, reflected light is read by an imaging unit, photographed images obtained by the imaging unit are converted into code values or coordinate values indicating the dot patterns, and information corresponding to the code values or the coordinate values is outputted. Further, the imaging unit selectively or overlappingly reads one system or a plurality of systems of dot patterns among two systems or more of dot patterns formed by at least two kinds of inks having different reactivity printed on the medium so as to be converted into code values or coordinate values.

According to a twenty first aspect of the invention, there is provided an information output device in which an illumination unit irradiates irradiation light onto a medium where dot patterns to be reactive with predetermined irradiation light are printed, reflected light is read by an imaging unit, code values indicating dot patterns and the direction of the medium obtained from the analyzed result of the dot patterns from the photographed images obtained by the imaging unit are calculated and the location of the medium disposed on the stage surface defined by XY coordinates is calculated, and information according to the calculated result is outputted. Further, the imaging unit selectively or overlappingly reads one system or a plurality of systems of dot patterns among two systems or more of dot patterns formed by at least two kinds of inks having different reactivity printed on the medium so as to be converted into code values or coordinate values.

According to a twenty second aspect of the invention, in the information output device according to the twentieth and twenty first aspects of the invention, the irradiation light may be an infrared ray, and the at least two kinds of inks having different reactivity may be two kinds of inks that have different infrared ray absorptivity with respect to all frequency bands, respectively.

According to a twenty third aspect of the invention, in the information output device according to the twentieth and twenty first aspects of the invention, the irradiation light may be an infrared ray, and the at least two kinds of inks having the different reactivity may be two kinds of inks that have different peak value wavelength characteristic of infrared ray absorptivity, respectively.

According to a twenty fourth aspect of the invention, in the information output device according to the twentieth and twenty first aspects of the invention, the irradiation light may be an infrared ray, and the at least two kinds of inks having the different reactivity may be two kinds of inks, each of which has a different peak value wavelength characteristic of infrared ray absorptivity, and the irradiation unit may have two or more of irradiation sections, each of which adjusts an infrared wavelength for each different peak value of infrared ray absorptivity.

According to a twenty fifth aspect of the invention, in the information output device according to the twentieth or twenty first aspect of the invention, the irradiation light may be an infrared ray, and the at least two kinds of inks having different reactivity may be respectively a first ink and a second ink, the first ink having a small peak value of infrared ray absorptivity and a small wavelength, the second ink having a large peak value of infrared ray absorptivity and a large wavelength, the irradiation unit may have a first irradiation unit and a second irradiation unit, the first irradiation unit having wavelength characteristic of almost an entire region of an infrared wavelength, the second irradiation unit being suitable for a wavelength in which the infrared absorptivity of the first ink is larger than the infrared absorptivity of the second ink, and the first and second irradiation units may selectively or overlappingly irradiate irradiation light onto the medium, and the reading unit may selectively or overlappingly reads a first dot pattern printed by the first ink or a second dot pattern printed by the second ink.

As such, the two system or more of dot patterns that are formed of at least two kinds of inks are formed on the medium surface, and the imaging unit of the information output device selectively or overlappingly reads the dot patterns of one system or the plurality of systems and converts them into the code values or the coordinate values. Thereby, the two systems or more of dot patterns can be formed, and the information amount of the medium surface can be increased. Further, the selectivity is raised, and thus security can be improved.

An infrared ray is used as the irradiated light, and two kinds or more of inks, each of which has different infrared ray absorptivity, or two kinds or more of inks, each of which has different wavelength characteristic of the peak value of the infrared ray absorptivity are used as the two kinds or more of inks. As a result, the dots are selectively analyzed by the difference between the reactivity when the infrared ray is irradiated, and thus the selectivity of the infrared ray can be improved at the time of reading. In the case in which the medium surface is copied by the copying machine, the security can be improved.

The at least two kinds of inks, each of which has different reactivity, correspond to a first ink in which a peak value of the infrared ray absorptivity is small and the wavelength is short, and a second ink in which a peak value of the infrared ray absorptivity is large and the wavelength is long. The irradiation unit has a first illumination unit that has wavelength characteristic of a substantially entire region of the infrared ray wavelength, and a second illumination unit that is suitable for the wavelength in which the infrared ray absorptivity of the first ink is higher than the infrared ray absorptivity of the second ink. The first and second irradiation units selectively or overlappingly the irradiation light onto the medium, and thus the reading unit can selectively or overlappingly read the dot patterns printed by the first ink or the dot patterns printed by the second ink. Therefore, the information amount can be increased, and the security can be improved.

According to a twenty sixth aspect of the invention, there is provided a medium in which predetermined irradiation light is irradiated onto at least a medium surface by an imaging unit, dot patterns printed on the medium surface are optically photographed by reading reflective light by the imaging unit and converted into code values or coordinate values indicating the dot patterns from the photographed images, and information corresponding to the code values or the coordinate values is outputted to the information output device. Further, two systems of dot patterns that are formed by at least two kinds of inks having different reactivity with respect to the predetermined irradiated light are printed on the medium surface.

According to a twenty seventh aspect of the invention, there is provided a medium in which predetermined irradiation light is irradiated onto at least a medium surface by an imaging unit, dot patterns printed on the medium surface are optically photographed by reading reflective light by the imaging unit, code values indicating the dot patterns and directions of the cards obtained from the recognition result of the dot patterns are calculated from the photographed images and the location of the card disposed on the stage surface defined by XY coordinates is calculated, and information according to the calculated results is outputted to an information output device. Further, two systems of dot patterns that are formed by at least two kinds of inks having different reactivity with respect to the predetermined irradiated light are printed on the medium surface.

According to a twenty eighth aspect of the invention, in the medium according to the twenty sixth and twenty seventh aspect of the invention, the irradiation light may be an infrared ray, and the at least two kinds of inks having the different reactivity may be two kinds of inks that have different infrared ray absorptivity, respectively.

According to a twenty ninth aspect of the invention, in the medium according to the twenty sixth and twenty seventh aspect of the invention, the irradiation light may be an infrared ray, and the at least two kinds of inks having the different reactivity may be two kinds of inks that have infrared wavelengths, respectively.

According to a thirtieth aspect of the invention, in the medium according to any one of the twenty sixth, twenty seventh, twenty eighth, and twenty ninth, the medium may be a playing card.

According to a thirty first aspect of the invention, in the medium according to the thirtieth aspect of the invention, any one of a RFID tag, a magnetic storage unit, or a memory composed of an IC chip may be built in the playing card.

According to a thirty second aspect of the invention, in the medium in the medium according to any one of the twenty sixth, twenty seventh, twenty eighth, and twenty ninth aspects of the invention, the medium is a counterfeit preventing subject medium, such as a seal, a tag, a certificate (an identification certificate and a passport), an exchange ticket for money, and a ticket.

According to the thirty third aspect of the invention, in the medium according to the thirty second aspect of the invention, an RFID tag may be built in the counterfeit preventing subject medium.

As such, the two systems or more of dot patterns that are formed of at least two kinds of inks are formed on the medium surface, and the imaging unit of the information processing device selectively or overlappingly reads the dot patterns of one system or the plurality of systems and converts them into the code values or the coordinate values. Thereby, the two systems or more of dot patterns can be formed, and the information amount of the medium surface can be increased. Further, the selectivity is raised, and thus security can be improved.

The infrared ray is used as the irradiation light, and two kinds or more of inks, each of which has different infrared ray absorptivity, or two kinds or more of inks, each of which has different wavelength characteristic of the peak value of the infrared ray absorptivity are used as the two kinds or more of inks. As a result, the dots are selectively analyzes by the difference between the reactivity when the infrared ray is irradiated, and thus the selectivity can be improved at the time of reading. In the case in which the medium surface is copied by the copying machine, the security can be improved.

The at least two kinds of inks, each of which has different reactivity, correspond to a first ink in which a peak value of the infrared ray absorptivity is small and the wavelength is short, and a second ink in which a peak value of the infrared ray absorptivity is large and the wavelength is long. The irradiation unit has a first illumination unit that has wavelength characteristic of a substantially entire region of the infrared ray wavelength, and a second illumination unit that is suitable for the wavelength in which the infrared ray absorptivity of the first ink is higher than the infrared ray absorptivity of the second ink. The first and second irradiation units selectively or overlappingly the irradiation light onto the medium, and thus the reading unit can selectively or overlappingly read the dot patterns printed by the first ink or the dot patterns printed by the second ink. Therefore, the information amount can be increased, and the security can be improved.

The medium is used as a seal, a tag, a certificate (an identification certificate, and a passport), an exchange ticket for money, a ticket, and the like. As a result, the selectivity of the dot pattern or the infrared ray characteristic can be improved. The security for fabrication preventing can be raised.

According to a thirty fourth aspect of the invention, there is provided an information input/output device in which medium surfaces of a plurality of media where code information indicating characters or numerical values, such as the characters, pictures, two-dimensional codes, and the like, or numerical values are printed by ink having infrared ray absorbing characteristic are disposed on a stage surface transmitting infrared rays in a state in which the media surfaces are opposite to the stage surface, infrared rays are irradiated onto a bottom surface of the stage by an infrared ray irradiating unit provided at an inner circumference of the space below the stage surface, reflected light is photographed by an infrared ray imaging unit, and an information processing unit for outputting multimedia information, such as sounds, characters, images, moving pictures, and the like, on the basis of photographed images obtained from the infrared ray imaging unit, is provided. Further, on the basis of projection images from the infrared ray imaging unit, the information processing unit inputs positional information of a medium on the stage surface, direction information or medium state information indicating a contact state between the stage surface and the medium, and code information printed on the medium surface, and the information processing unit outputs and displays the medium state information and multimedia information, such as characters, images, moving pictures, and the like, corresponding to the code information, to and on an entire surface or a portion of the stage surface composed of a projection panel with respect to the projection unit disposed below the stage surface.

As such, the code information printed on the medium is photographed by the infrared ray imaging unit that is provided below the bottom surface of the stage, and the characters, images or moving pictures associated with the photographed images are displayed on the surface of the stage on which the medium is disposed. As a result, the production of the stage surface interlocked with the code information of the medium can be made.

According to the thirty fifth aspect of the invention, in the information output device according to the thirty fourth aspect of the invention, the multimedia information may be information that indicates medium arrangement on the projection panel surface and an operation instruction.

As such, the arrangement of the medium or the operation instruction is performed by the multimedia information displayed on the surface of the stage, and the medium can be easily operated. In addition, the stage effect of the game can be further raised.

According to a thirty sixth aspect of the invention, in the information output device according to thirty fourth aspect of the invention, the code may be a dot pattern.

As such, the dot patterns are used, and the image process and the code analysis can be performed at high speed. Further, the direction of the medium surface can be easily calculated, and a variety of code information can be recorded on the medium.

According to a thirty seventh aspect of the invention, in the information input and output device according to the thirty fourth aspect of the invention, pictures or characters may be printed on a portion and all of a top surface of the projection panel by using an infrared ink or an infrared ray transmitting sheet printed by the infrared ray transmitting ink may be attached to the portion and all of the top surface of the projection panel.

As such, the pictures or the characters are previously printed on the top surface of the projection panel by using the infrared ray transmitting ink, and thus it is possible to raise the stage effect combined with the multimedia information projected from the lower side.

The infrared ray transmitting sheet is attached, and the surface of the projection panel can be protected from being damaged. In addition, even if the infrared ray transmitting sheet is damaged, it can be easily exchanged with a new one.

According to a thirty eighth aspect of the invention, in the information input and output device according to any one of the thirty fourth to thirty seventh aspects of the invention, a frame designating a projection region for projecting light by the projection unit or marks designating four corners of the projection region may be printed on the top surface of the projection panel or the infrared ray transmitting sheet according to claim 37 by using visible infrared ray transmitting ink, or a removable infrared ray transmitting sheet printed by the ink is attached, and the information processing unit may allow the projection unit to project a frame indicating a projection region or marks indicating four corners of the projection region onto the projection panel, and may correct a visibly designated projection region and a projection region of the projection image to be equal to each other.

As such, the marks indicating four corners of the projection region are projected onto the projection panel from the projection unit, and thus the deviation of the projection unit with respect to the projection panel can be corrected (calibration). When the projection region instruction frame or mark is not printed on the projection panel or the infrared ray transmitting sheet, they are printed on the removable infrared ray transmitting sheet, and after the correction, the infrared ray transmitting sheet can be removed.

According to a thirty ninth aspect of the invention, in the information input and output device according to any one of the thirty fourth to thirty eighth aspect of the invention, dot marks designating four corners of a region photographing an infrared image may be printed by using an infrared ray absorbing ink on the top surface of the projection panel, or a removable infrared ray transmitting sheet printed by the ink may be attached. The information processing unit may recognize coordinates of the four corners on the basis of the dot marks photographed by the infrared ray imaging unit, may determine whether the coordinates are at the same locations as information of four corners of the photographic regions previously stored in a storage unit, and may display the result information and instruction information on the projection panel by the projection unit.

As such, the dot marks instructing the four corners of the region for photographing the infrared image are previously printed in the projection panel or the infrared ray transmitting sheet, and the deviation of the imaging unit with respect to the projection panel is displayed on the projection panel by the projection unit, and the correction (calibration) can be made. If the large capacity of storage unit is provided, it is possible to automatically correct the photographic region of the storage unit. Further, when the infrared ray absorbing dot marks are not printed on the projection panel or the infrared ray transmitting sheet, they are printed on the removable infrared ray transmitting sheet, and after the correction, the removable infrared ray transmitting sheet can be removed.

According to a fortieth aspect of the invention, in the information input and output device according to the thirty fourth aspect of the invention, the information processing unit may output to the projection unit information indicating characters, diagrams, images or moving pictures that are associated with the medium disposed on the surface of the projection panel.

Specifically, when the medium is a card for a game, the moving picture indicating fire or water according to the attribute of the card may be projected onto the peripheral portions of the card. Further, when the medium is a figure (doll) that has a bottom surface on which the code information is printed, the region of the dialogue balloon is displayed around the figure, and the word of the figure may be displayed by the characters.

According to a forty first aspect of the invention, in the information input and output device according to the fortieth aspect of the invention, the information processing unit may output to the projection unit information indicating characters, diagrams, images or moving pictures associated with the medium to locations the projection panel surface that do not overlap a contact surface of the medium.

Specifically, when the plurality of cards are disposed on the surface of the projection panel, the multimedia information indicating characters, diagrams, images, moving pictures, and the like can be displayed at locations shifted from the disposed cards. Further, the production can be made by the images, the moving pictures, and the like from the interface of the contact surface of the medium. For example, in the case of the figure, the shadow is projected, and the in the case of the card, the characters, the diagrams, the images, and the moving pictures that are continuous to the images plotted on the card are displayed.

According to a forty second aspect of the invention, in the information input and output device according to any one of the thirty fourth to forty first aspects of the invention, medium information indicating a kind and a shape of the medium or a shape of the medium surface may be defined in the code information printed on the printing surface, and information indicating characters, diagrams, images or moving pictures projected onto the projection panel surface may be created on the basis of the medium information.

In the code information, medium information indicating the kind or the shape of the medium is contained, and when the code information is photographed by the imaging unit, since the information processing device discriminates the kind or the shape of the medium, the multimedia information corresponding to the kind or the shape of the medium can be outputted.

For example, when the information indicating the kind of the medium, such as the figure or the card, is used, in the case of the figure, a word made of characters, and in the case of the medium, the score can be displayed on the projection panel.

In case of the figure (doll) with a height that the code information is printed on the bottom surface, when an obliquely upward side of the player stage is visible, the multimedia information indicating characters, diagrams, images, moving pictures, and the like can be displayed at locations that do not become the shadow of the figure at the time of being viewed from an eye line.

When the shape of the medium or the shape of the medium surface is stored as the medium information, an algorithm may be omitted in which the imaging unit directly recognizes the shape of the medium from the projection image. The information that indicates the characters, images, moving pictures, and the like having considered the shapes may be displayed on the panel surface.

According to a forty third aspect of the invention, in the information output device according to the thirty fourth aspect of the invention, the information processing unit may detect an operation of the medium that operates by a user on a stage surface on the basis of state information of the medium. After the information processing unit analyzes codes printed on the medium surface to specify the medium, and calculates XY coordinates indicating a location of the medium on the projection panel, the information processing unit may recognize a grid tapping operation of the medium on the projection panel, that is, may read XY coordinate information calculated in substantially the same region as the location where the medium is disposed in a predetermined time or a designated region and/or code information many times to recognize the XY coordinates and the code information.

According to a forty fourth aspect of the invention, in the information input/output device according to the thirty fourth aspect of the invention, the information processing unit may detect an operation of the medium that operates by a user on a projection panel on the basis of state information of the medium. After the information processing unit analyzes codes printed on the medium surface to specify the medium, and calculates XY coordinates indicating a location of the medium on the stage surface, the information processing unit may perform a grid twist operation that rotates the medium on the basis of any location of the medium surface on the projection panel surface, such that a rotation angle of the medium or traces of the rotation angle with respect to the direction of the imaging unit are repeatedly recognized in a predetermined time.

According to a forty fifth aspect of the invention, in the information input/output device according to the thirty fourth aspect of the invention, the information processing unit may detect an operation of the medium that operates by a user on a stage surface on the basis of state information of the medium. After the information processing unit analyzes codes printed on the medium surface to specify the medium, and calculates XY coordinates indicating locations of the medium on the stage surface, the information processing unit may perform a circular grid sliding operation of the medium surface on the projection panel surface, such that traces of the XY information calculated in a predetermined time is recognized as a substantially circular shape.

According to a forty sixth aspect of the invention, in the information input/output device according to the thirty fourth aspect of the invention, the information processing unit may detect an operation of the medium that operates by a user on the projection panel surface on the basis of state information of the medium. After the information processing unit analyzes codes printed on the medium surface to specify the medium, and calculates XY coordinates indicating a location of the medium on the stage surface, the information processing unit may perform a straight-line-shaped grid scrolling operation of the medium on the projection panel surface, such that traces of the XY coordinate information calculated in a predetermined time is recognized as a substantially straight line shape.

According to a forty seventh aspect of the invention, in the information input/output device according to the thirty fourth aspect of the invention, the information processing unit may detect an operation of the medium that operates by a user on the projection panel surface on the basis of state information of the medium. After the information processing unit analyzes codes printed on the medium surface to specify the medium, and calculates XY coordinates indicating a location of the medium on the stage surface, the information processing unit may perform a grid scratching operation of the medium repetitively in a straight line shape on the projection panel surface, such that it is recognized that traces of the XY information calculated in a predetermined time is repeated in a substantially straight line shape.

According to a forty eighth aspect of the invention, in the information input/output device according to a thirty fourth aspect of the invention, the information processing unit may detect an operation of the medium that operates by a user on the projection panel surface on the basis of state information of the medium. After the information processing unit analyzes codes printed on the medium surface to specify the medium, and calculates XY coordinates indicating a location of the medium on the stage surface, the information processing unit may perform a grid tilting operation of inclining the medium on the projection panel surface, such that a variation of inclination of the medium with respect to a vertical line of the projection panel in a predetermined time is recognized.

According to a forty ninth aspect of the invention, in the information input/output device according to the thirty fourth aspect of the invention, the information processing unit may detect an operation of the medium that operates by a user on the projection panel surface on the basis of state information of the medium. After the information processing unit analyzes codes printed on the medium surface to specify the medium, and calculates XY coordinates indicating a location of the medium on the projection panel surface, the information processing unit may perform a grid turnover operation of turning over a portion of the medium surface on the projection panel surface, such that a variation of an area ratio of the medium surface turned over from the projection panel surface in a predetermined time is recognized.

As such, the information processing unit detects operations of the medium on the surface of the projection panel, that is, a grid tapping operation, a grid twist operation, a grid sliding operation, a grid scrolling operation, a grid scratching operation, a grid tilting operation, a grid turnover operation, and the like, and it is possible to vary the multimedia information, such as characters, diagrams, images, moving pictures, and the like, that is associated with the above-described operations and displayed on the surface of the projection panel. A variety of stage effects can be achieved.

According to a fiftieth aspect of the invention, in the information input/output device according to the forty eighth or forty ninth aspect of the invention, the information processing unit may perform the operation of the medium according to the forty eighth or forty ninth aspect of the invention, such that characters, diagrams, images or moving pictures corresponding to the code information are projected onto a region of the projection panel surface from which the medium surface is turned over, by means of the projection unit.

For example, when the medium is a card, such as the trump, the image of the portion turned over from the surface of the projection panel (kinds or numerical values of the card printed at corners of the trump) can be displayed on the region of the projection panel surface where the medium surface is turned over, and thus it is possible to raise the display stage effect on the projection panel surface accompanied with the card operation by the player.

According to a fifty first aspect of the invention, in the information input and output device according to the forty eighth or forty ninth aspect of the invention, the inclination according to the forty eighth aspect of the invention or the area ratio according to the forty ninth aspect of the invention may be recognized by brightness of the infrared image obtained by photographing a region where the medium is turned over the stage surface, by means of the imaging unit.

When the medium surface is tilted from the projection panel surface, or when the portion of the medium is turned over from the projection panel surface, the brightness region of the photographed images or the shape of the brightness and the darkness by the imaging unit are gradually varied. The information processing unit recognizes the state or shape of the bright region in the photograph image. As a result, the inclination of the medium and the inclined direction, a portion of the turned over medium surface, and the size thereof can be recognized.

Accordingly, if varying the multimedia information indicating characters, the diagrams, the images, the moving pictures, and the like displayed on the surface of the projection panel in accordance with the recognized result, it is possible to raise the stage effect with respect to the player.

According to a fifty second aspect of the invention, in the information input/output device according to the forty eighth aspect of the invention or the forty ninth aspect of the invention, the operation of the medium according to any one of the forty third to forty ninth aspects of the invention may be based on the recognition of the number of times or speed of the operation repeated at a predetermined time.

As such, a grid tapping operation, a grid twist operation, a grid sliding operation, a grid scrolling operation, a grid scratching operation, a grid tilting operation, a grid turnover operation, and the like are repeated, and it is possible to vary the multimedia information, such as characters, diagrams, images, moving pictures, and the like, displayed on the surface of the projection panel by the number of times of the repetition of the operation and the operation speed. Therefore, it is possible to raise the stage effect with respect to the player.

According to a fifty third aspect of the invention, in the information input/output device according to the forty third to forty ninth aspects of the invention, the operation of the medium according to any one of the forty third to fifty second aspects of the invention may be based on a history stored in a storage unit.

According to a fifty fourth aspect of the invention, there is provided an information output device in which a medium is disposed on a stage surface in a state where the medium is opposite to the stage surface, the medium where dot patterns are printed on a medium surface on the basis of a predetermined rule, the dot patterns are read by an imaging unit disposed in a space below the stage, code values indicating the dot patterns and directions of the media obtained from the analyzed result of the dot patterns are calculated from photographed images obtained by the imaging unit and locations of the media disposed on the stage surface defined by XY coordinates are calculated, and information corresponding to the calculated results is outputted. Further, the imaging unit detects brightness of each pixel or a pixel group among pixel matrices of the predetermined number, and recognizes a shape of the medium on the basis of a pixel or a pixel group whose brightness is equal to or more than a previously set threshold value.

According to a fifty fifth aspect of the invention, in the information output device according to the fifty fourth aspect of the invention, the recognized medium may be a card.

According to a fifty sixth aspect of the invention, in the information output device according to the fifty fourth aspect of the invention, the recognized medium may be a fingertip of an operator or a player.

According to a fifty seventh aspect of the invention, in the information output device according to any one of fifty fourth to fifty sixth aspects of the invention, the centroid of the medium may be calculated by a medium shape recognizing image from the imaging unit, and an operation corresponding to coordinates of the centroid may be performed.

According to the above-described aspects of the invention, the operation history of the grid tapping operation, the grid twist operation, the grid sliding operation, the grid scrolling operation, the grid scratching operation, the grid tilting operation, the grid turnover operation, and the like is stored in the storage unit of the information processing unit, and the multimedia information indicating characters, diagrams, images, moving pictures, and the like displayed on the surface of the projection panel is varied by the combination of the operations. As a result, it is possible to raise the stage effect with respect to the player.

Advantage of the Invention

According to the invention, it is possible to achieve an information output device in which the information of the medium disposed on the stage surface can be surely or efficiently read, and the stage effect and the security can be raised.

BRIEF DESCRIPTION OF THE DRAWINGS

FIG. 6A is a diagram illustrating a card arrangement panel in which printing is performed on an entire top surface of the card arrangement panel, which illustrates a plan view of the card arrangement panel from an upper side, FIG. 6B is a diagram illustrating a card arrangement panel in which printing is performed on an entire top surface of the card arrangement panel, which illustrates a longitudinal cross-sectional view illustrating an enlarged cross-sectional structure of the card arrangement panel, FIG. 6C is a diagram illustrating a card arrangement panel in which printing is performed on an entire top surface of the card arrangement panel, which illustrates a plan view of the card arrangement panel from an upper side.

FIG. 7 is a diagram illustrating a card arrangement panel whose bottom surface is provided with an IR filter or a color filter.

FIG. 20A is a diagram illustrating an example of an information dot and bit display of data defined therefrom, which illustrates a case in which two dots are arranged, FIG. 20B is a diagram illustrating an example of an information dot and bit display of data defined therefrom, which illustrates a case in which four dots are arranged, FIG. 20C is a diagram illustrating an example of an information dot and bit display of data defined therefrom, which illustrates a case in which five dots are arranged.

FIG. 21A is a diagram illustrating a modification of a dot pattern, which illustrates a case in which six information bits are arranged, FIG. 21B is a diagram illustrating a modification of a dot pattern, which illustrates a case in which nine information bits are arranged, FIG. 21C is a diagram illustrating a modification of a dot pattern, which illustrates a case in which twelve information bits are arranged, FIG. 21D is a diagram illustrating a modification of a dot pattern, which illustrates a case in which thirty sixth information bits are arranged.

FIG. 24A is a diagram illustrating a card used in a card game machine, which illustrates a back surface of a card, and FIG. 24B is a diagram illustrating a card used in a card game machine, which illustrates a case in which a location and a direction of the card are changed by card movement.

FIG. 25A is a diagram illustrating a card used in a card game machine, which illustrates a back surface of a card, and FIG. 25B is a diagram illustrating a card used in a card game machine, which illustrates a case in which a location and a direction of the card are changed by card movement.

FIG. 40A is a plan view illustrating a card game machine, and FIG. 40B is a longitudinal cross-sectional view illustrating a card game machine.

FIG. 74 is a diagram illustrating a card as one of a medium used in the invention in which code information is printed on a portion facing a projection panel by using infrared ray absorbing ink.

FIG. 83 is a diagram illustrating a frame and a mark that are projected for printing and correcting a mark and a frame for designating a projection region projected by a projector.

FIG. 93 is a diagram illustrating a grid tilt operation that operates a card or a figure disposed on a projection panel, and brightness of an infrared image obtained by photographing a grid tilt operation state and an image projected onto a region of a surface of a projection panel whose medium surface is reversed.

FIG. 95 is a diagram illustrating a format and a code thereof in a case in which medium kinds, quality of a material of a medium, a medium, a shape of a medium surface, and other information are included.

BEST MODE FOR CARRYING OUT THE INVENTION

First Embodiment

Multisensor Game Machine

FIGS. 1 to 8 are diagrams illustrating a card game machine according to a first embodiment of the invention.

Figure 1:
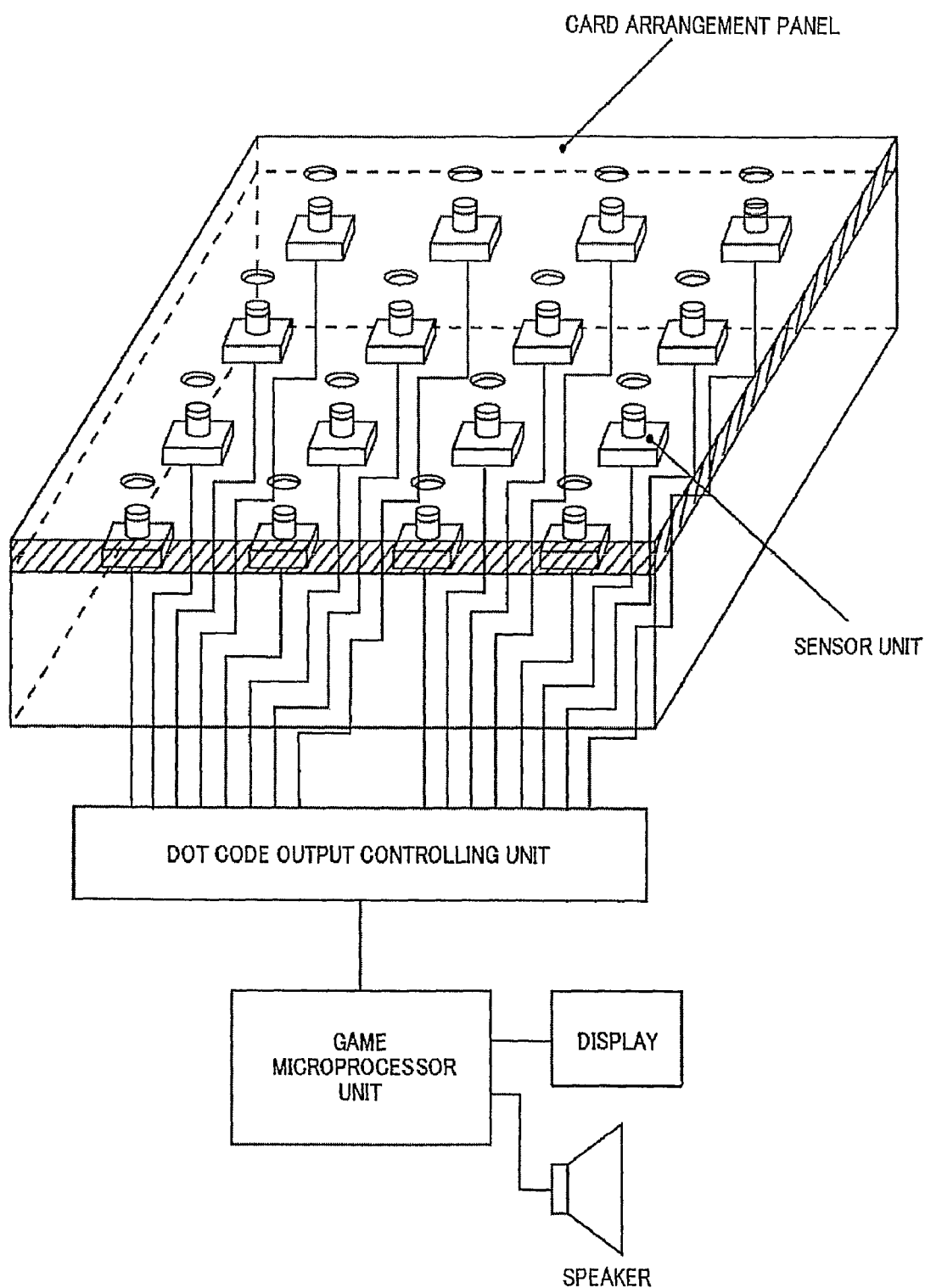
FIG. 1 is a perspective view illustrating a card game machine according to a first embodiment of the invention.

FIG. 1 is a front view illustrating an outer appearance of a card game machine in which a plurality of sensors are disposed.

The card game machine includes a card arrangement panel on which cards held by a player are arranged. The card arrangement panel has sixteen reading holes that are provided for making a sensor of a sensor unit (which will be described in detail below) irradiating light. Further, the card arrangement panel further has a display on which a progress situation of a game is displayed, and a speaker that outputs music or sounds.

Further, in the card game machine, sixteen sensor units are provided. The sensor units are connected to a dot code output controlling unit through a LAN or HuB unit, which will be described below. Furthermore, the dot code output controlling unit is connected to a game microprocessor unit, and the game microprocessor unit is connected to the display and the speaker.

Figure 2:
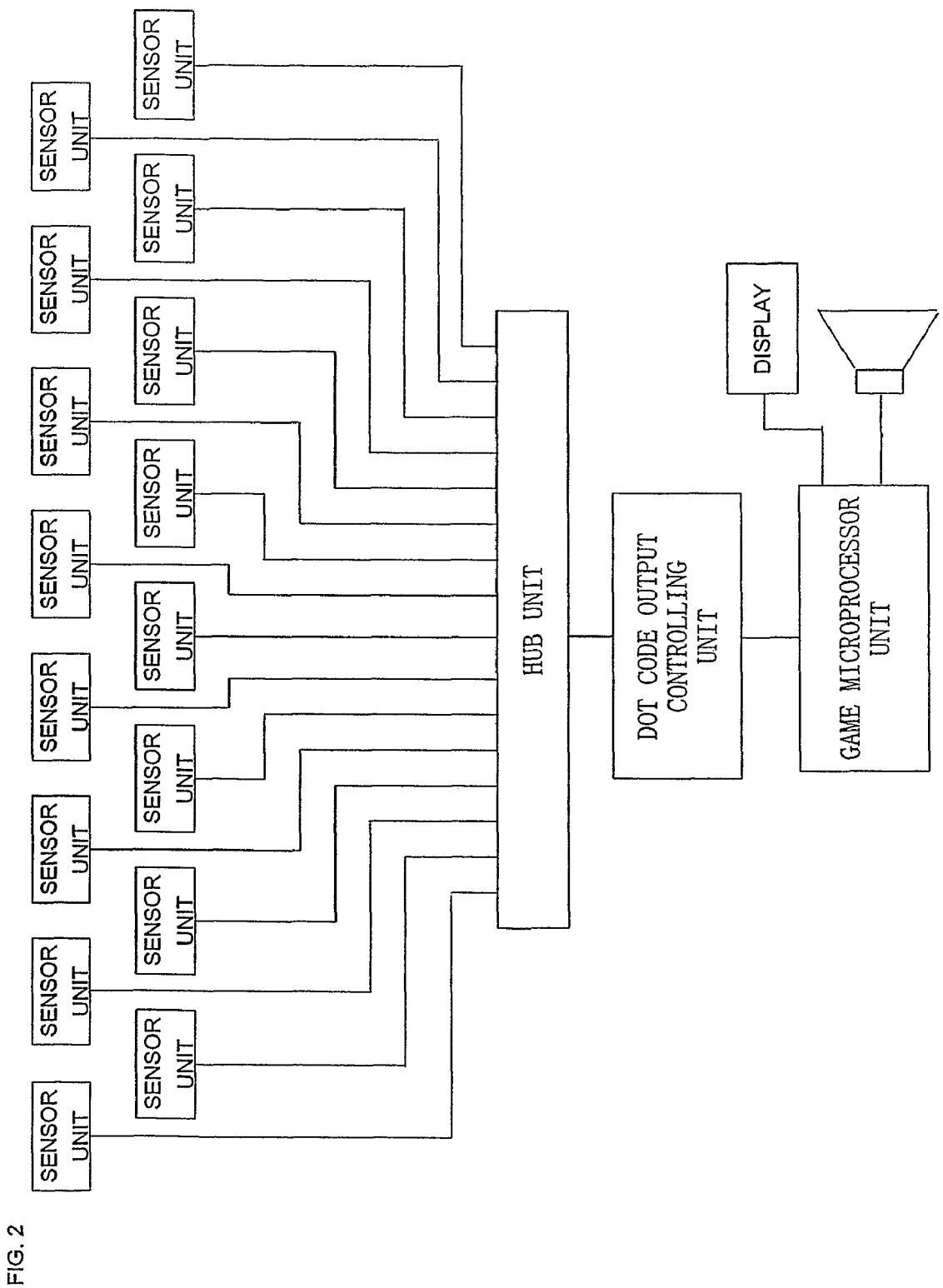
FIG. 2 is a block diagram illustrating a system structure of a card game machine.

FIG. 2 is a block diagram illustrating an example of an inner structure of the card game machine, which illustrates a state in which essential elements of the card game machine are connected to one another through the HuB unit.

As described above, in the card game machine, the sixteen sensor units are provided. These sixteen sensor units are connected to one another through a cable. The cable is connected to the dot code output controlling unit through the HuB unit. Further, the dot code output controlling unit is connected to the game microprocessor unit, and the game microprocessor unit is connected to the display and the speaker.

Figure 3:
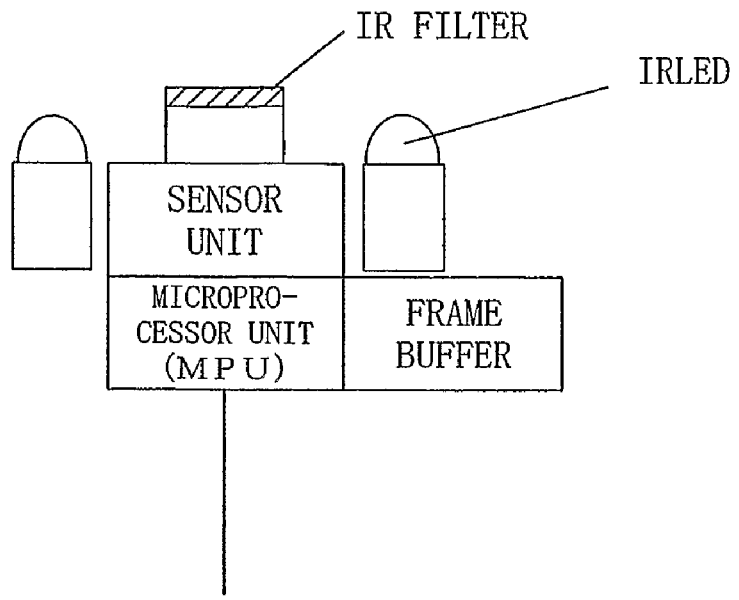
FIG. 3 is a block diagram illustrating a system structure of a sensor unit.
Figure 4:
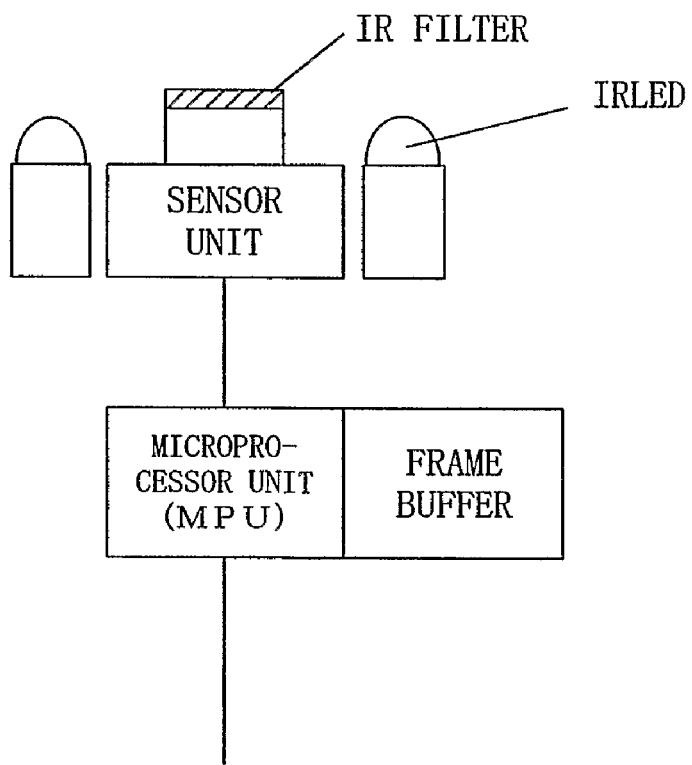
FIG. 4 is a block diagram illustrating a system structure of a sensor unit.

FIGS. 3 and 4 are block diagrams illustrating a structure of the sensor unit.

FIG. 3 is a diagram illustrating a case in which the sensor and a microprocessor unit (MPU) are provided in the sensor unit.

A lens is provided on the sensor, and an IR filter is mounted on the top surface of the lens. Further, LEDs are respectively provided at left and right sides of the sensor. The microprocessor unit (MPU) and a frame buffer are provided below the sensor. An image obtained by the sensor is processed by the microprocessor unit (MPU) attached to the sensor. The IR filter has optical characteristic that transmits only an infrared wavelength (of 700 nm or more).

FIG. 4 is a diagram illustrating a case in which only the sensor is provided in the sensor unit.

The lens is provided on the sensor, and the IR filter is mounted on the top surface of the lens. Further, LEDs are respectively provided at left and right sides of the sensor. The image obtained by the sensor is processed by the microprocessor unit (MPU).

Figure 5:
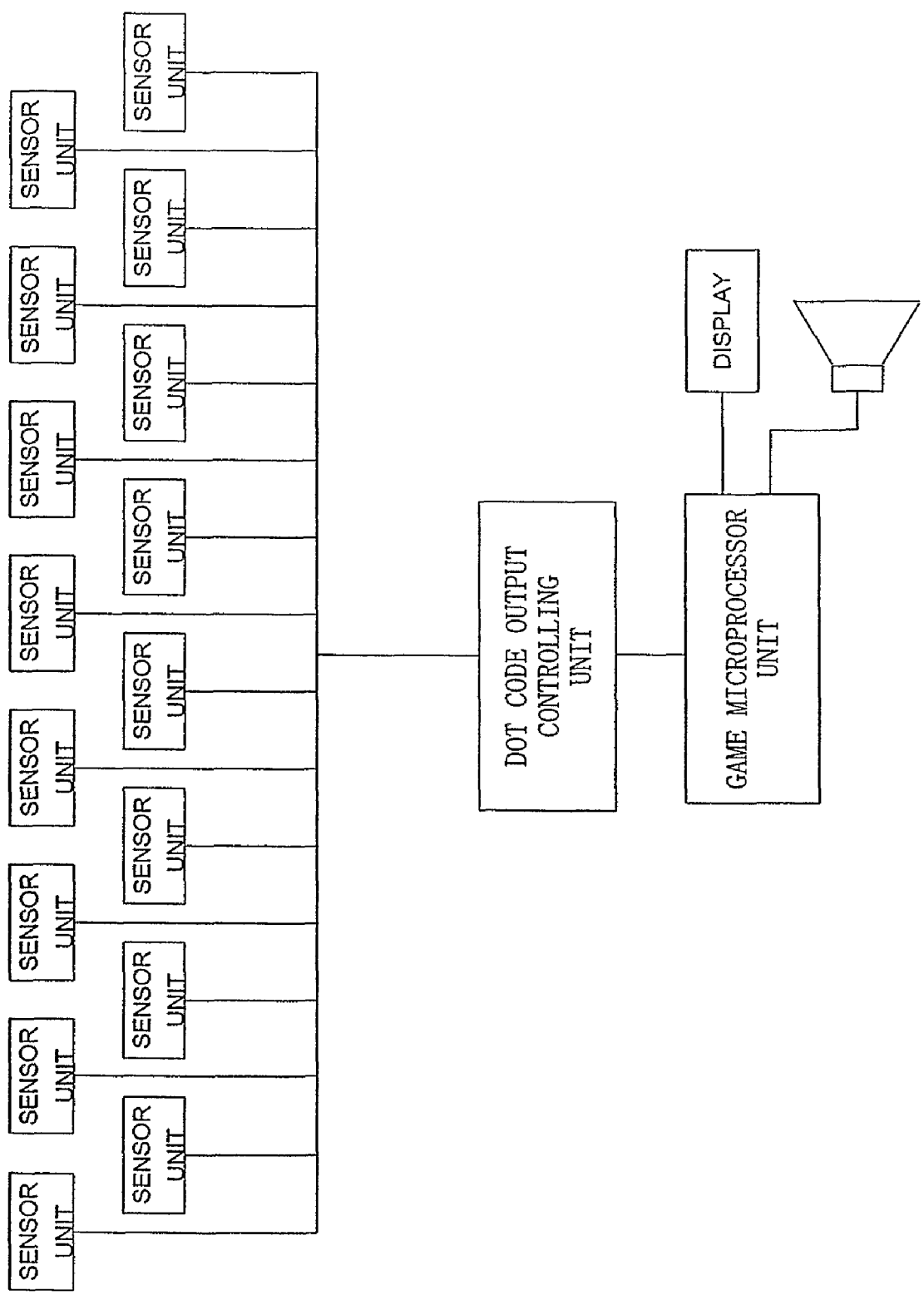
FIG. 5 is a block diagram illustrating another example of a system structure of a card game machine of the invention.

FIG. 5 is a block diagram illustrating another example of an inner structure of the card game machine, which illustrates a state in which essential elements of the card game machine are connected to one another through the LAN. Each of sixteen sensor units is connected to the dot code output controlling unit through a LAN cable. Further, the dot code output controlling unit is connected to the game microprocessor unit, which is connected to the display and the speaker.

FIGS. 6 and 7 are diagrams illustrating a card arrangement panel that is provided on the card game machine. As structures of the card arrangement panel, examples shown in FIGS. 6A to 7C are considered.

FIGS. 6A and 6C are diagrams illustrating the card arrangement panel when viewed from an upper side, and FIG. 6B is a longitudinal cross-sectional view illustrating an enlarged sectional structure of the card arrangement panel in FIG. 6A.

The sensor units (infrared ray irradiating unit) in the card game machine emit infrared light, and form card reading portions at a plurality of predetermined portions of the card arrangement panel (stage surface), when viewed from the top surface, as shown in FIG. 6A. The cards serving as media are disposed on the card reading portions in a state in which the surfaces of the cards where the dot patterns are formed face the card arrangement panel (stage surface), and then a game is performed.

As shown in FIG. 6B, the card arrangement panel forms a laminated structure in which a plurality of inks are applied onto the top surface of a transparent glass plate. A white ink is applied to the top surface of the glass plate. Further, CMYK inks that do not contain carbon are applied on the white ink.

By applying the white ink to the top surface of the glass plate, it can be prevented that the surface of the card arrangement panel becomes black, and thus it is difficult for contents printed by non-carbon inks to be viewed.

FIG. 6C is a diagram illustrating a case in which inks used in printing are different at the card reading portions and the peripheral portions of the card reading portions, and the other portions. That is, in the card reading portions and the peripheral portions thereof, printing is performed by using only CMY inks that do not contain carbon. In the portions other than the peripheral portions of the card reading portions, printing is performed by using the CMY inks that do not contain carbon and a K ink that contains carbon.

In this case, among general inks widely used in printing, the CMY inks are non-carbon inks that do not contain a carbon component, and the K ink is a carbon ink that contains a carbon component. The carbon has characteristic that absorbs infrared rays. Therefore, in a case in which inks containing carbon are used in printing of portions other than the dot patterns, when the infrared rays are irradiated onto the printing surface, the discrimination with the dot patterns may be difficult. In order to avoid this problem, it is preferable that the K ink also do not contain carbon. However, since the K ink that does not contain carbon is very expensive, a printing cost may be increased in a card for play requiring a low price.

Accordingly, in the present embodiment, in the card arrangement panel (stage surface), only the card reading portions are printed by using the CMY inks of non-carbon components, and the other portions are printed by using the CMY inks of non-carbon components and the K ink of a carbon component. Therefore, the K component at the card reading portion represents K falsely by the CMY inks of the non-carbon components.

As such, it is possible to achieve a structure in which the card arrangement panel (stage surface) can selectively transmit an infrared ray by using only general-purpose inks (CMY inks of non-carbon components and a K ink of a carbon component). In this case, if an infrared ray component of external light is permeated into the card arrangement panel, it may cause a noise when the dot patterns are read. However, in the present embodiment, the substantially entire surface of the stage surface is made to have an infrared ray non-transmission property and only the reading regions are made to have an infrared ray transmitting property, such that the noise can be reduced.

Further, the color tone in the portions where printing is performed by using only the CMY inks of non-carbon components becomes brighter than the color tone in the portions where printing is performed by using the CMY inks of the non-carbon components and the K ink of the carbon component. For this reason, in the card reading portion where the irradiated light needs to be irradiated, since the color tone is dark, it is possible to avoid light from being not sufficiently irradiated onto the card reading portions.

In the present embodiment, not only a glass plate but also another transparent plate made of acrylic or the like may be used.

Further, in the present embodiment, it is possible to use a structure in which holes are formed in portions where light is irradiated by the sensors of the card arrangement panel so as to be used as reading holes, and the reading holes are covered with a glass plate so as to prevent dusts from being entered. In this case, when a player puts cards on the card arrangement panel, since the reading holes are completely closed, the IR filter on the sensor does not need to be provided.

FIG. 7 is a diagram illustrating a case in which the IR filter is provided on a glass plate. FIG. 7A is a diagram illustrating the card arrangement panel when viewed from the upper side, and FIGS. 7B and 7C are longitudinal cross-sectional views illustrating an enlarged sectional structure of the card arrangement panel.

As shown in FIG. 7B, the IR filter is laminated on the bottom surface of the glass plate. By using the IR filter, it can be prevented that the card arrangement panel becomes dark, and inner elements, such as sensors, are viewed by a player.

As such, when the IR filter is mounted on the card arrangement panel (stage surface), since a player cannot view an inner portion of the card arrangement panel, visual quality of the card arrangement panel cannot be improved. However, when the player performs a card game, since it is difficult for the player to view the card reading portions, the player cannot determine locations where the cards should be arranged on the card arrangement panel. For this reason, in a structure shown in FIG. 7A, card arrangement location marks are provided such that the player can know locations where cards should be arranged.

In the invention, not only a glass plate but also another transparent plate made of acrylic or the like may be used as the card arrangement panel. Further, instead of the IR filter, a color filter may be used. Since the color filter cannot be obtained at a lower cost than the IR filter, it is possible to reduce the manufacture cost. Further, when the color filter is used, the IR filter provided on the sensor does not need to be provided, as shown in FIGS. 3 and 4.

FIG. 7C is a diagram illustrating a case in which an IR filter is provided below a portion of the glass plate that corresponds to the card reading portion, and black filters are mounted on the other portions. By using this structure, the IR filter does not need to be provided at the side of the sensor unit (side of the imaging unit), and the cost can be reduced, as compared with a case in which the IR filters are disposed on an entire surface of a lower layer of the card arrangement panel.

Figure 8:
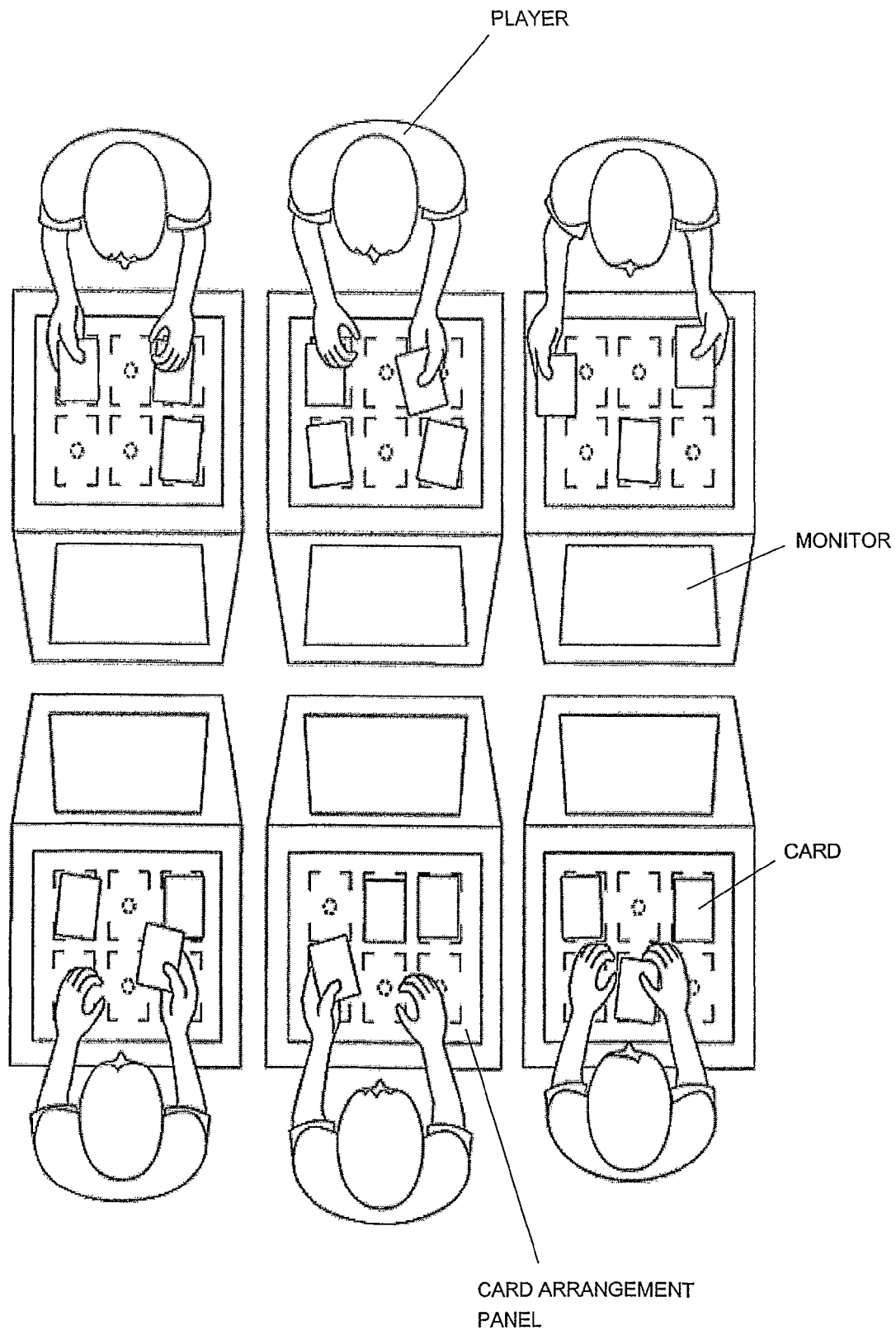
FIG. 8 is a diagram illustrating a state in which games are actually performed by using a plurality of card game machines.

FIG. 8 is a plan view illustrating a state in which a game is performed by using the card game machine according to the embodiment of the invention.

As shown in FIG. 8, a player stands or sits in front of the card arrangement panel of the card game machine, and a monitor is disposed at the front of the card arrangement panel when viewed from the player. Three pairs of combinations, each of which has a card arrangement panel and a monitor, and other three pairs of combinations, each of which has a card arrangement panel and a monitor, are disposed to be opposite to each other, and six people shares a card game machine of one unit.

That is, one player plays a game with any one of the other five people or the other five people, and cards held by the players are disposed on the card arrangement panel. In addition, in a state in which code values or coordinate values of dot patterns printed on the cards are used as parameters, a game is performed. Further, images or moving pictures for raising the game progress and result, or a stage effect are displayed on a monitor.

In FIG. 8, the six card arrangement panels and the six monitors form a game machine of one unit. However, the invention is not limited thereto.

Second Embodiment

Single Sensor Game Machine

FIGS. 9 to 39 are diagrams illustrating a card game machine according to a second embodiment of the invention.

Figure 9:
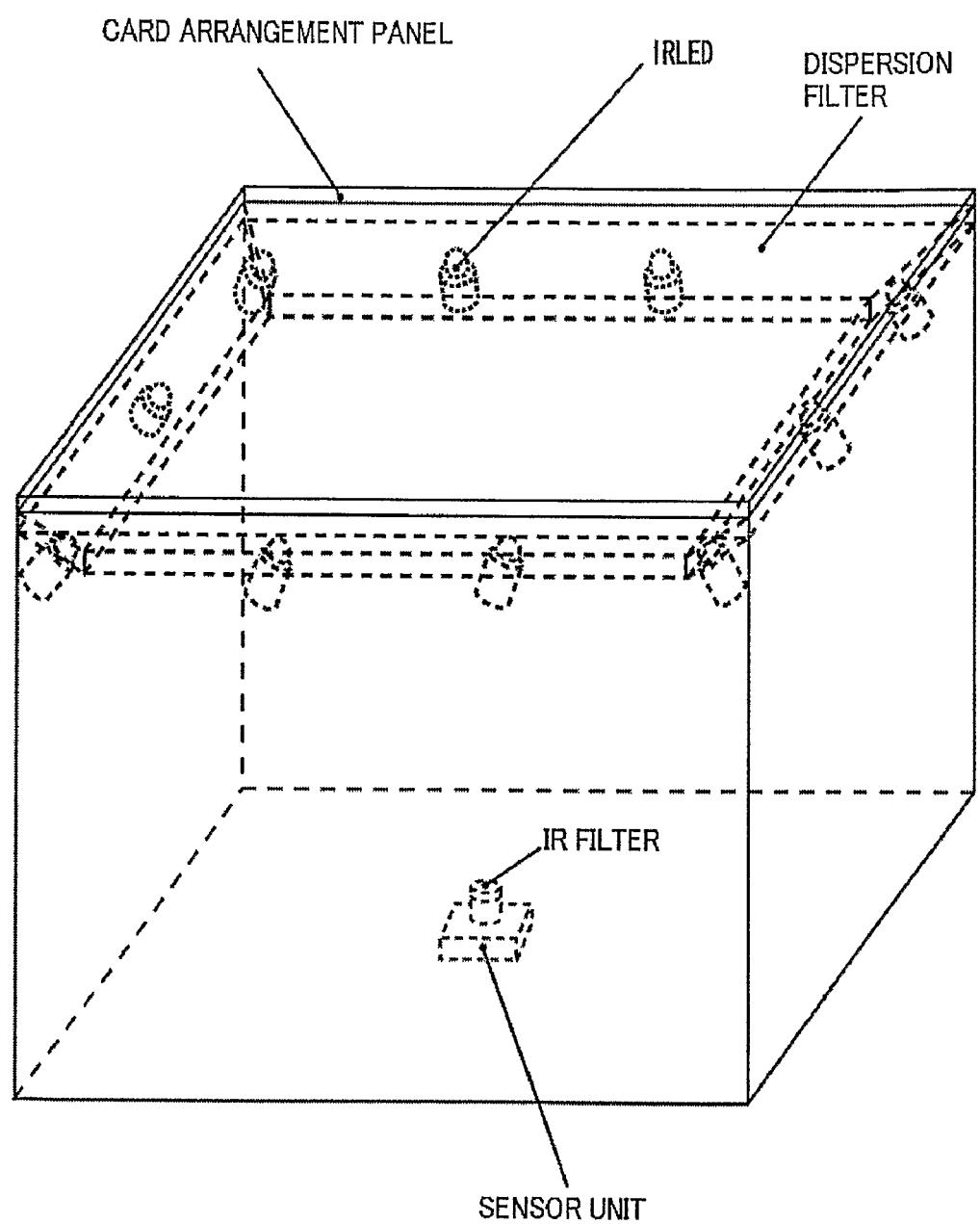
FIG. 9 is a perspective view illustrating a card gate machine according to a second embodiment of the invention.
Figure 10A:
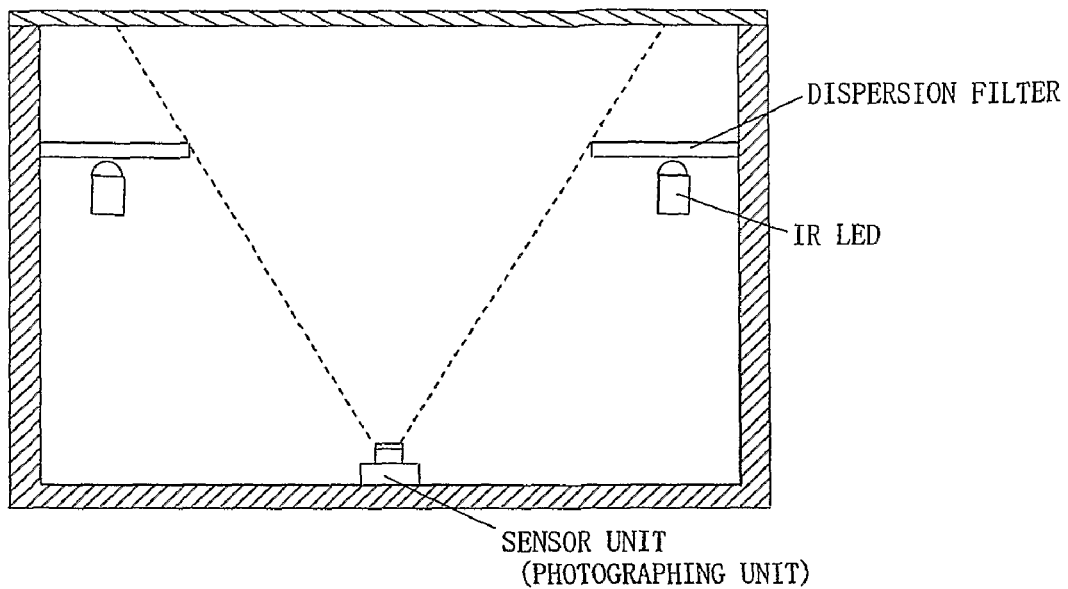
FIG. 10 is a longitudinal cross-sectional view illustrating a casing of a card game machine according to a second embodiment of the invention.
Figure 10B:
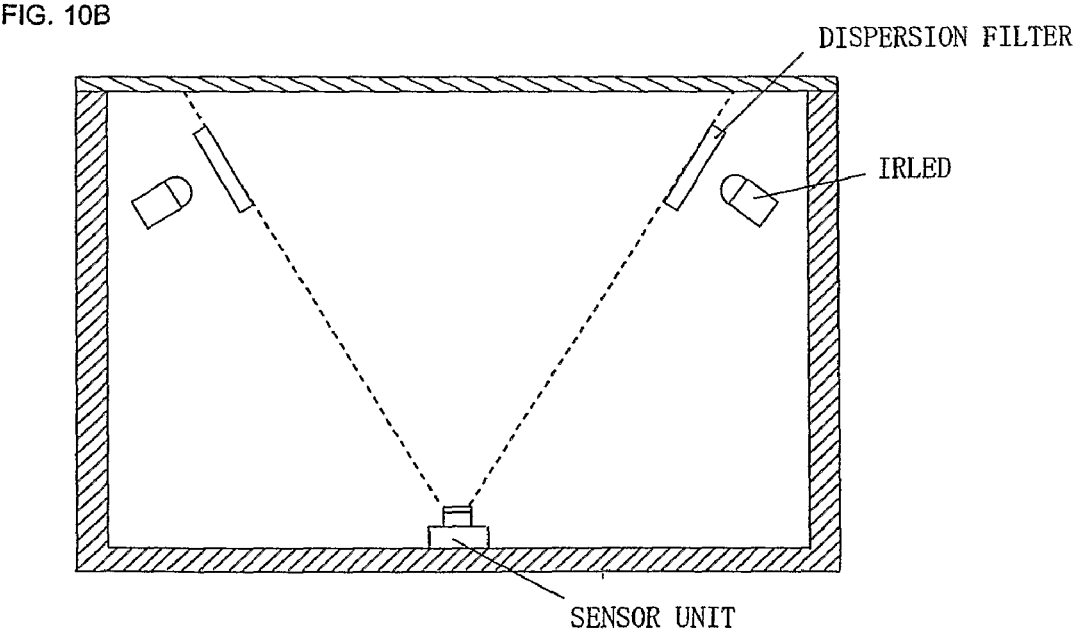

FIG. 9 is a perspective view illustrating an outer appearance of a card game machine, and FIGS. 10A and 10B are longitudinal cross-sectional views illustrating the card game machine.

The card game machine according to the present embodiment is constructed such that an entire bottom surface of the card arrangement panel is photographed by one sensor unit (imaging unit).

In the space of the bottom surface of the card arrangement panel (space below the stage), at locations where imaging light irradiated onto the panel surface (bottom surface of the stage) by the sensor unit (imaging unit) is avoided, IRLEDs (irradiation light sources) for irradiating irradiation light onto the dot pattern of the card surface (medium surface) on the panel surface (stage surface), and a dispersion filter for dispersing the irradiation light on the bottom surface of the panel (bottom surface of the stage) are provided.

The dispersion filter is provided in a frame plate shape such that it protrudes to the space of the bottom surface of the card arrangement panel from the sidewalls that constitute the casing of the card game machine. The dispersion filter is composed of a transparent or semi-transparent glass plate or a synthesis resin plate, and fine irregularities are formed on one surface of the dispersion filter. In addition, the irradiation light by the IRED is dispersed through the dispersion filter, so that the irradiation light can be irradiated onto the entire bottom surface of the card arrangement panel. Further, when the cards are disposed on the card arrangement panel, the irradiation light is irradiated onto the card surface, and then reflected light is photographed by a sensor unit (imaging unit).

FIG. 10A is a diagram illustrating a case in which a substantially horizontal frame-shaped dispersion filter is used, and FIG. 10B is a diagram illustrating a case in which a frame-shaped dispersion filter inclined to a space side is used. The dispersion filter shown in FIG. 10A can be easily processed and obtained at a low cost. Further, the dispersion filter shown in FIG. 10B is provided in an inclined direction so as to avoid imaging light from the bottom surface of the card arrangement panel to the sensor unit, and it is constructed such that irradiation light by the IRLED can be effectively irradiated onto the bottom surface of the card arrangement panel.

Figure 11:
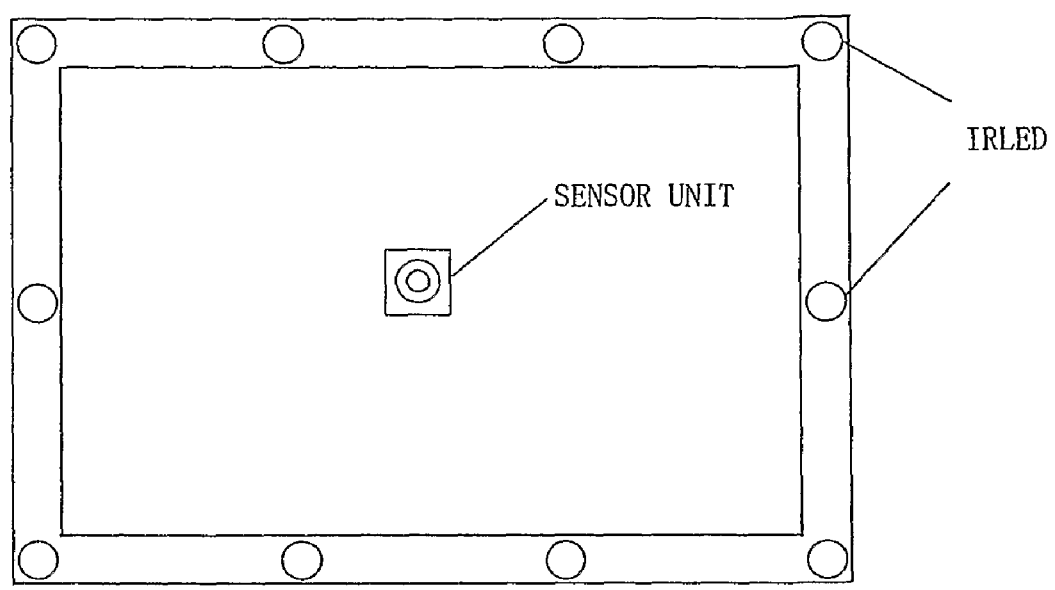
FIG. 11 is a plan view illustrating a card game machine according to a second embodiment of the invention when viewed from an upper side.

FIG. 11 is a plan view illustrating the card game machine shown in FIG. 9, when viewed from the upper side.

Figure 12:
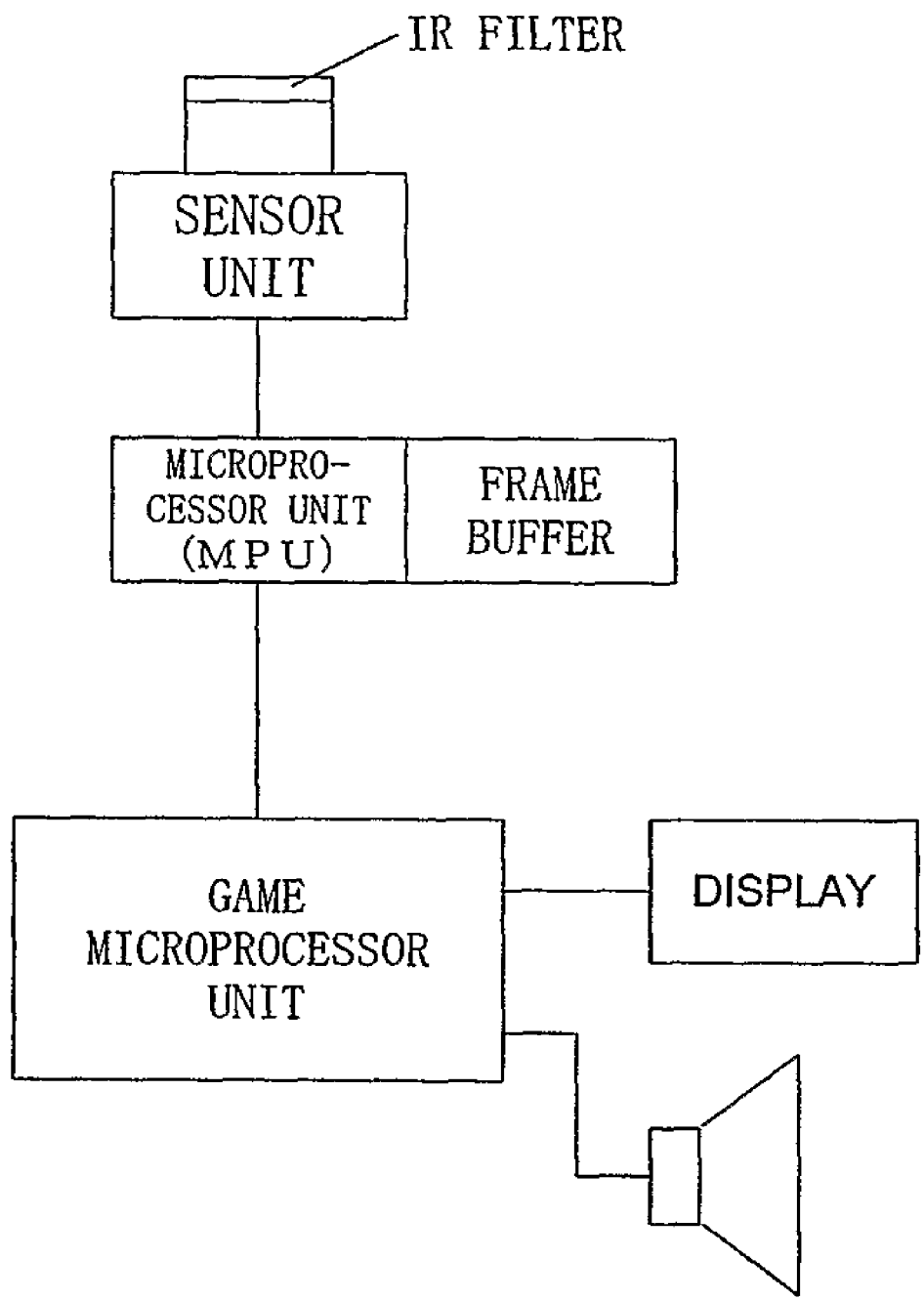
FIG. 12 is a block diagram illustrating a system structure of a card game machine.

FIG. 12 is a block diagram illustrating an inner structure of a card game machine in which a sensor unit and a microprocessor unit (MPU) are provided separately from each other.

In the card game machine, only one sensor unit is provided. The sensor unit is connected to the microprocessor unit (MPU) having a frame buffer through a cable. The microprocessor unit (MPU) is connected to the game microprocessor unit, and the game microprocessor unit is connected to the display and the speaker.

Figure 13:
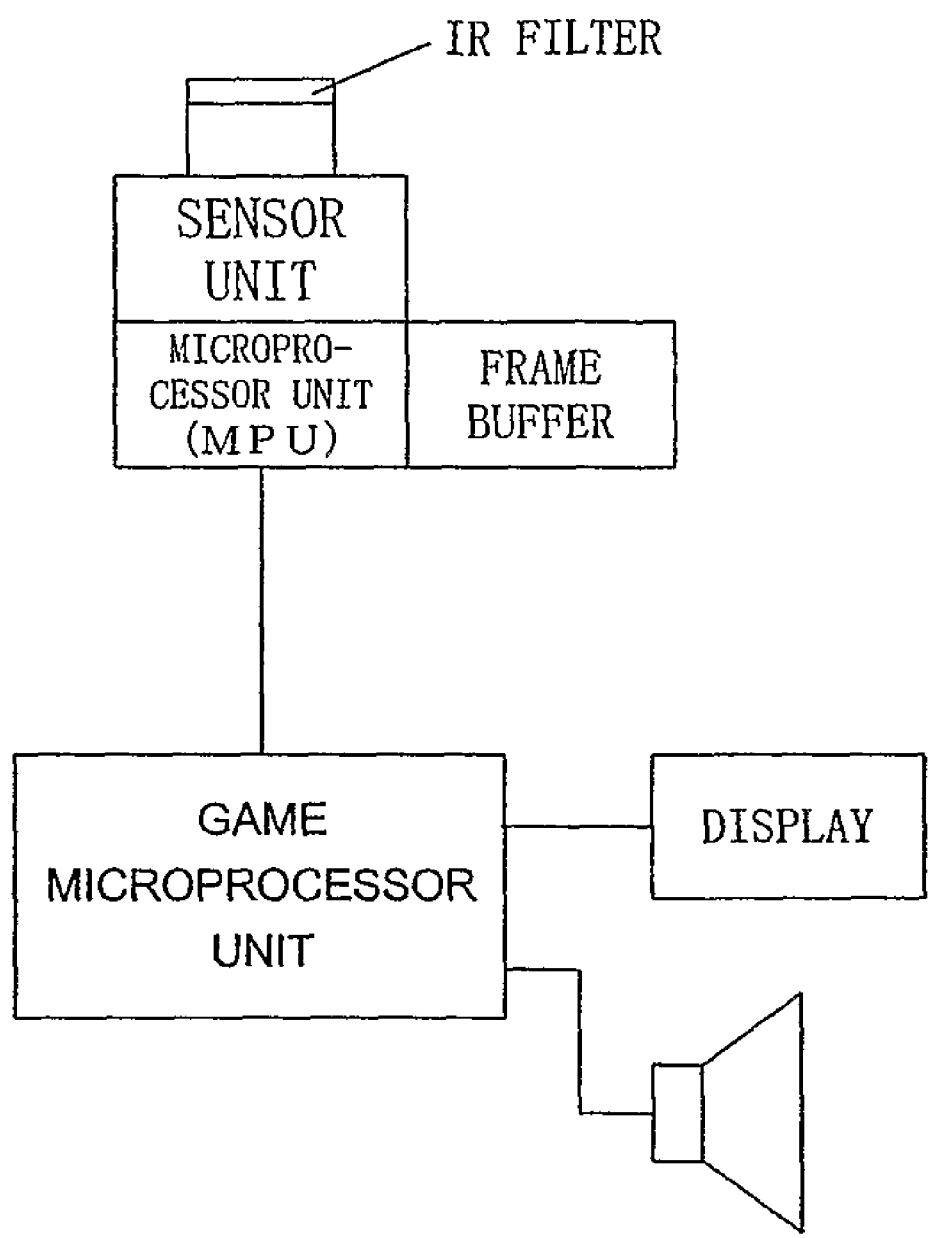
FIG. 13 is a block diagram illustrating a system structure of a card game machine.

The inner structure of the card game machine is not limited thereto. For example, as shown in FIG. 13, the microprocessor unit (MPU) having the frame buffer may be connected to the sensor unit, and the microprocessor unit (MPU) may be connected to the game microprocessor unit through the cable. As such, the sensor unit is directly connected to the microprocessor unit (MPU), and it is possible to process a signal outputted from the sensor at high speed.

FIGS. 14 and 15 are diagrams illustrating a card arrangement panel of the top surface of the card game machine.

Figure 14A:
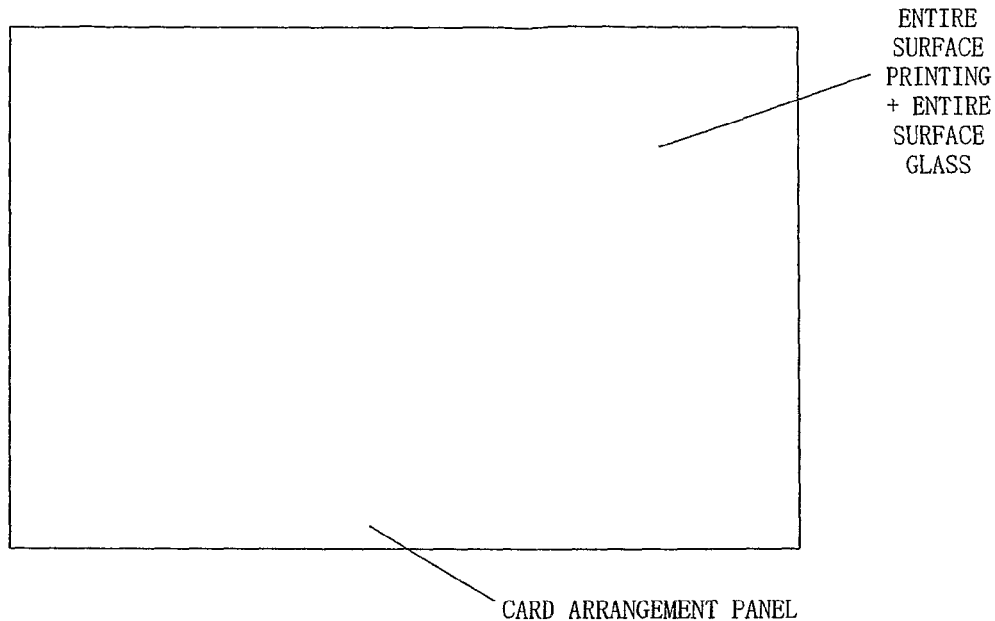
FIG. 14A is a diagram illustrating a card arrangement panel in which printing is performed on an entire top surface of the card arrangement panel, which illustrates a plan view of the card arrangement panel from an upper side.
Figure 14B:
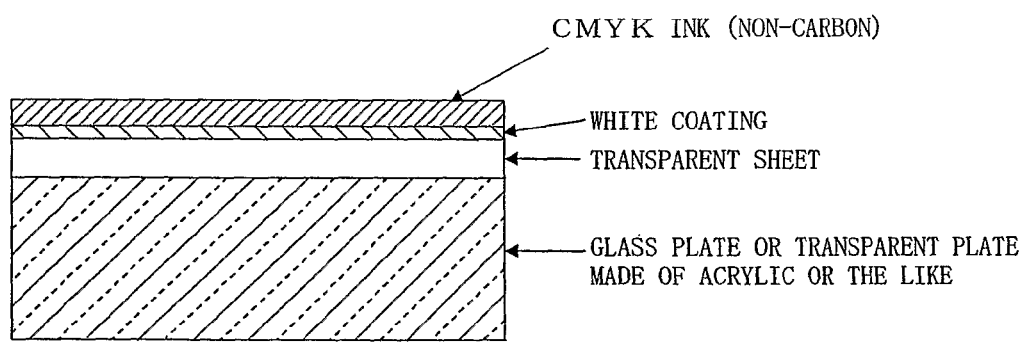
FIG. 14B is a diagram illustrating a card arrangement panel in which printing is performed on an entire top surface of the card arrangement panel, which illustrates a plan view of the card arrangement panel from an upper side.

FIG. 14 is a diagram illustrating a case in which printing is performed on a top surface of the glass plate, FIG. 14A is a diagram illustrating the card arrangement panel when viewed from the upper side, and FIG. 14B is a longitudinal cross-sectional view illustrating an enlarged sectional structure of the card arrangement panel.

As shown in FIG. 14B, the card arrangement panel forms a laminated structure in which a non-carbon ink is applied onto the top surface of the transparent glass plate. The white ink is applied onto the top surface of the glass plate. Further, CMYK inks that do not contain carbon are applied on the white ink.

By applying the white ink onto the top surface of the glass plate, it can be prevented that the surface of the card arrangement panel becomes black, and thus contents printed on paper that does not contain a carbon component cannot be viewed.

In the present embodiment, not only a glass plate but also another transparent plate made of acrylic or the like may be used.

Figure 15A:
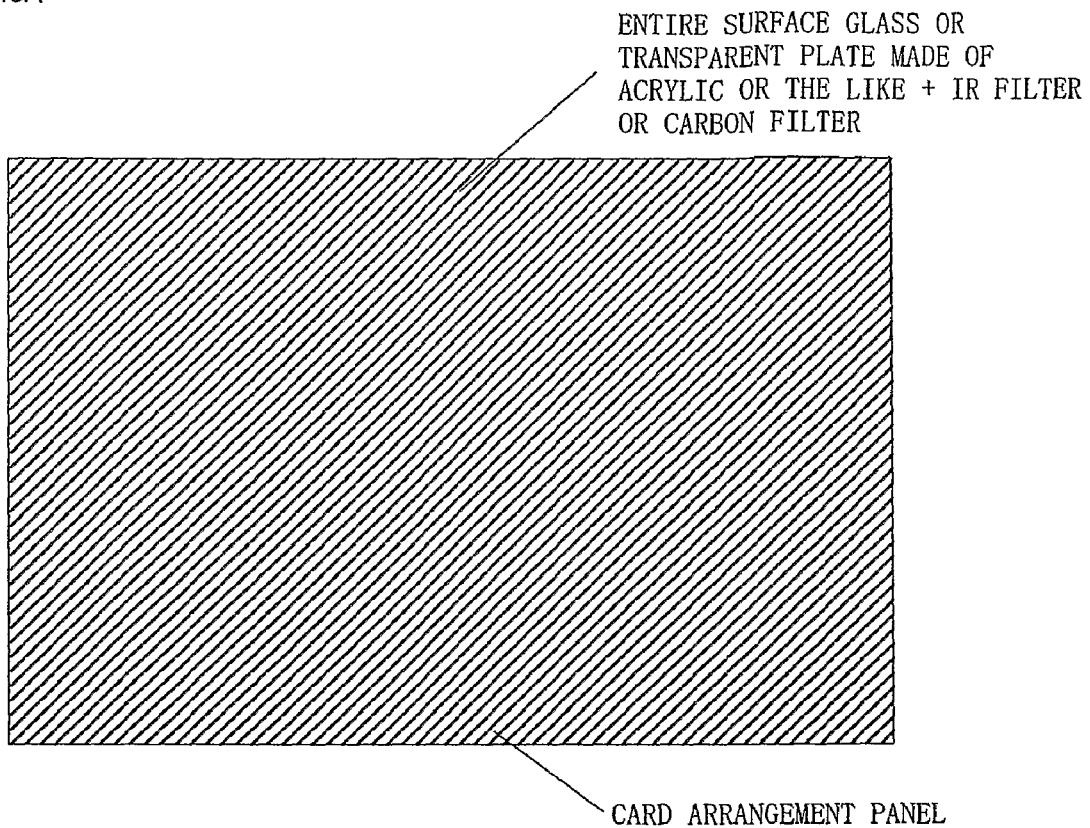
FIG. 15A is a diagram illustrating a card arrangement panel in which printing is performed on an entire top surface of the card arrangement panel, which illustrates a plan view of the card arrangement panel from an upper side.
Figure 15B:
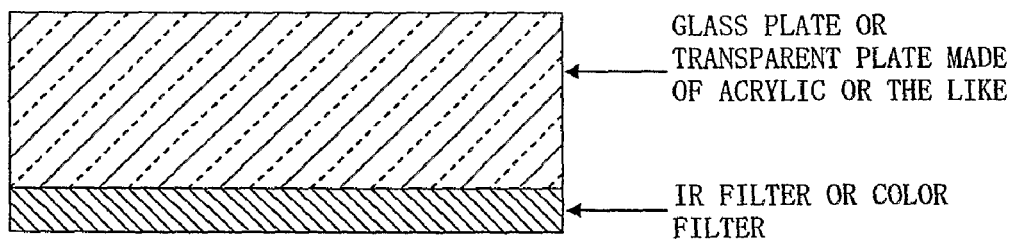
FIG. 15B is a diagram illustrating a card arrangement panel in which printing is performed on an entire top surface of the card arrangement panel, which illustrates a plan view of the card arrangement panel from an upper side.

FIGS. 15A and 15B are a plan view and a cross-sectional view illustrating a structure in which the IR filter is laminated on the glass plate in the card arrangement panel, respectively.

As shown in FIG. 15B, the IR filter is mounted on the bottom surface of the glass plate. By using the IR filter, it becomes difficult for external light to permeate into the space below the card arrangement panel (space below the stage) by the card arrangement panel provided on the lower layer of the glass plate. Therefore, it is possible to prevent the inner element, such as a sensor, from being viewed by the player.

In the card game machine according to the present embodiment, as shown in FIGS. 9 to 13, the entire surface of the card arrangement panel is photographed by one sensor unit (imaging unit). Therefore, the player can dispose the cards at any locations on the card arrangement panel. As a result, the card arrangement location mark shown in FIG. 7 does not need to be provided.

In the present embodiment, in the card arrangement panel, not only a glass plate but also another transparent plate made of acrylic or the like may be used.

Further, instead of the IR filter, a color filter may be used. Since the color filter can be obtained at a lower cost than the IR filter, the manufacture cost can be reduced. Further, when the color filter is used, the IR filter on the sensor does not need to be provided, as shown in FIGS. 12 and 13.

Further, the card arrangement panel is not limited to the example shown in FIGS. 14 and 15. For example, in another embodiment, printing may be performed on a portion of the top surface of the panel, and the IR filters may be mounted on the other portions.

Next, the dot patterns used in the invention will be described (see FIGS. 16 to 23).

Figure 16:
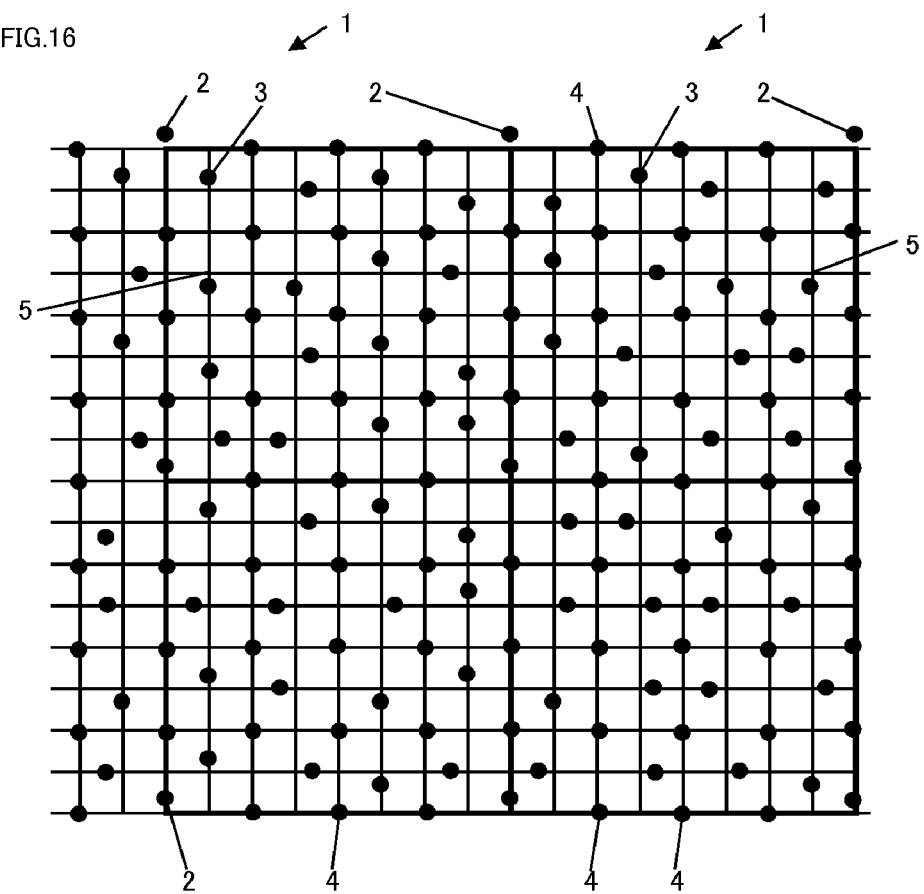
FIG. 16 is a diagram illustrating an example of a dot pattern.
Figure 17:
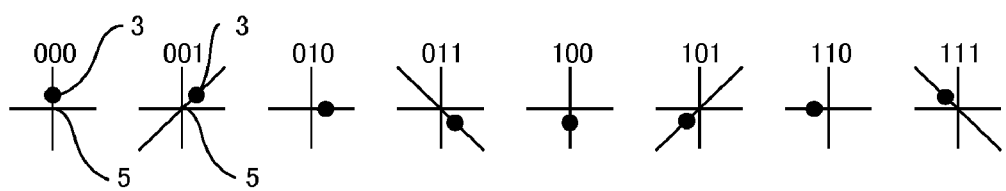
FIG. 17 is an enlarged view illustrating an example of an information dot of a dot pattern.
Figure 18A:
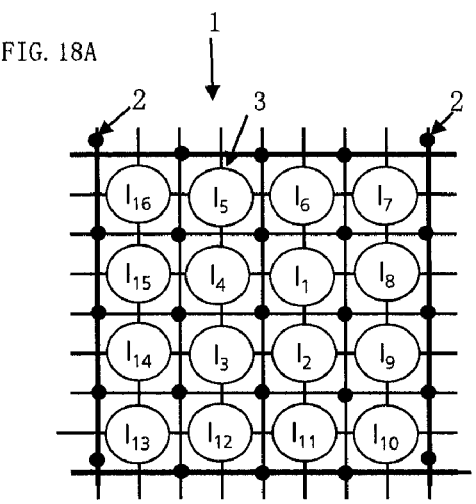
FIG. 18 is a diagram illustrating arrangement of an information dot.
Figure 18B:
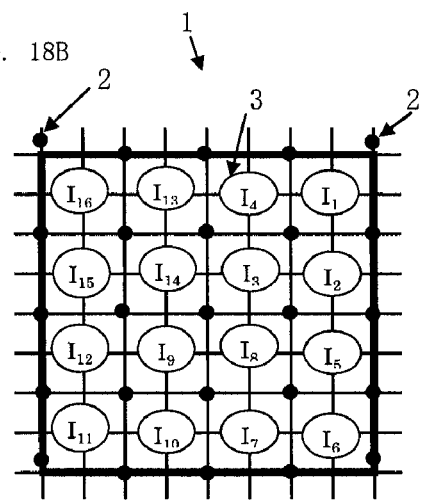

FIG. 16 is a diagram illustrating GRID1 that is an example of the dot pattern of the invention. FIG. 17 is an enlarged view illustrating an example of information dot of the dot pattern and the bit display of the data defined in the information dot of the dot pattern. FIGS. 18A and 18B are diagrams illustrating information dots that are disposed on the basis of key dots.

A method of inputting/outputting information using the dot pattern of the invention includes a creating process of creating the dot pattern 1, a recognizing process of recognizing the dot pattern 1, and an output process of outputting information and a program from the dot pattern 1. That is, the dot pattern 1 is obtained as image data by using the camera. First, a reference matrix point dot 4 is extracted, then the dot is not formed at the location where the original reference lattice point dot 4 exists such that the key dot 2 is extracted, and then the information dot 3 is extracted to be digitized and the information region is extracted such that information is digitized. Then, by using the digitized information, the information and the program are allowed to be outputted from the dot pattern 1. For example, the information, such as sounds, or a program from the dot pattern 1 is outputted to an information output device, a personal computer, a PDA or a cellular phone.

In the creating of the dot pattern 1 of the invention, in order to recognize the information such as sounds by the dot code creating algorithm, minute dots, that is, a key dot, an information dot, and a reference lattice point dot 4 are arranged according to a predetermined rule. As shown in FIG. 1, in a block of the dot pattern 1 indicating information, reference lattice point dots 4 of 5×5 are arranged on the basis of a key dot 2, and information dots 3 are arranged around a virtual lattice point 5 of the center surrounded by the reference lattice point dot 4 of the four points. In the block, any numerical information is defined. In an example shown in FIG. 1, the four blocks of the dot patterns 1 (in frames shown by thick lines) are disposed parallel to one another. However, the number of the blocks of the dot patterns 1 is not limited to the four.

One corresponding information and program may be outputted to the one block or one corresponding information and program may be outputted to a plurality of blocks.

When the dot patterns 1 are obtained as image data by using the camera, the reference lattice point dots 4 can correct distortion of the camera lens or photographing from an inclined direction, expansion and contraction of paper, curvature of a medium surface, and distortion at the time of printing. Specifically, a correction function for converting the reference lattice point dots 4 of the distorted four points into an original square shape, that is, the function $(X_n, Y_n)=f(X_n', Y_n')$ is calculated, the information dots 3 are corrected by the same function, and a vector of the correct information dots 3 are obtained.

If the reference lattice point dots 4 are arranged in the dot pattern 1, in the image data that is obtained by photographing the dot pattern 1 using a camera, distortion due to the camera can be corrected. Therefore, even when the image data of the dot pattern 1 is obtained by the general-purpose-type camera to which a lens having a large distortion rate is attached, the dot pattern can be accurately recognized. Further, even when the dot pattern 1 is photographed by the camera in a state in which the camera is inclined with respect to the surface of the dot pattern 1, the dot pattern 1 can be accurately recognized.

As shown in FIG. 16, the key dots 2 are dots obtained by shifting four reference lattice point dots 4 located at four corners of the block in a predetermined direction. The key dot 2 is a representative point of the dot pattern 1 corresponding to one block indicating the information dots 3. For example, the key dots 2 are obtained by shifting the four reference lattice point dots 4 located at four corners of the block of the dot pattern 1 upward by 0.1 mm. When the information dots 3 indicate X and Y coordinate values, the locations where the key dots 2 are shifted downward by 0.1 mm become coordinate points. However, the numerical values are not limited thereto, and they may be varied according to a size of the block of the dot pattern 1.

The information dots 3 are dots that make a variety of information recognized. The information dots 3 are located at the peripheral portions of the key dot while using the key dot 2 as a representative point. The center surrounded by the four reference lattice point dots 4 is used as the virtual lattice point 5, and the information dot is disposed at an end point represented by the vector while using the virtual lattice point as the starting point. For example, the information dots 3 are surrounded by the reference lattice point dots 4. As shown in FIG. 17, since the dots that are spaced apart from the virtual lattice point 5 by 0.1 mm have directions and lengths represented by the vector, the dots are disposed in eight directions by rotating them in a clockwise direction by 45 degrees, and each of the dots represents three bits. Accordingly, 3 bits×16=48 bits can be represented in the dot pattern 1 of one block.

Further, the dots are disposed in eight directions, and each of the dots represents three bits, but the invention is not limited thereto. The dots may be disposed in sixteen directions and each of the dots may represent four bits. That is, various modifications may be made.

The diameter of each of the key dot 2, the information dot 3 or the reference lattice point dot 4 is preferably 0.05 mm, when considering the visual quality, precision of printing with respect to the paper quality, a resolution of the camera, and optimal digitization.

Further, when considering a necessary information amount with respect to the photographed area and the error of various dots 2, 3, and 4, the intervals between the reference lattice point dots 4 are preferably about 0.5 mm in each of longitudinal and horizontal directions. When considering the errors of the reference lattice point dot 4 and the information dot 3, the deviation of the key dot 2 is preferably about 20% of the lattice interval.

The interval between the information dot 3 and the virtual lattice point surrounded by the four reference lattice point dots 4 is preferably within a range of 15 to 30% of the distance between the adjacent virtual lattice points 5. If the distance between the information dot 3 and the virtual lattice point 5 is shorter than the interval, it is likely for the dots to be viewed as the large lump, and it may be visually undesirable as the dot pattern 1. In contrast, if the distance between the information dot 3 and the virtual lattice point 5 is longer than the interval, it is difficult to confirm whether it is the information dot 3 having vector directivity on the basis of any one of the adjacent virtual lattice points 5.

For example, as shown in FIG. 18A, in the information dots 3, the lattice interval at which the $I_1$ to $I_{16}$ are disposed in a clockwise direction from the center of the block on the basis of the key dot is 0.5 mm, and the information dots 3 represent 3 bits×16=48 bits in a matrix of 2 mm×2 mm.

Further, the sub-blocks, each of which has individual information content and does not affect the other information contents, may be additionally provided in a block, which is shown in FIG. 18B. Each of the sub-blocks [$I_1$, $I_2$, $I_3$, and $I_4$], [$I_5$, $I_6$, $I_7$, and $I_8$], [$I_9$, $I_{10}$, $I_{11}$, and $I_{12}$], and [$I_{13}$, $I_{14}$, $I_{15}$, and $I_{16}$] has four information dots 3. Each of the sub-blocks is constructed that each independent data (3 bits×4=12 bits) is expanded in the information dots 3. As such, the sub-blocks are provided, and error checking can be performed in a unit of a sub-block.

It is preferable that a vector direction (rotation direction) of the information dot 3 be uniformly set at intervals of 30 to 90 degrees.

Figure 19:
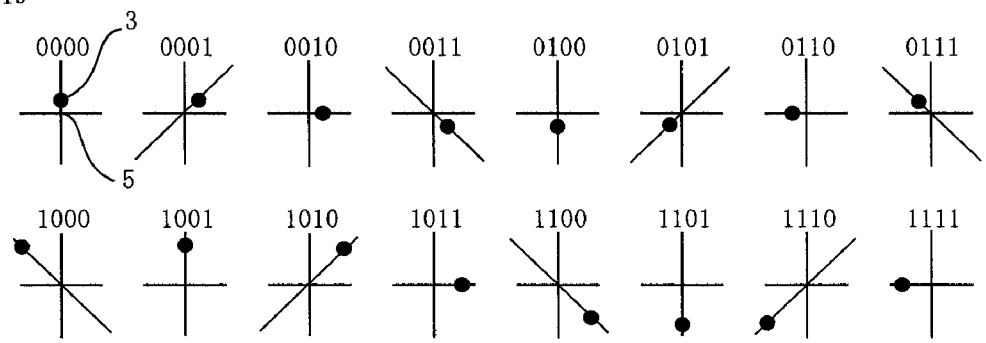
FIG. 19 is a diagram illustrating an example of an information dot and bit display of data defined therefrom.

FIG. 19 is a diagram illustrating an example of the information dot 3 and the bit display of the data defined in the information dot 3, which illustrates another form.

Further, in a case in which two kinds of information dots 3, that is, information dots 3 that the distance between the information dots 3 and the virtual lattice point 5 surrounded by the reference lattice point dots 4 is short, and information dots 3 that the distance between the information dots 3 and the virtual lattice point 5 is long are used, and the vector directions are set to eight directions, each of the information dots 3 can represent four bits. At this time, the interval of the information dots that the distance between the information dots and the virtual lattice point is long is within a range of 25 to 30% of the distance between adjacent virtual lattice points 5, and the interval of the information dots that the distance between the information dots and the virtual lattice point is short is within a range of 15 to 20% of the distance between adjacent virtual lattice points 5. However, the center interval between the two kinds of dots 3 is preferably larger than the diameter of the dot.

It is preferable that the information dot 3 surrounded by the four reference lattice point dots 4 represent one bit in consideration of the visual quality. However, in order for a large amount of information to be represented without considering the visual quality, one bit is assigned to each vector such that the information dots 3 represent the plurality of bits. As a result, a large amount of information can be represented. For example, in the vectors of eight directions of a concentric circle, information of $2^8$ bits can be represented by the information dot 3 that is surrounded by the four lattice dots 4. The sixteen information dots of one block represent information of $2^{128}$ bits.

FIG. 20 is a diagram illustrating an example of an information dot and bit display of the data defined in the information dot. FIG. 20A shows a case in which two bits are disposed, FIG. 20B shows a case in which four bits are displayed, and FIG. 20C shows a case in which five bits are disposed.

FIGS. 21A to 21D are diagrams illustrating a modification of the dot pattern. FIG. 21A is a diagram schematically illustrating an example in which six information dots are arranged, FIG. 21B is a diagram schematically illustrating an example in which nine information dots are arranged, FIG. 21C is a diagram schematically illustrating an example in which twelve information dots are arranged, and FIG. 21D is a diagram schematically illustrating an example in which thirty six information dots are arranged.

In the dot pattern 1 shown in FIGS. 16 and 18, sixteen (4×4) information dots 3 are arranged in one block. However, the number of the information dots 3 arranged in one block is not limited to the sixteen, and various modifications can be made. For example, in accordance with the size of the necessary information amount or the resolution of the camera, the number of the information dots 3 arranged in one block may be 6 (2×3) (corresponding to FIG. 21A), the number of information dots 3 arranged in one block may be 9 (3×3) (corresponding to FIG. 21B), the number of the information dots 3 arranged in one block may be 12 (3×4) (corresponding to FIG. 21C), and the number of the information dots 3 arranged in one block may be 36 (6×6) (corresponding to FIG. 21D).

Figure 22A:
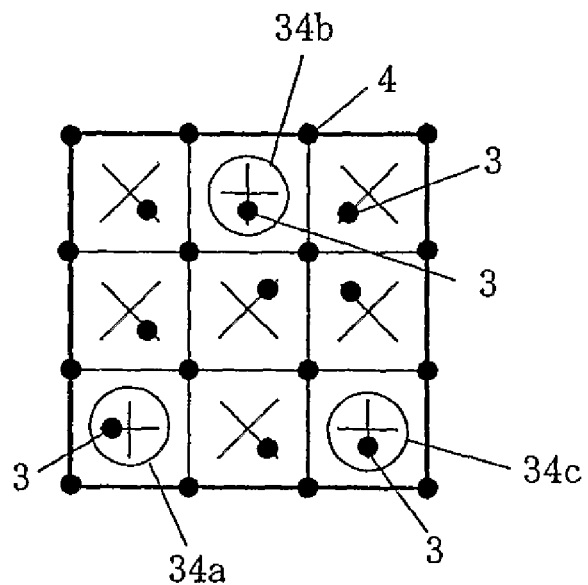
FIG. 22 is a diagram illustrating a case in which a specification of information dot arrangement is changed to define a block direction, in dot patterns shown in FIGS. 16 to 21.
Figure 22B:
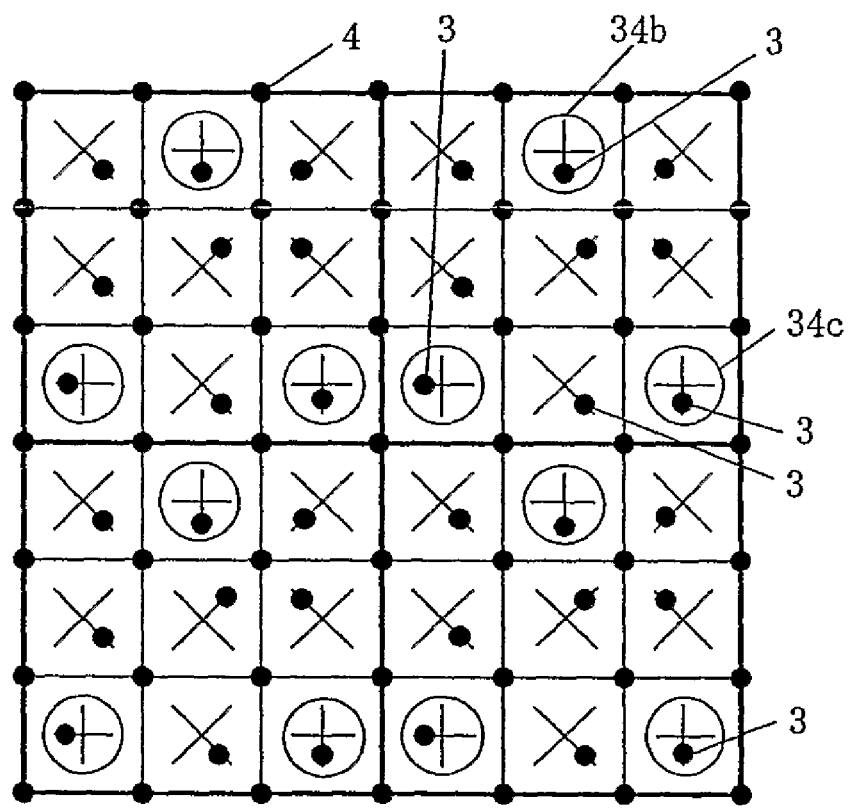

FIGS. 22A and 22B are diagrams illustrating a case in which in the dot patterns shown in FIGS. 16 to 21D, in the dot patterns of the block composed of nine lattice regions of 3×3, the arrangement directions of the information dots 3 are varied in only the specific lattice regions (direction regions), as compared with to the other lattice regions (direction regions), and the block direction is defined.

That is, in FIG. 22A, in the lattice region 34a of the lower left, the lattice region 34b of the center, and the lattice region 34c of the lower right, the information dots 3 are disposed in longitudinal and horizontal directions from the center, and the information dots 3 are disposed in an oblique direction from the center in the other lattice regions. As such, by arranging the lattice regions 34a, 34b, and 34c, from a shape of the triangle that couples the lattice regions with one another, that is, the relationship of the top 34b with respect to the bottom sides 34a and 34c, it can be recognized that the block is upward.

As such, the direction of the block can be defined from the arrangement relationship (in this case, the triangle) of the lattice regions 34a, 34b, and 34c that have changed the arrangement direction of the information dots 3 in the block (have arranged the information dots in longitudinal and horizontal directions from the center). Thereby, since the information dots 3 can be arranged in all the lattice regions in the block, the information dots 3 can be arranged in all the lattice regions without sacrificing the lattice region for defining the direction of the block.

Figure 23A:
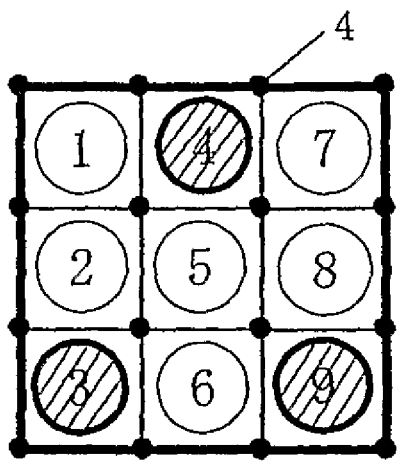
FIG. 23 is a diagram illustrating a case in which a specification of information dot arrangement is changed to define a block direction, in dot patterns shown in FIGS. 16 to 21, which illustrates arrangement of information bit.
Figure 23B:
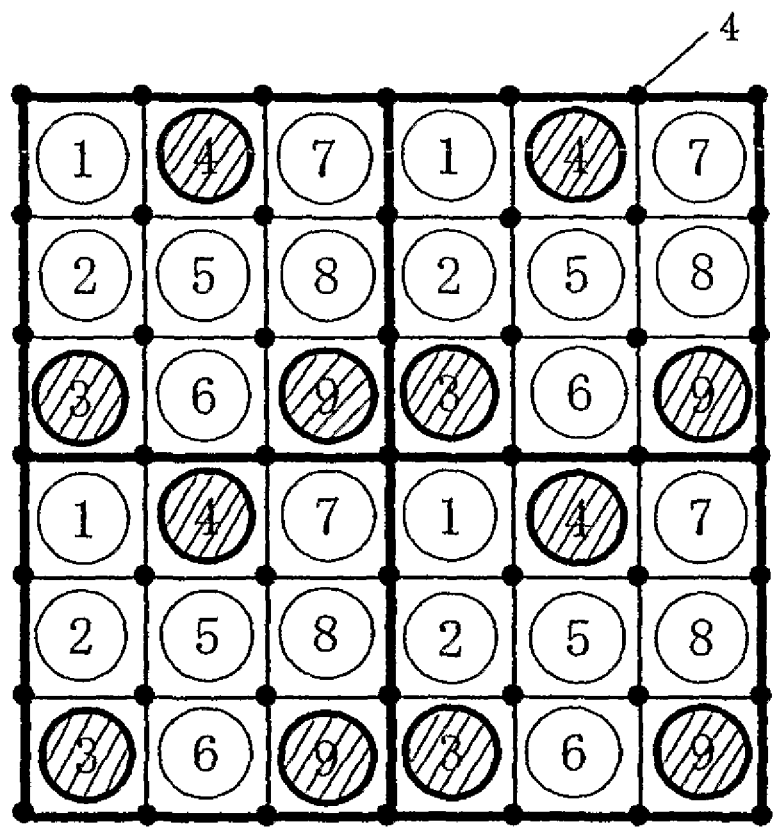

FIG. 23B is a diagram illustrating a case in which the blocks shown in FIG. 23A are coupled with one another two by two in longitudinal and horizontal directions.

In a case in which only one dot pattern is printed on the back surface of the card, it is preferable that the distance between the lattices be about 15 mm, and the size of the dot be about 15% of the distance between the dots. That is, the dot size is preferably 2 to 2.5 mm, but the invention is not limited thereto. The distance between the dots of the captured image is preferably 14 pixels or more.

FIGS. 24 to 27 are diagrams illustrating the cards used in the invention and the movement of the cards. FIGS. 24 and 25 are diagrams illustrating cards that are used when the game is performed by using the card game machine shown in FIG. 1.

FIG. 24 is a diagram illustrating a case in which a plurality of codes are printed in one card.

The card surface (medium surface) of the card (medium) is divided into four regions, and dot patterns indicating different code values are printed in the four regions. As such, four kinds of different information can be contained in one card. In this case, if the player moves the cards on the card reading panel (stage surface), since the region photographed by the sensor unit (imaging unit) is also varied, the parameter of the player is varied.

FIG. 24B is a diagram illustrating a case in which the player moves the card having the card surface divided into four regions, and thus the code read by the sensor unit and the direction of the card are varied. When the player firstly puts the card on the card panel surface, it is assumed that the region of the code 1 exists at the sensor reading location, and the angle between the vertical direction (y axis) of the card arrangement panel and the card is α. In addition, it is assumed that the player moves the card, and thus the region of the code 4 exists at the sensor reading location and the angle between the vertical direction of the card arrangement panel and the card is varied to α'. At this time, before the card moves, the sensor unit reads the code 1, and the dot code output controlling unit outputs information corresponding to the dot pattern of the code 1.

Further, after the card moves, the sensor unit reads the code 4, and the dot code output controlling unit outputs the information corresponding to the dot pattern of the code 4. In addition, the variation of the code and the variation of the angle before and after the cards moves become parameters, and the game can be varied. For example, even when the dot patterns are read in the order of a code 1→a code 4, the game results may be different from each other in the case of the angle α and in the case of the angle β (not shown).

In the card shown in FIG. 24C, xy coordinates for the dot code are defined. Thereby, the dot code and the location of the image of the dot pattern that is read by the sensor unit are recognized by the microprocessor unit (MPU) in the sensor unit. The recognized data is outputted from the display or the speaker through the game microprocessor unit. That is, when the card moves, the variation of the card location (xy coordinates) and the direction of the card can be read.

When the player firstly puts the card on the card arrangement panel, it is assumed that the coordinate value of the information dot read by the sensor unit at a predetermined reading location is (x, y), and the angle between the vertical direction of the card arrangement panel and the card is α. In addition, it is assumed that the player moves the card, and thus the coordinate value of the information dot at the card reading location becomes (x', y') and the angle between the vertical direction of the card arrangement panel and the card is varied to α'. In this case, the variation of the coordinate value and the variation of the angle before and after the card moves become parameters.

Figure 27A:
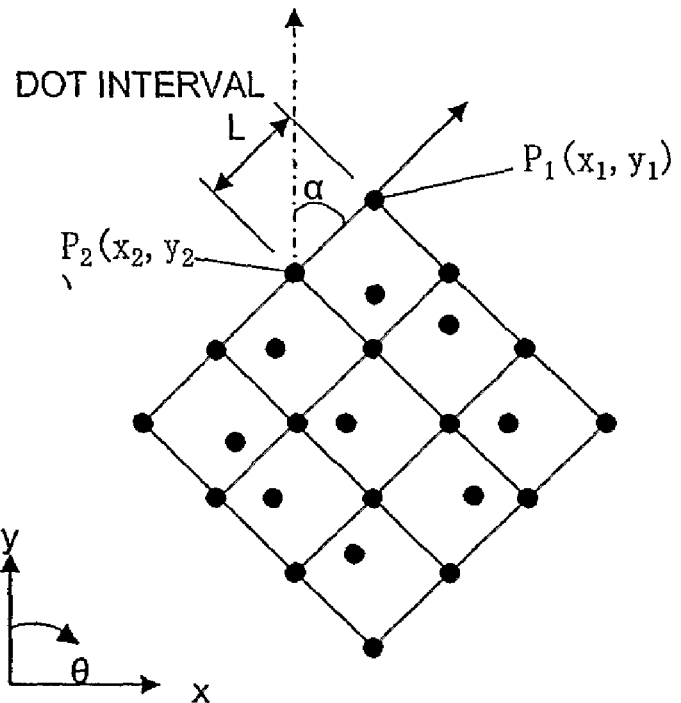
FIG. 27 is a diagram illustrating a card used in a card game machine.
Figure 27B:
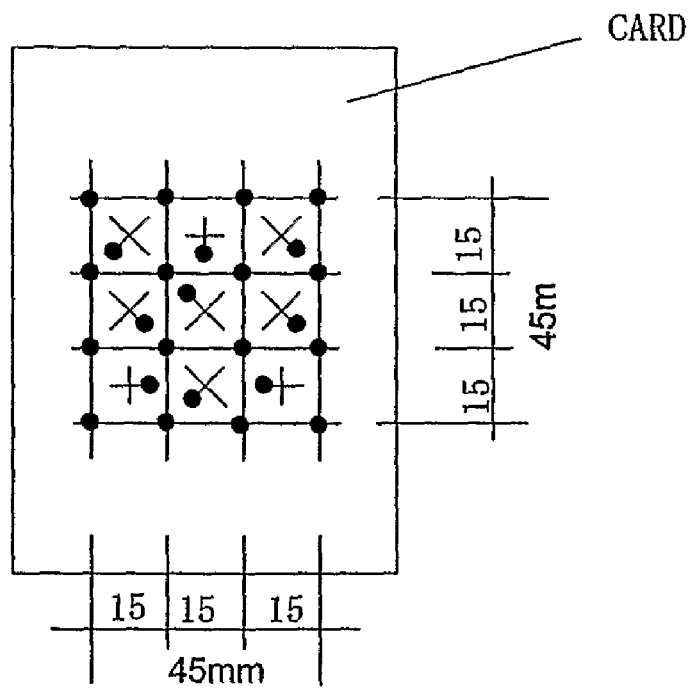

FIG. 27A is a diagram illustrating a method of calculating an angle of the card shown in FIG. 24. FIG. 27B is a diagram illustrating an example of the dot pattern that is printed on the back surface of the card. The straight line for coupling the lattice point dots with one another is displayed to easily recognize the dot patterns, and the lattice line is not printed in the actual dot pattern (see FIG. 25A).

As shown in FIG. 27A, the angle between the photographing direction, that is, a y direction of the frame buffer, and the direction of the dot pattern is set to α, which is used as the angle of the card. In addition, the coordinates of the reference lattice point dot $P_1$ are set to $(x_1, y_1)$, the coordinates of the reference lattice point dot $P_2$ are set to $(x_2, y_2)$, and the distance between $P_1$ and $P_2$, that is, the interval between the reference lattice point dots is set to 1.

First, θ is fixed by x coordinate. In this case, as for θ, when the condition $0 \leq x_1-x_2$ is satisfied, $θ_1$ is set to satisfy the condition $θ_1=|\sin^{-1}\{(x_1-x_2)/1\}|$, and $θ_2$ is set to satisfy the condition $θ_2=180-|\sin^{-1}\{(x_1-x_2)/1\}|$.

Further, when the condition $0>x_1-x_2$ is satisfied, $θ_1$ is set to satisfy the condition $θ_1=180+|\sin^{-1}\{(x_2-x_1)/1\}|$, and $θ_2$ is set to satisfy the condition $θ_2=360-|\sin^{-1}\{(x_2-x_1)/1\}|$.

Next, θ is fixed by y coordinate. In this case, as for θ, when the condition $0 \leq y_1-y_2$ is satisfied, $θ_1$ is set to satisfy the condition $θ_1=|\cos^{-1}\{(y_1-y_2)/1\}|$, and $θ_2$ is set to satisfy the condition $θ_2=360-|\cos^{-1}\{(y_1-y_2)/1\}|$.

Further, when the condition $0>y_1-y_2$ is satisfied, $θ_1$ is set to satisfy the condition $θ_1=180-|\cos^{-1}\{(y_2-y_1)/1\}|$, and $θ_2$ is set to satisfy the condition $θ_2=180+|\cos^{-1}\{(y_2-y_1)/1\}|$.

In this case, θ by each of x coordinate and y coordinate has two values ($θ_1$, $θ_2$). A θ value when the values calculated by the x coordinate and the y coordinate become equal to each other is selected, and it is set to α.

FIG. 25 is a diagram illustrating the relationship among the dot pattern printed on the card surface, the code value, and xy coordinate values.

FIG. 25A is a diagram illustrating a dot pattern printed on the surface of the card. The code value and the xy coordinate values are contained in the dot pattern.

FIG. 25B is a diagram illustrating a table on which the dot pattern is defined by 32 bits from $C_0$ to $C_{31}$. As shown in FIG. 25B, $C_0$ to $C_7$ refer to a y coordinate, $C_8$ to $C_{15}$ refer to an x coordinate, $C_1$ to $C_{27}$ refer to a code value, $C_{28}$ to $C_{30}$ refer to a parity, and $C_{31}$ refers to a management code.

Theses values are arranged in the lattice region shown in FIG. 25C, and specifically, they are represented as the dots shown in FIG. 25D.

Figure 26A:
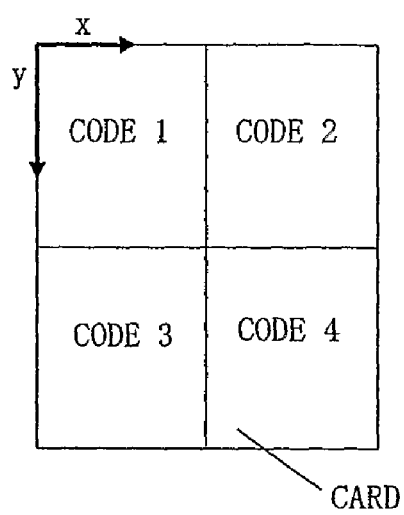
FIG. 26 is a diagram illustrating a method of calculating an angle of a card in FIGS. 24 and 25.
Figure 26B:
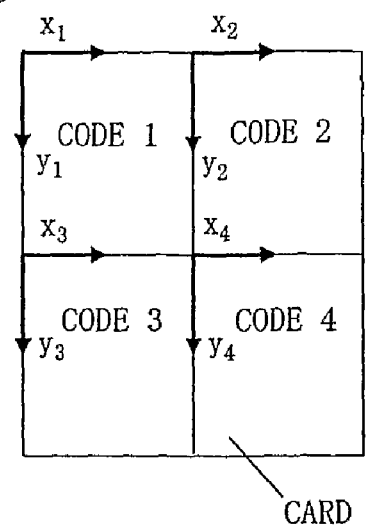

As for the coordinate values, as shown in FIG. 26A, a single xy coordinate system may be used in the entire card surface, and as shown in FIG. 26B, four xy coordinate systems may be used in respective regions divided for respective codes.

Figure 28:
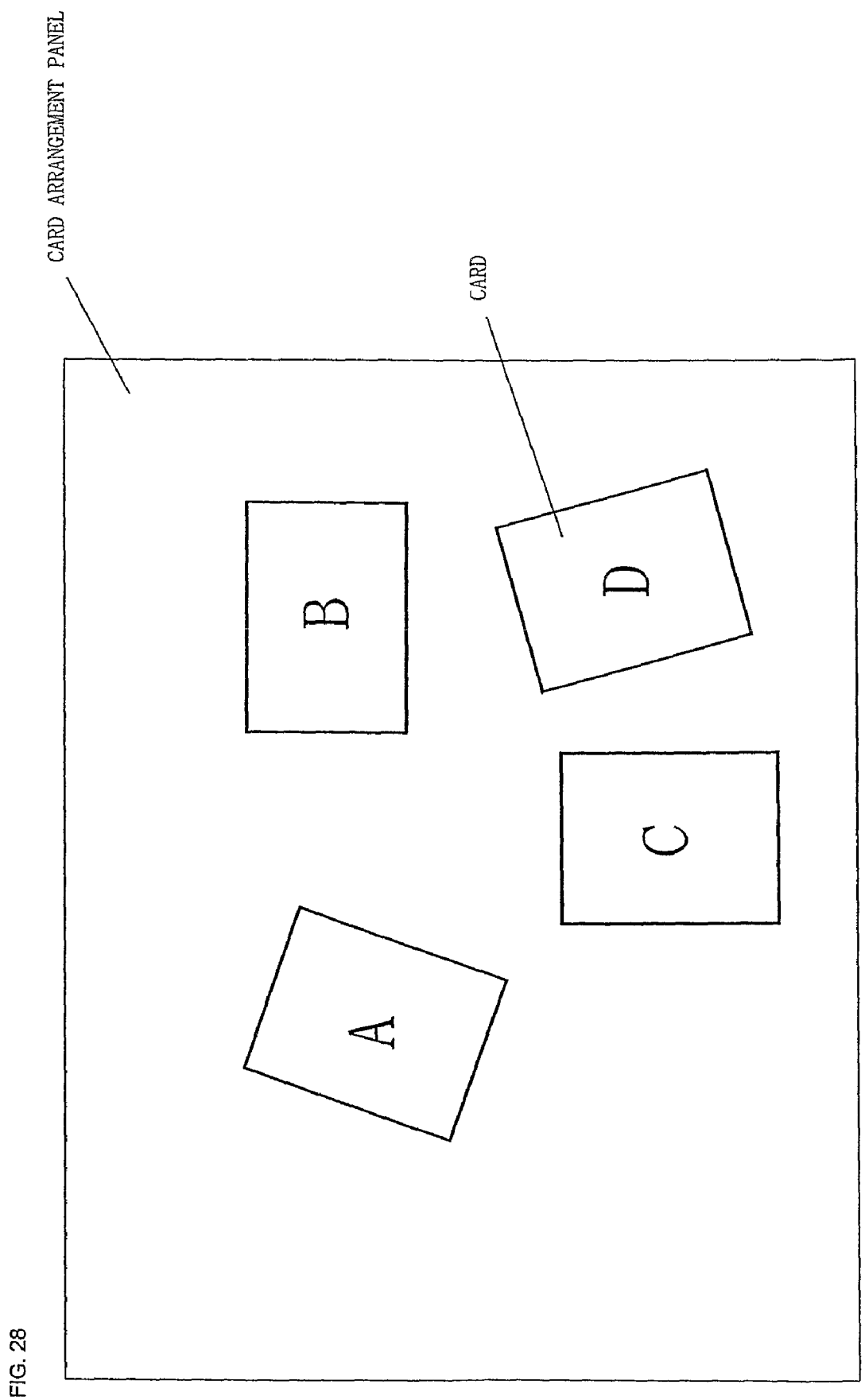
FIG. 28 is a plan view illustrating a state in which a card is disposed on a card arrangement panel, when viewed from an upper side.

FIG. 28 is a plan view illustrating a state in which the cards are disposed on the card arrangement panel, when viewed from the upper side.

The player can dispose the four cards from A to D on any locations on the card arrangement panel.

Figure 29:
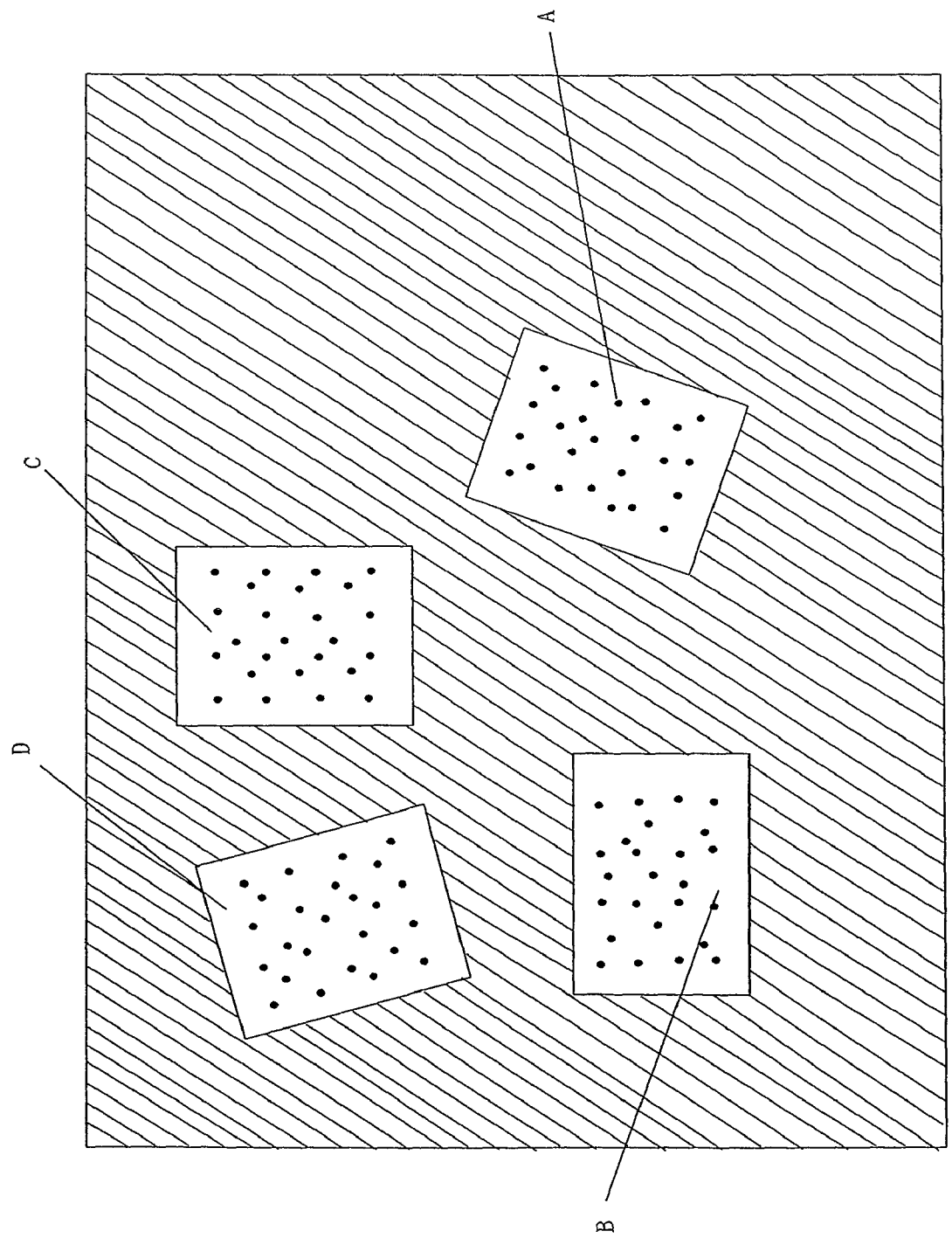
FIG. 29 is a diagram illustrating an image that is obtained by photographing a card disposed on a card arrangement panel by using a sensor unit.

FIG. 29 is a diagram illustrating an image obtained by photographing the cards disposed on the card arrangement panel by the sensor unit disposed at the side of the bottom surface of the card arrangement panel.

As described above, the sensor unit is provided at the lower side in the casing of the card game machine, and photographs the back surface of the card arrangement panel. Accordingly, the image photographed by the sensor unit is reversed at the left, right, top and bottom sides, as compared with the image shown in FIG. 27. Further, the dot code printed on the back surface of the card is photographed.

Figure 30:
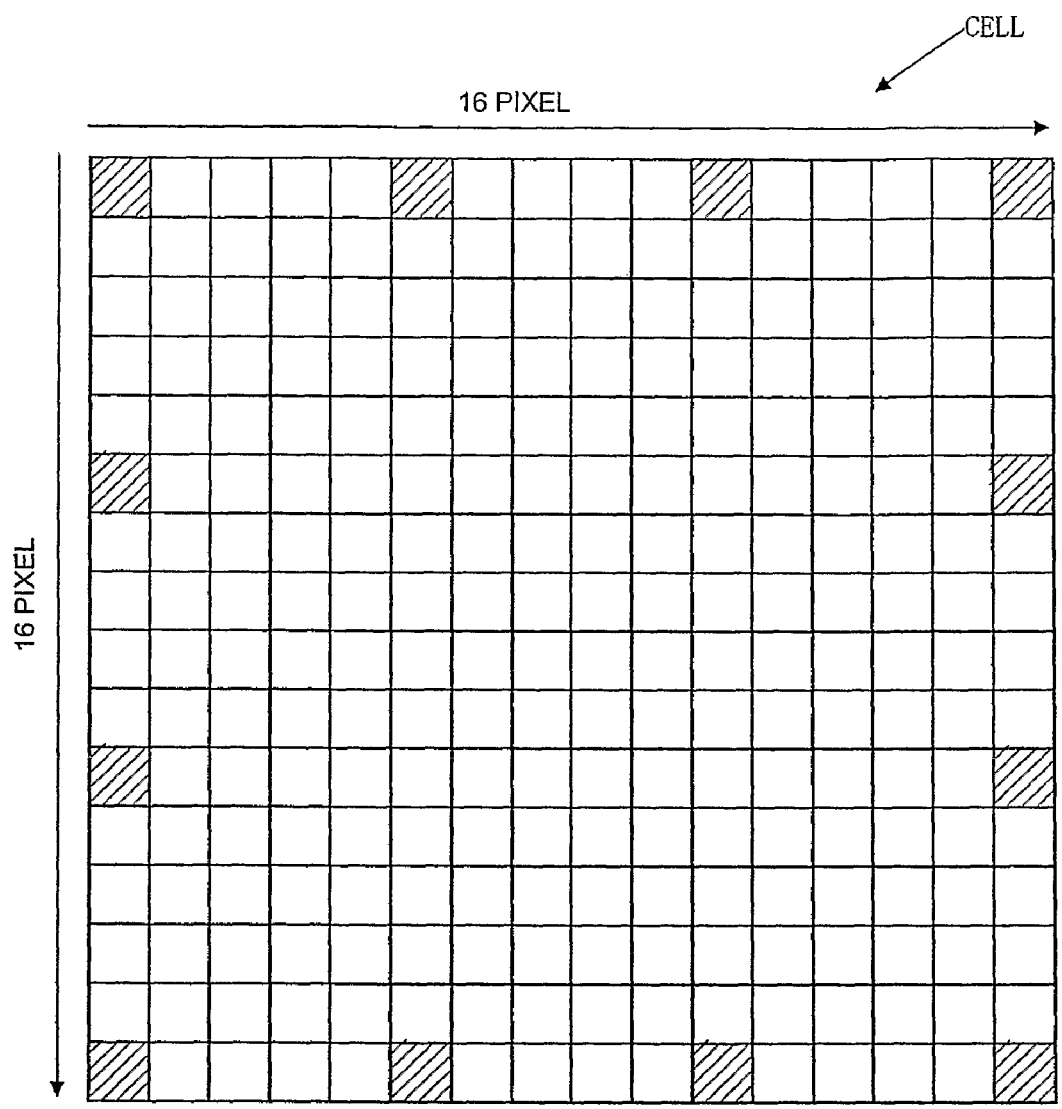
FIG. 30 is a diagram illustrating a method of determining where a card exists or not.

FIG. 30 is a diagram illustrating a pixel matrix for determining whether the card exists or not. In the pixel matrix, pixels of 16×16 form one cell. The predetermined pixels (pixels hatched in FIG. 30) serve as the check pixels.

That is, the brightness of check pixel groups set at a predetermined interval (in this case, at an interval of five pixels) is detected. When the brightness is equal to or more than a predetermined threshold value, it is determined that the medium is disposed on the pixel matrix.

Hereinafter, it will be described in detail.

Figure 31:
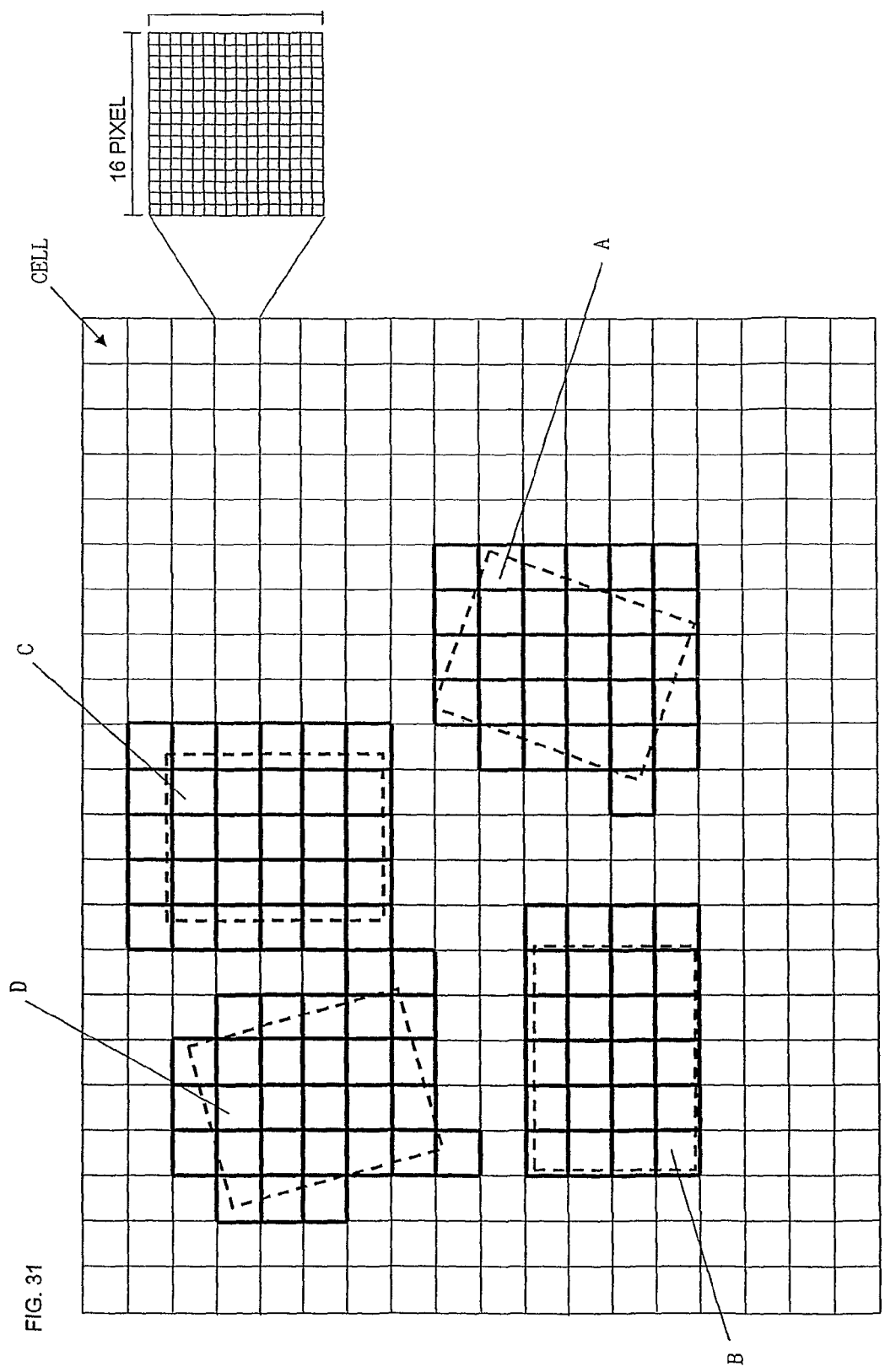
FIG. 31 is a diagram illustrating a method of analyzing a code of a card.

First, the microprocessor unit (MPU) provided in the sensor unit or the game microprocessor unit divides the photographic region into cells of 18 (longitudinal)×22 (horizontal), as shown in FIG. 31. Further, each of these cells is divided into pixels of 16 (longitudinal)×16 (horizontal). In addition, among the pixels, a bright level (brightness) of the hatched portion in FIG. 30 is measured. The bright level is represented by 256 stages from 0 to 255. In addition, any threshold value is set, and when the bright level is equal to or more than the threshold value, it is determined that the card or an object, or a hand is disposed at the corresponding location. However, when the bright level is 255, since it corresponds to a white noise, it is determined that the card is not disposed.

FIG. 31 is a diagram illustrating a method of analyzing codes of cards.

First, as described above, the photographic region is divided into the cells of 18 (longitudinal)×22 (horizontal). In addition, the sensor unit scans cells from the first cell at the upper left toward the rightward direction. In this case, since the other portions other than the cards where the dots are formed reflect the infrared rays, the regions where the cards are disposed are photographed to be brighter than the regions where the cards are not disposed. Accordingly, the sensor unit searches the cells photographed to be bright while scanning the cells. When the sensor unit searches the cells photographed to be bright, it is determined that the card is disposed on the corresponding cells. In addition, it is determined by the above-mentioned method whether the dot exists or not. The searching of the bright region and the determination whether the dot exists or not are sequentially performed, and the dot code printed on the card surface is read.

According to the above-mentioned method, it is determined that the card exists on the bright region, and the dot detection is performed on only the bright region. Accordingly, it is possible to reduce the time necessary when the dots are detected.

In the present embodiment, since the dots are detected in only the cell (pixels of 16×16) on which the card is disposed, it is possible to efficiently perform the calculation by the microprocessor unit (MPU) or the game microprocessor unit. Accordingly, it is possible to reduce a time necessary when the dot patterns are read.

Figure 32:
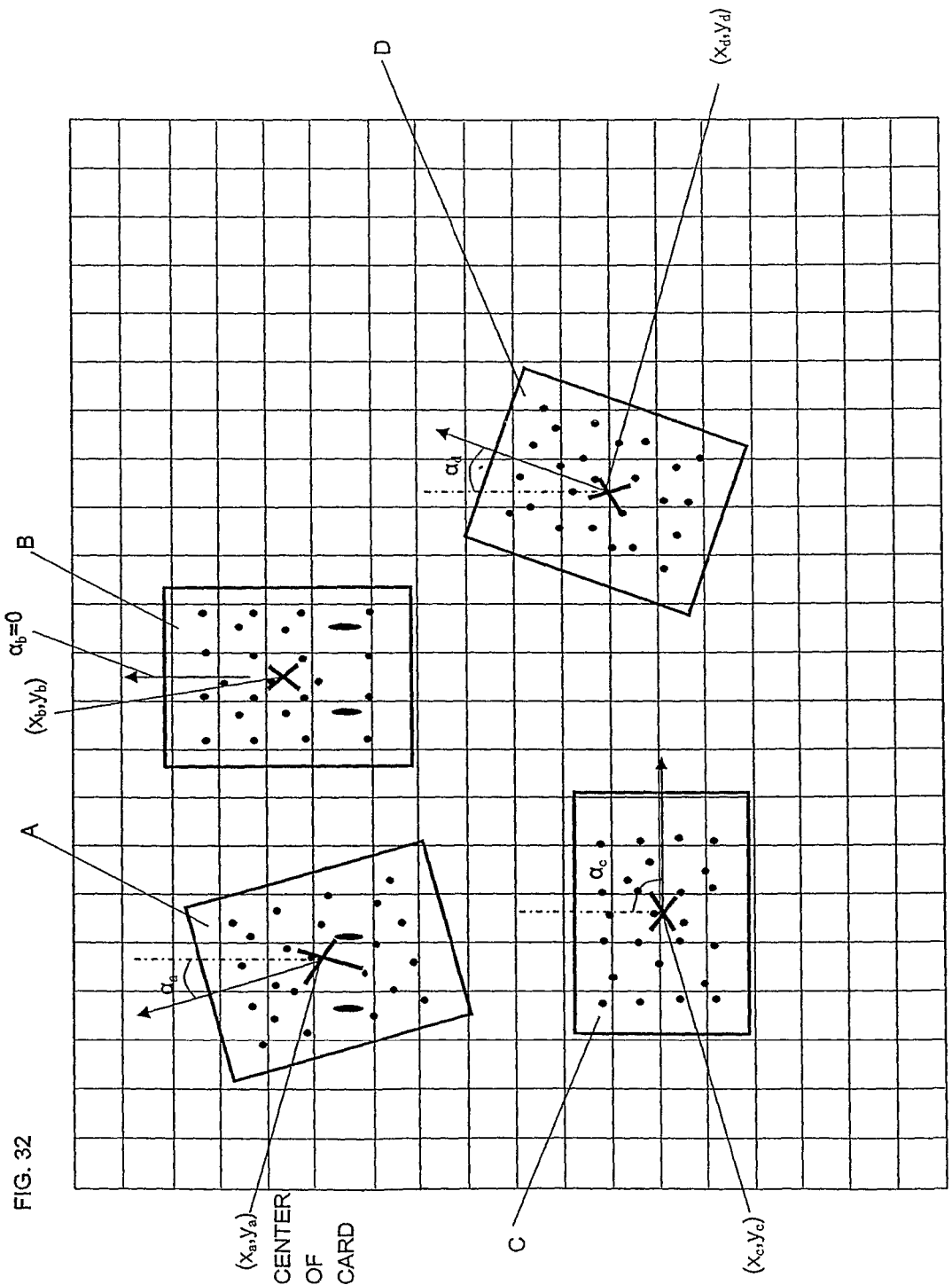
FIG. 32 is a diagram illustrating a method of recognizing a location and an angle of a card.

FIG. 32 is a diagram illustrating a method of recognizing the locations of the cards disposed on the card arrangement panel (stage surface) and the angles of the cards, when a game is performed by using the card game machine and the cards according to the invention.

First, if the sensor unit photographs the dot pattern of the card surface by using the above-mentioned method, the microprocessor unit (MPU) detects a code value that corresponds to the dot pattern. After detecting the code value, the microprocessor unit (MPU) searches the key dot. The x and y coordinates of the center of the card are calculated, and they are set to the location of the card. The location of the card is represented by x and y coordinates on the basis of the lower right of the card arrangement panel (upper left when being photographed). That is, by detecting the location of the card, the center of the card is calculated, and the x and y coordinates of the card are calculated. Thereby, the location of the card is calculated. That is, in FIG. 32, the coordinates of the card A become $(x_a, y_a)$, the coordinates of the card B become $(x_b, y_b)$, the coordinates of the card C become $(x_c, y_c)$, and the coordinates of the card D become $(x_d, y_d)$.

Further, the angle between the straight line coupling the card center and the key dot and the vertical direction of the card arrangement panel is set to α, which is a direction of the card. The angle of the card is calculated by the above-mentioned method.

Figure 33:
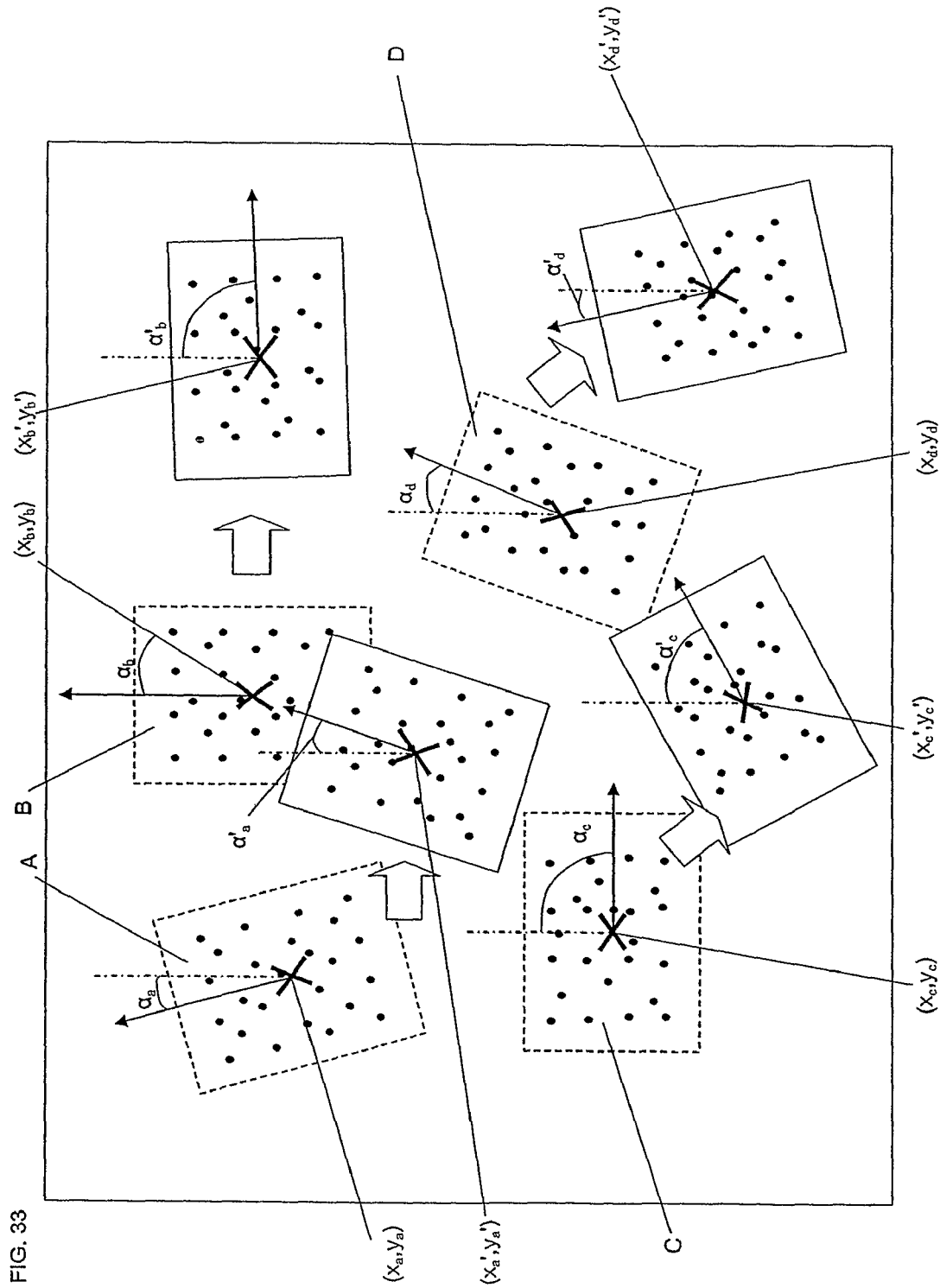
FIG. 33 is a diagram illustrating a method of calculating a moved angle and a moved amount, when a player moves a card.

FIG. 33 is a diagram illustrating a method of calculating the moved angle and the movement amount, when the user moves the card on the card arrangement panel (stage surface).

According to the method of recognizing the movement of the card, for example, as shown in FIG. 30, after the pixel matrix on which the card is disposed is detected by the sensor unit and the microprocessor unit (MPU), the code value is read from the dot pattern, and the key dot is searched. Thereby, the direction of the card on the card arrangement panel can be recognized. When the user moves the card on the card arrangement panel, it is assumed that the card having the same code value moves on the card arrangement panel. Accordingly, if the locations where the code values are reproduced per predetermined time are coupled as the traces, whether the card moves or not, the movement direction of the card, and the movement traces of the card can be recognized.

Further, the microprocessor unit (MPU) can know the rotation angle by movement by using the difference between the directions of the key dots before and after the card moves. Further, it can calculate the movement amount and the movement time.

As such, the power of the card holder can be varied according to the card locations, or the game may be progressed while using the movement amount or the moving time as parameters.

Hereinafter, FIG. 33 will be described in detail.

As shown in FIG. 33, it is assumed that the player moves the cards A, B, C, and D. At this time, the center of the card A moves from $(x_a, y_a)$ to $(x_a', y_a')$, the center of the card B moves from $(x_b, y_b)$ to $(x_b', y_b')$, the center of the card C moves from $(x_c, y_c)$ to $(x_c', y_c')$, and the center of the card D moves from $(x_d, y_d)$ to $(x_d', y_d')$. At this time, as for the angle with respect to the card arrangement panel, the card A is changed from $\alpha_a$ to $\alpha_a'$, the card B is changed from $\alpha_b$ to $\alpha_b'$, the card C is changed from $\alpha_c$ to $\alpha_c'$, and the card D is changed from $\alpha_d$ to $\alpha_d'$. In this case, the movement amount $1_a$ of the card A satisfies the following condition.

$$1_a = \sqrt{\{(x_a'-x_a)^2+(y_a'-y_a)^2\}}$$

Further, the rotation angle $\theta_a$ satisfies the following condition.

$$\theta_a = \alpha_a' - \alpha_a$$

Further, if the time before the card moves is set to $T_a$ and the time after the card moves is set to $T_a'$, the time $t_a$ necessary for card movement satisfies the following condition.

$$t_a = T_a' - T_a$$

This is applicable to cards B, C, and D.

In the card game machine, if the player moves the card, the movement amount of the card, the rotation angle of the card, and the movement time of the card become parameters, and the power of the card holder is varied. That is, when the card moves, the intensity of the power of the card holder varies.

Figure 34A:
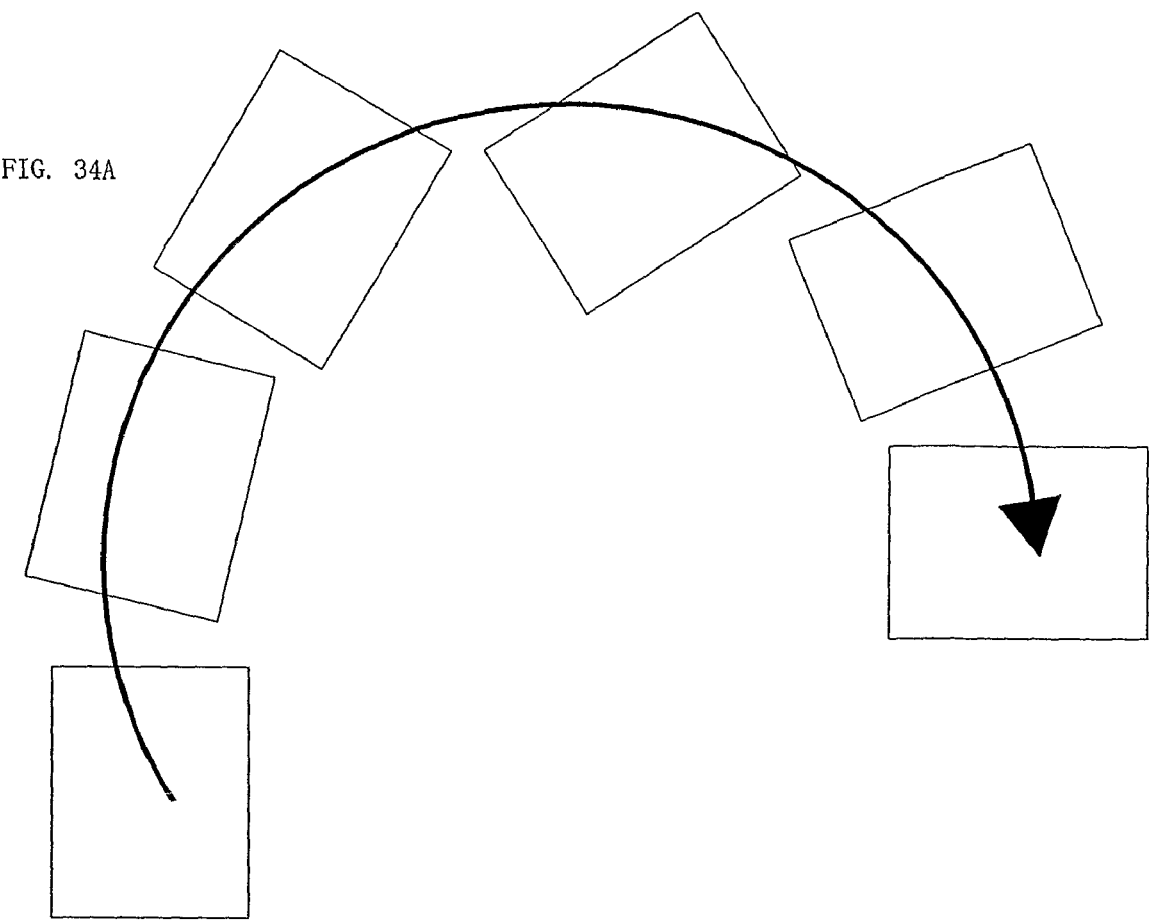
FIG. 34A is a diagram illustrating a case in which a trace of a card is used as a parameter, which illustrates a case in which a card is moved in a cylindrical shape.
Figure 34B:
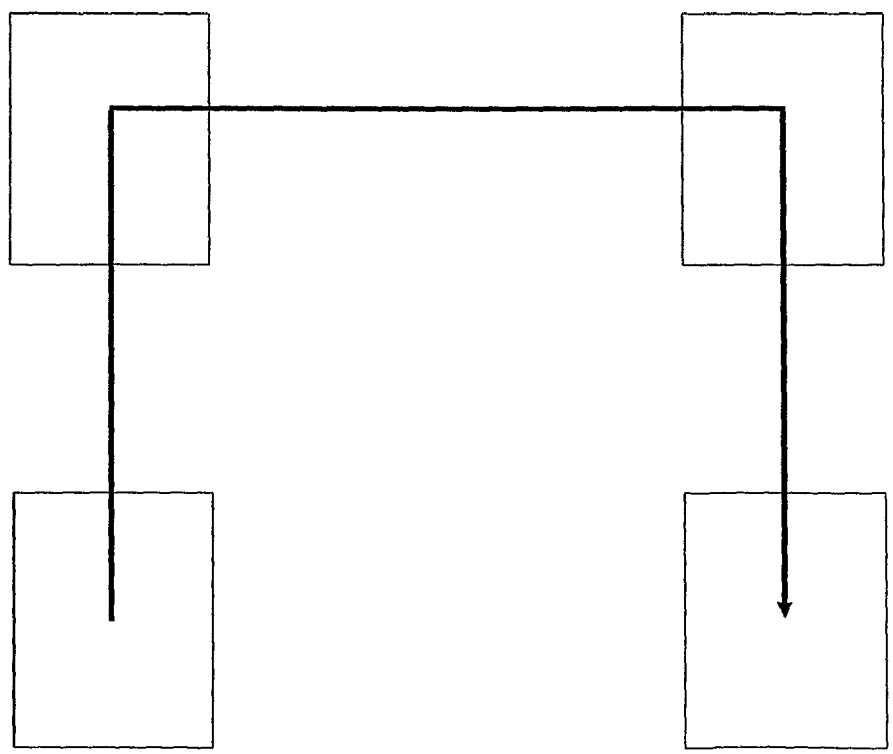
FIG. 34B is a diagram illustrating a case in which a trace of a card is used as a parameter, which illustrates a case in which a card is moved in a rectangular shape.

FIGS. 34A and 34B are diagrams illustrating a case in which the traces of the card are used as parameters. FIG. 34A is a diagram illustrating a case in which a card moves in a circular shape, and FIG. 34B is a diagram illustrating a case in which a card moves in a rectangular shape.

In the invention, the traces when the player moves the card may be used as parameters. For example, the shape of the trace can be used as the parameter. That is, the player moves the card in a curve shape as shown in FIG. 34A, or moves the card in a linear shape as shown in FIG. 34B, so that parameter such as the attribute of the card may be varied.

In another embodiment, the characters displayed on the display may be associated with the traces of the cards on the card arrangement panel to be controlled. For example, a stage effect that battle planes are displayed on the screen, and the player moves cards and thus the battle planes move according to the movement of the cards can be made.

Further, the cards may be moved in a state in which the locations and the directions of a camera (not shown) on the card arrangement panel are associated with the traces.

In this case, if the card does not move for a predetermined time or more, it may be assumed that the traces of the card are completed. Further, if the player removes the card from the card arrangement panel, it may be assumed that the traces of the card are completed.

Figure 35:
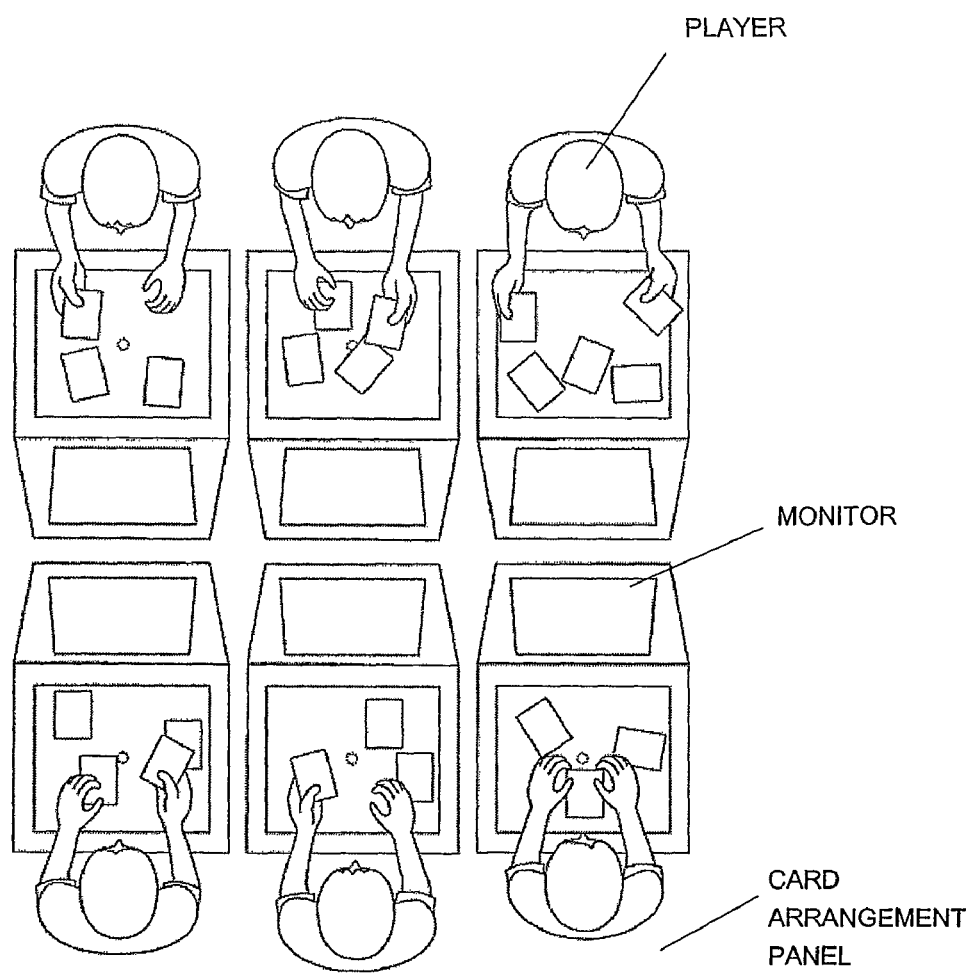
FIG. 35 is a diagram illustrating a state in which a game is actually performed by using a plurality of card game machines.

FIG. 35 is a plan view illustrating a state in which a game is performed by the card game machine of the invention.

As shown in FIG. 8, a player stands or sits in front of the card arrangement panel of the card game machine, and a monitor is disposed at the front of the card arrangement panel when viewed from the player. Three pairs of combinations, each of which has a card arrangement panel and a monitor, and other three pairs of combinations, each of which has a card arrangement panel and a monitor, are disposed to be opposite to each other, and six people shares a card game machine of one unit.

That is, one player plays a game with any one of the other five people or the other five people, and cards held by the player are disposed on the card arrangement panel. A game progresses while using code values or coordinate values of dot patterns printed on the cards. In addition, images or moving pictures for raising the game progress and result, or a stage effect are displayed on a monitor.

In FIG. 8, the six card arrangement panels form a game machine of one unit. However, the invention is not limited thereto.

FIGS. 36 to 39 are diagrams illustrating a card game machine according to a second embodiment of the invention in which an image is displayed on the card arrangement panel.

In the second embodiment, in addition to the sensor unit (imaging unit), a projector that serves as a projection unit is provided in a space below the card arrangement panel (space below a stage). In the projector, images or moving pictures that are projected onto the stage surface are controlled by code values or coordinate values of the dot patterns obtained from the photographed image by the sensor unit.

In the present embodiment, for example, if a card where the dot patterns are printed is disposed on the card arrangement panel, the infrared ray irradiation light irradiated from the IRLEDs is irradiated onto the entire bottom surface of the card arrangement panel through the dispersion filter.

The infrared ray irradiation light reflected on the back surface of the card is photographed by the sensor unit. At this time, from the projector, images or moving pictures are projected onto the bottom surface of the card arrangement panel.

In addition, if the sensor unit and the microprocessor unit (MPU) read the dot pattern printed on the card, the dot pattern is converted into the code value, and the image or the moving picture corresponding to the code value is projected from the projector.

As such, the images or the moving pictures are projected onto the bottom surface of the card arrangement panel by the projector, and the projected images and moving pictures are controlled by the cards which are disposed on the card arrangement panel and on which the dot patterns are printed.

Figure 37:
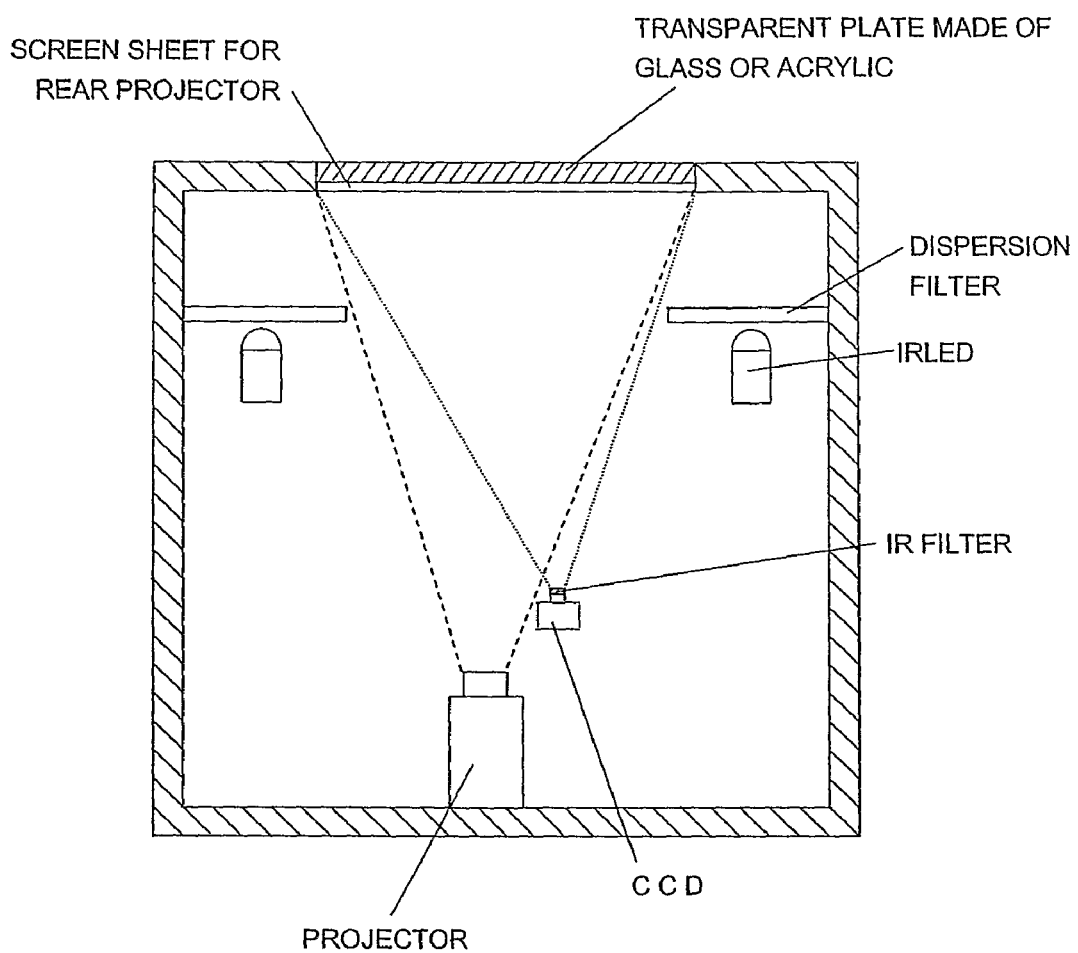
FIG. 37 is a longitudinal cross-sectional view illustrating a card game machine according to an embodiment of the invention which is shown in FIG. 36.

FIG. 37 is a longitudinal cross-sectional view illustrating the card game machine according to the present embodiment.

As shown in FIG. 37, an upper layer of the card arrangement panel is formed of a transparent plate made of glass or acrylic, and a screen sheet for a rear projector is laminated on a lower layer of the card arrangement panel. In the space below the card arrangement panel (space below the stage surface), a projector for projecting images or moving pictures onto the screen sheet, IRLEDs for irradiating infrared light onto the bottom surface of the card arrangement panel, a dispersion filter for dispersing the infrared light, and a CCD (sensor unit) serving as an imaging unit are provided. Further, an IR filter is mounted on the front end of the CCD.

In FIG. 37, the CCD is connected to a microprocessor unit (MPU) (not shown), and the images photographed by the CCD are analyzed by the microprocessor unit (MPU), and thus the dot pattern printed on the back surface of the card is converted into a code value or a coordinate value.

Figure 38C:
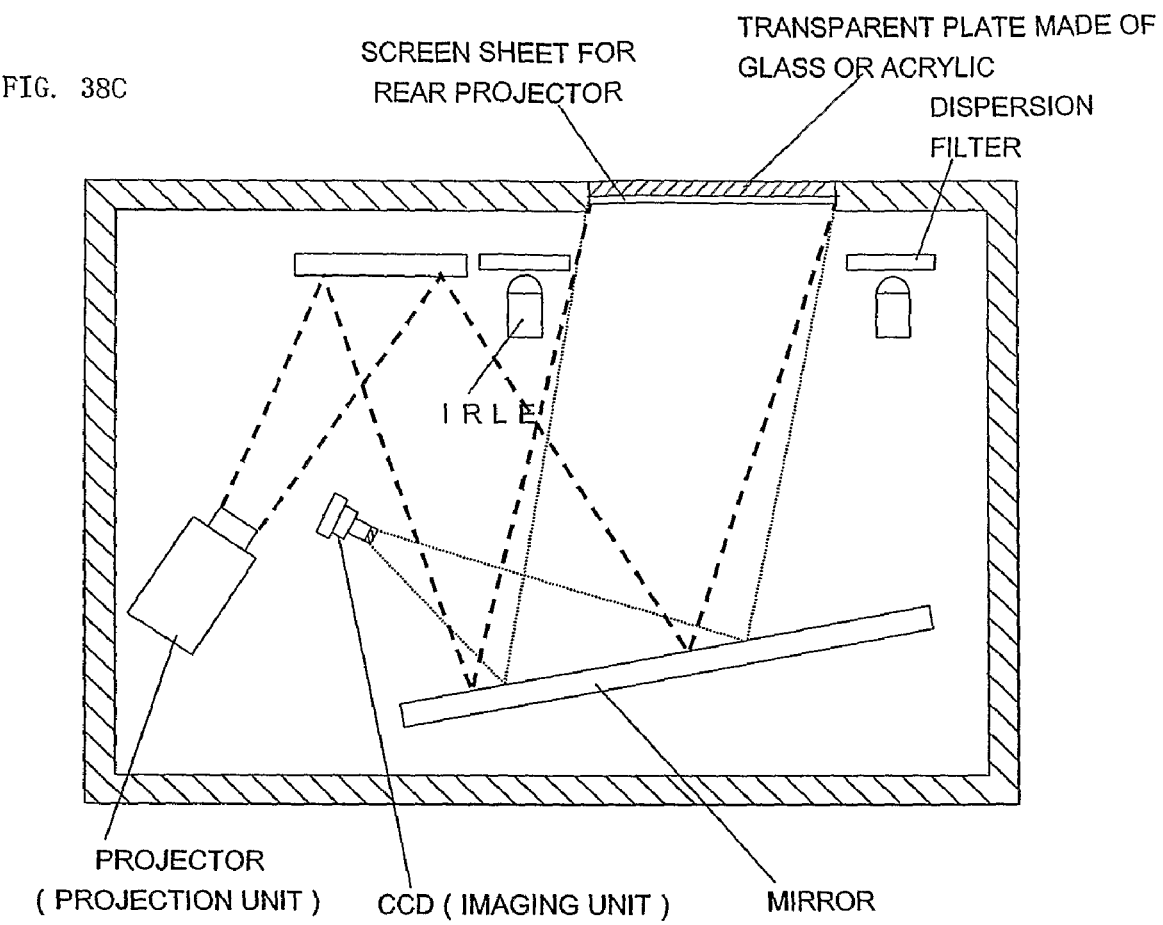
FIG. 38 is a longitudinal cross-sectional view illustrating a card game machine according to another embodiment of the invention which is shown in FIG. 36.
Figure 39:
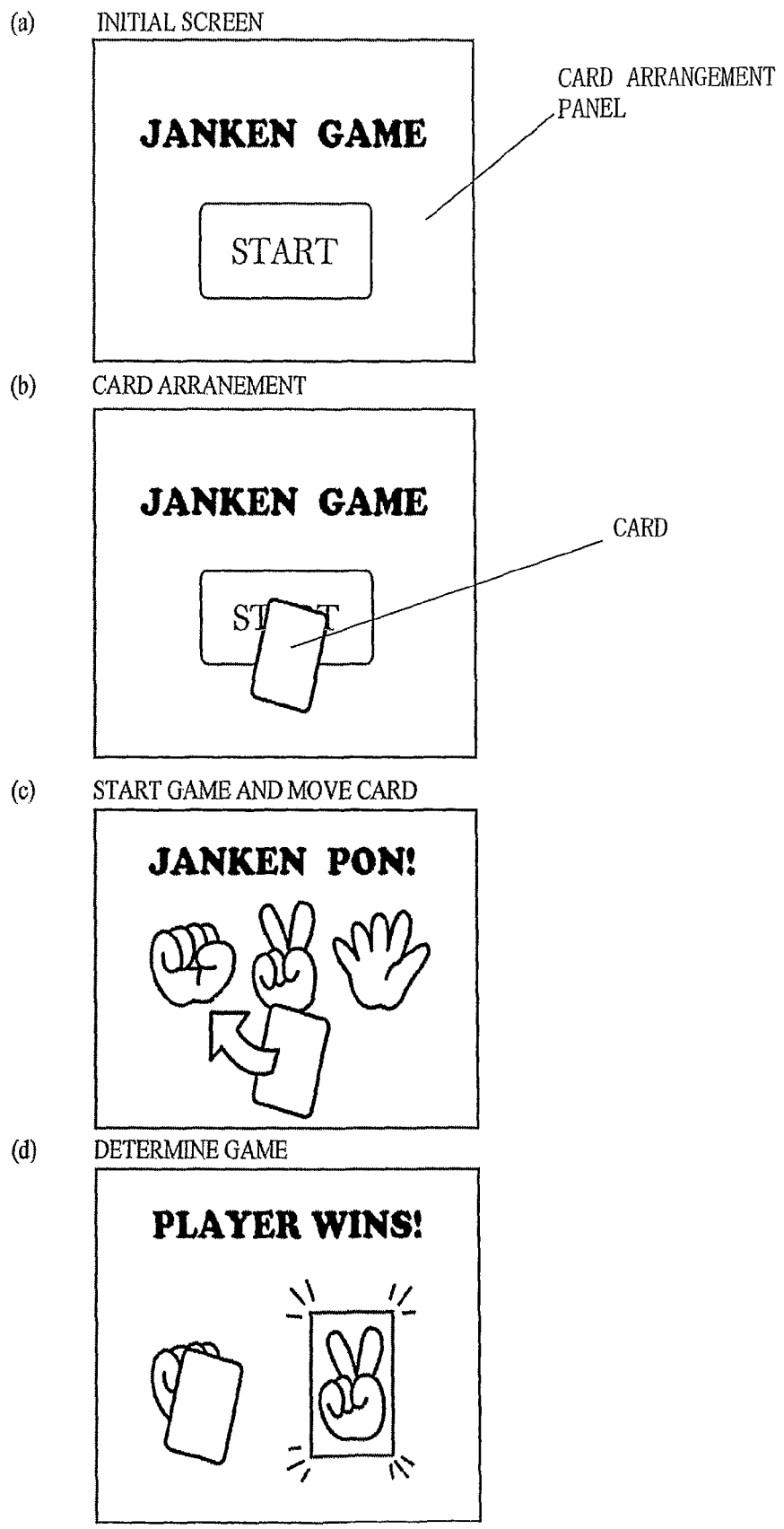
FIG. 39 is a diagram illustrating a display example of an image displayed on a card arrangement panel, and an operation of a player.

Referring to FIG. 38A, a mirror is provided to be inclined in a space below the card arrangement panel (space below the stage), a projector (imaging unit) is disposed at the side of one surface of the mirror, the projected images or moving pictures from the projector (projection unit) are reflected on one surface of the mirror to be projected onto the bottom surface of the stage. In the space below the card arrangement panel at the location spaced apart from the mirror, a CCD serving as an imaging unit is disposed, and the photographed light of the dot pattern of the card surface (medium surface) on the card arrangement panel (stage surface) is incident onto the imaging unit without being incident on the mirror.

Referring to FIG. 38B, a magic mirror is provided to be inclined in a space below the card arrangement panel (space below the stage), a projector (projection unit) is disposed at the side of one surface of the magic mirror, the projected images or moving pictures from the projector (projection unit) are reflected on one surface of the mirror to be projected onto the bottom surface of the stage. The CCD (imaging unit) is disposed at the side of the other surface of the magic mirror, and the photographed light of the dot pattern of the medium surface on the stage surface transmits the magic mirror to then be incident on the CCD (imaging unit).

FIGS. 39A to 39C are diagrams illustrating images projected onto the card arrangement panel, when the game is actually performed. For example, first, an image of 'a Janken game' is displayed on the card arrangement panel. In this case, the player puts a card on which a predetermined pattern (in this case, ID of the player) is printed on a display location of a start (see FIG. 39A). At this time, the IRLED below the card arrangement panel irradiates the infrared light onto the card through the dispersion filter.

The CCD (imaging unit) that has photographed the light reflected from the card transmits the photographed image to the microprocessor unit (MPU). Then, the microprocessor unit (MPU) recognizes the dot pattern from the photographed image, and reads the code value (in this case, ID of the player) that corresponds to the dot pattern.

Then, the game microprocessor unit (see FIGS. 12 and 13) that has received the code value from the microprocessor unit (MPU) controls the projector, and displays the game start image on the card arrangement panel (FIG. 39B).

When the game starts, if the player moves the card, the location of the card after the movement (coordinate value on the card arrangement panel) is recognized by the microprocessor unit (MPU) and the game microprocessor unit. In this case, the microprocessor unit (MPU) and the game microprocessor unit recognize that the card is disposed at a location of a 'rock' of scissors-paper-rock.

Next, the game microprocessor unit generates random numbers, and determines a card at the side of the game microprocessor unit (in this case, 'scissors') on the basis of values of the random numbers.

Then, the game microprocessor unit determines a game. The game determination is performed on the basis of a determination table set in the memory (not shown). As a result of referring to the determination table, when it is determined that the player wins (FIG. 39D), points are added to an ID attribute of the player.

Another Embodiment

Figure 40A:
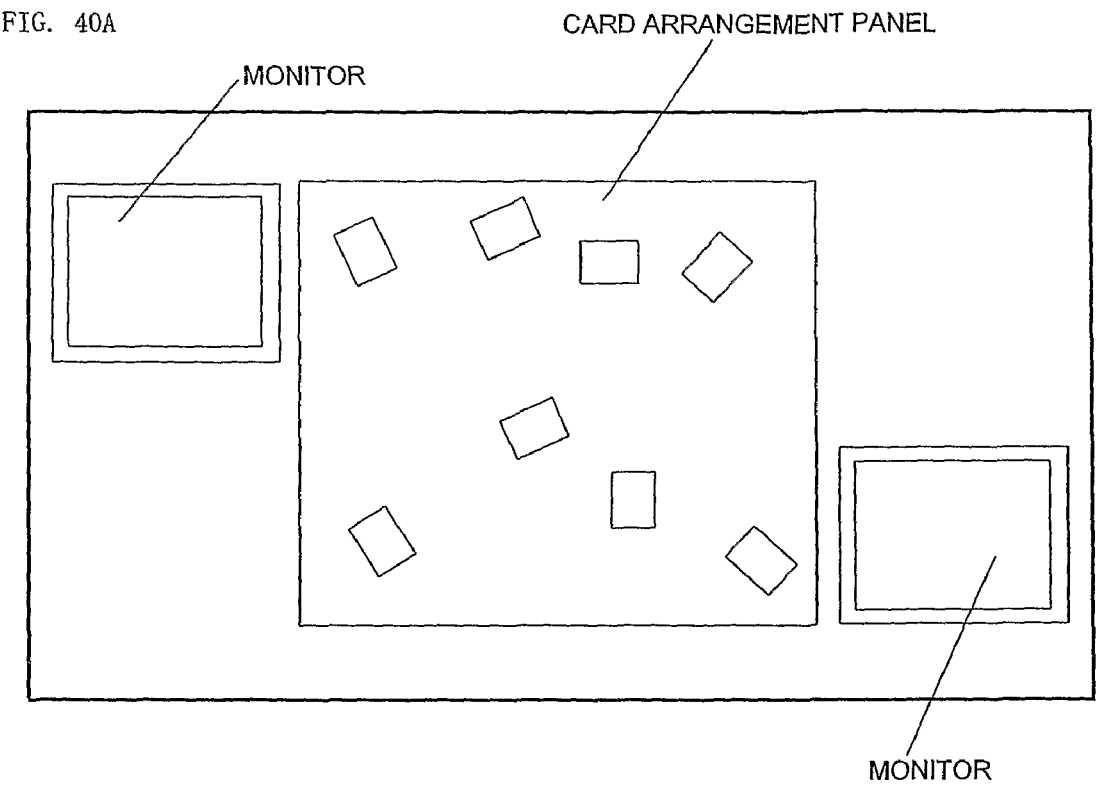
FIGS. 40A and 40B are diagrams illustrating a card game machine in which a monitor is disposed to be inclined at the side of a player.
Figure 40B:
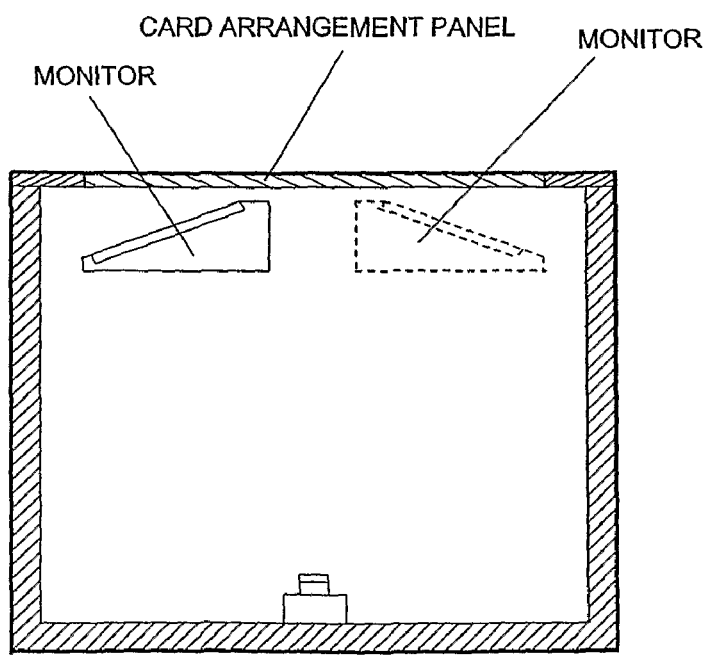

FIGS. 36 to 39 are diagrams illustrating an example where images or moving pictures are directly projected onto the card arrangement panel by the projector. However, as shown in FIG. 40, the monitor (display) may be separately provided from the card arrangement panel.

Figure 41:
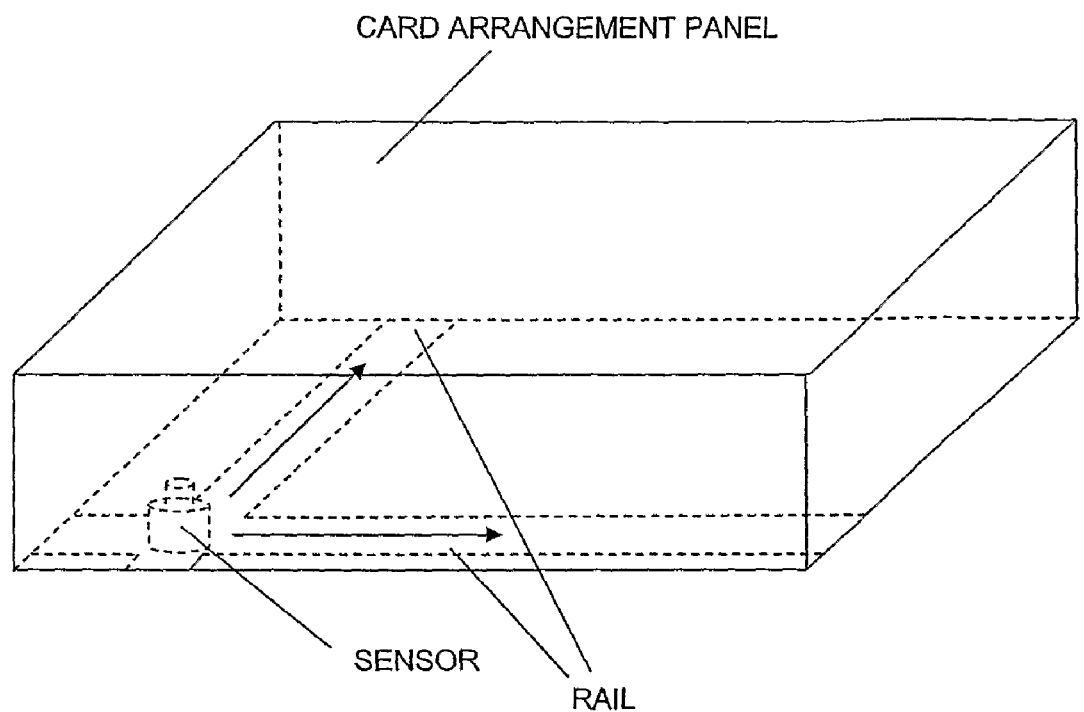
FIG. 41 is a perspective view illustrating a card game machine according to another embodiment of the invention in which a sensor moves onto a rail.

Further, as shown in FIG. 41, the sensor unit may have a rail that is movable in xy directions.

Figure 42:
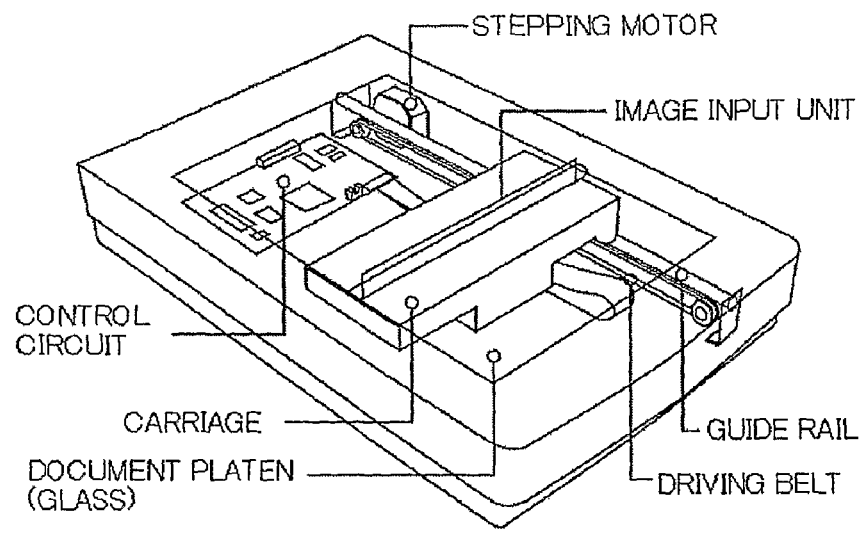
FIG. 42 is a perspective view illustrating a card game machine according to another embodiment of the invention in which an infrared scanner is used.

Further, as shown in FIG. 42, the sensor unit serving as an image input unit may be provided such that it can scan a surface of the guide rail by a driving belt of a stepping motor, and may read the dot pattern of the medium that is disposed on a document platen made of glass.

Figure 43:
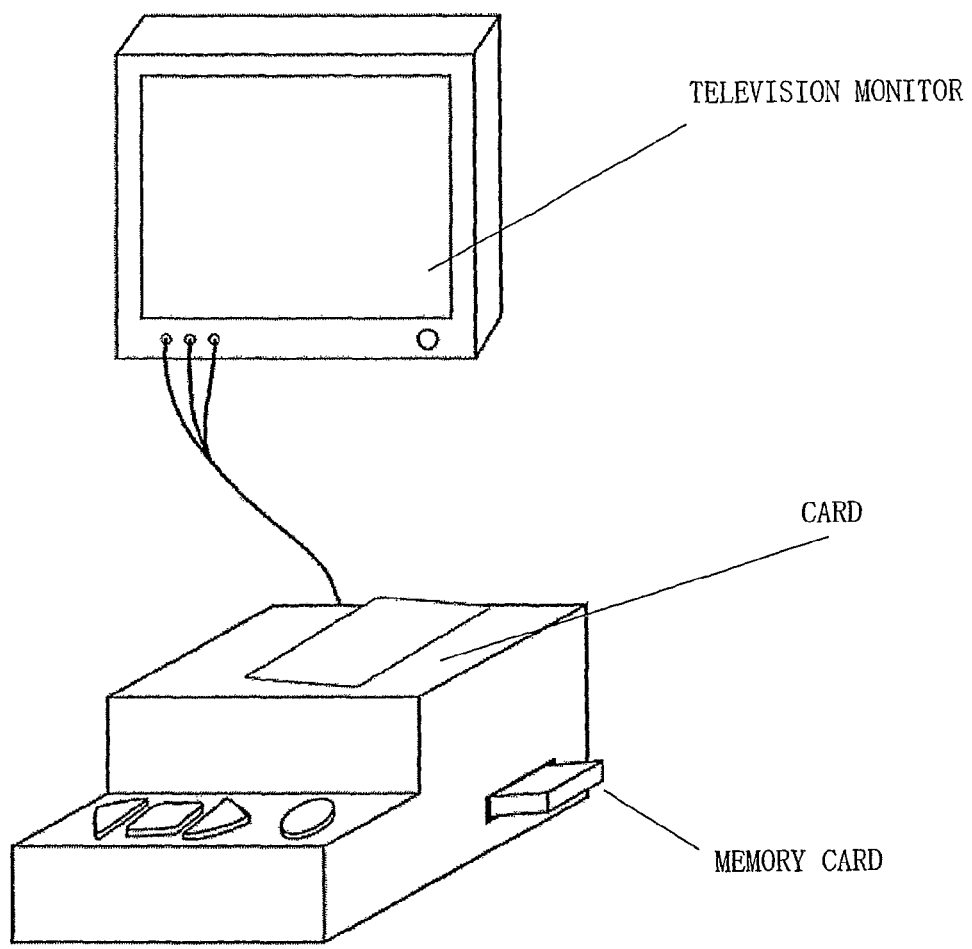
FIG. 43 is a diagram illustrating a card game machine according to another embodiment of the invention which is connected to a television monitor and in which a game is performed by arranging a card on a table.

FIG. 43 is a diagram illustrating a household game machine in which dot patterns of the card can be read by a main body of the game machine. The read result can be displayed on a monitor of an external television. A memory card can be mounted on the main body of the game machine. In the memory card, the scoreline or the parameter of the card, and the images or moving data may be stored.

Figure 44:
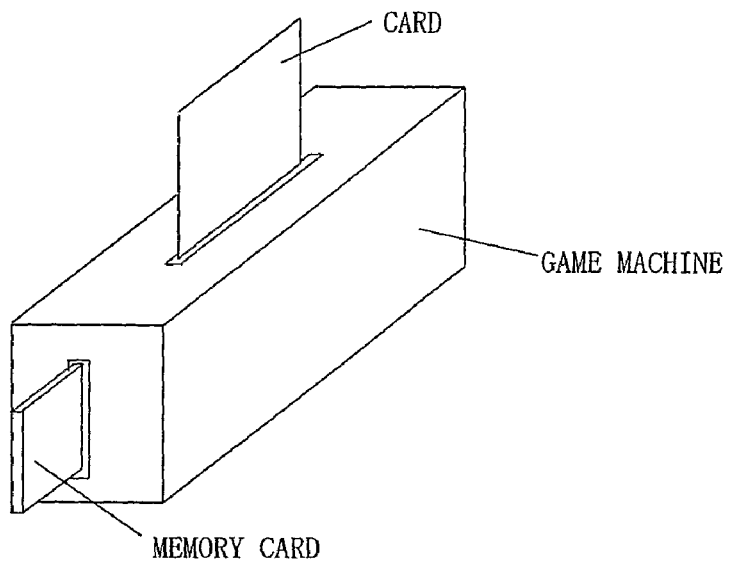
FIG. 44 is a diagram illustrating a card game machine according to another embodiment of the invention which is connected to a television monitor and in which a game is performed in a state in which a card is inserted into a card inserting slot.
Figure 45:
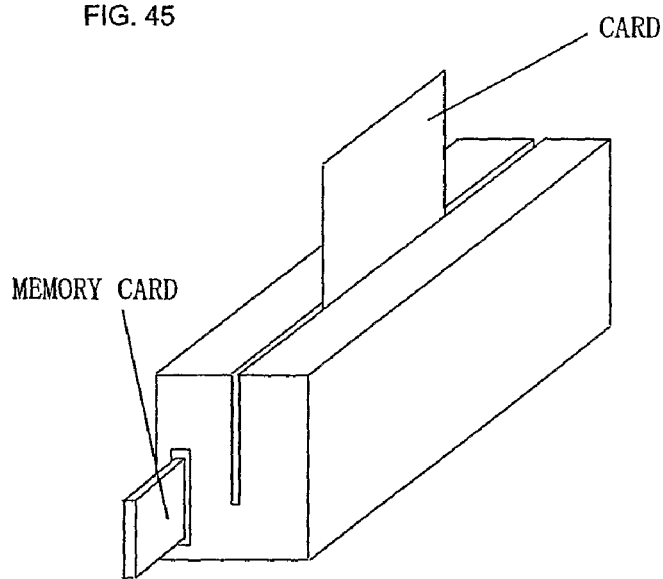
FIG. 45 is a diagram illustrating a card game machine according to another embodiment of the invention which is connected to a television monitor and in which a game is performed in a state in which a card passes through a slit.
Figure 46:
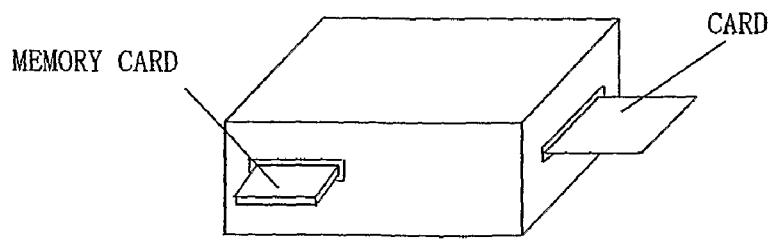
FIG. 46 is a diagram illustrating a card game machine according to another embodiment of the invention which is connected to a television monitor and in which a game is performed in a state in which a card is inserted into a card inserting slot.

FIGS. 44 to 46 are diagrams illustrating a modification of the game machine. As shown in FIG. 45, the card may be scanned in a horizontal direction.

Figure 47:
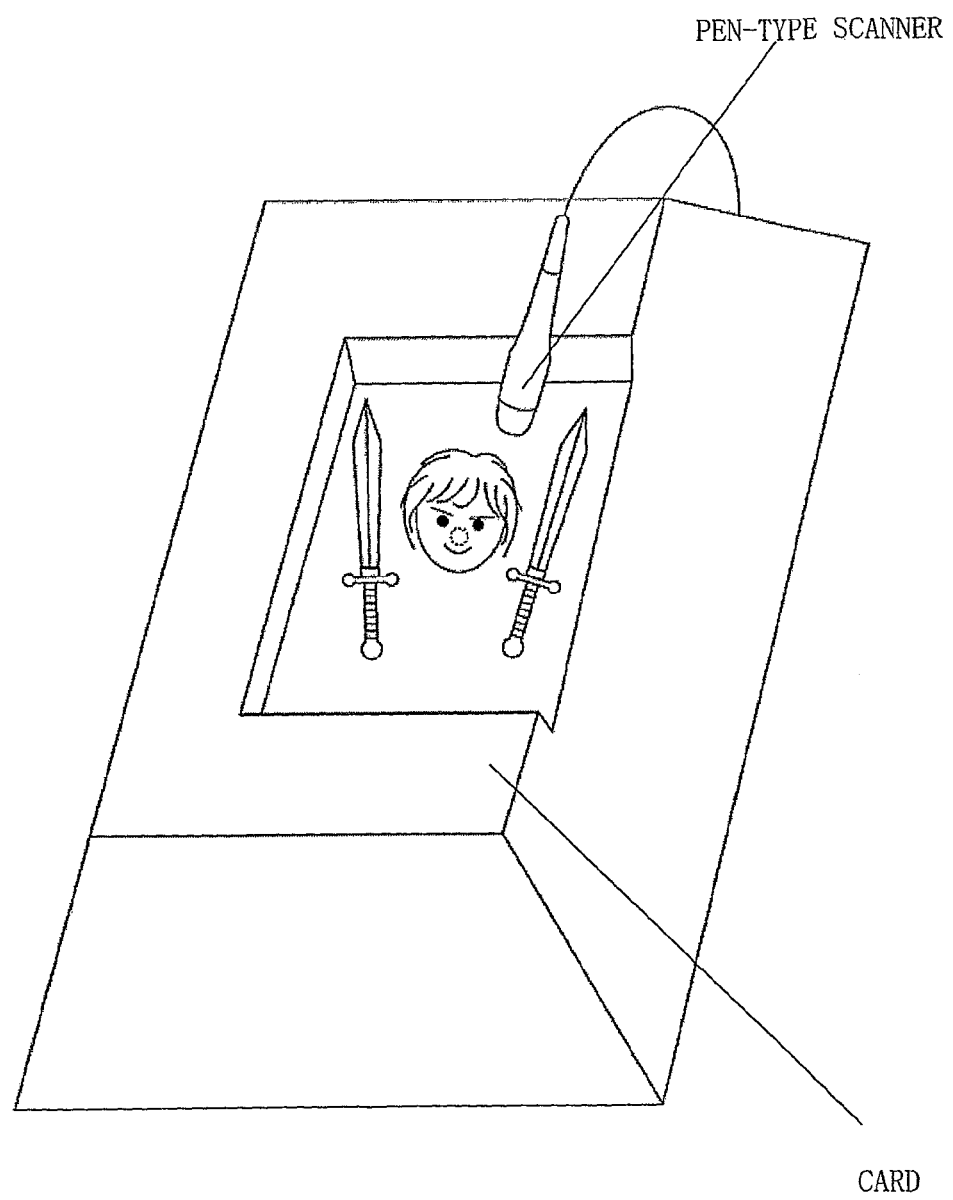
FIG. 47 is a first diagram illustrating a card game machine according to another embodiment of the invention in which a dot pattern is disposed on both sides of a card.
Figure 48:
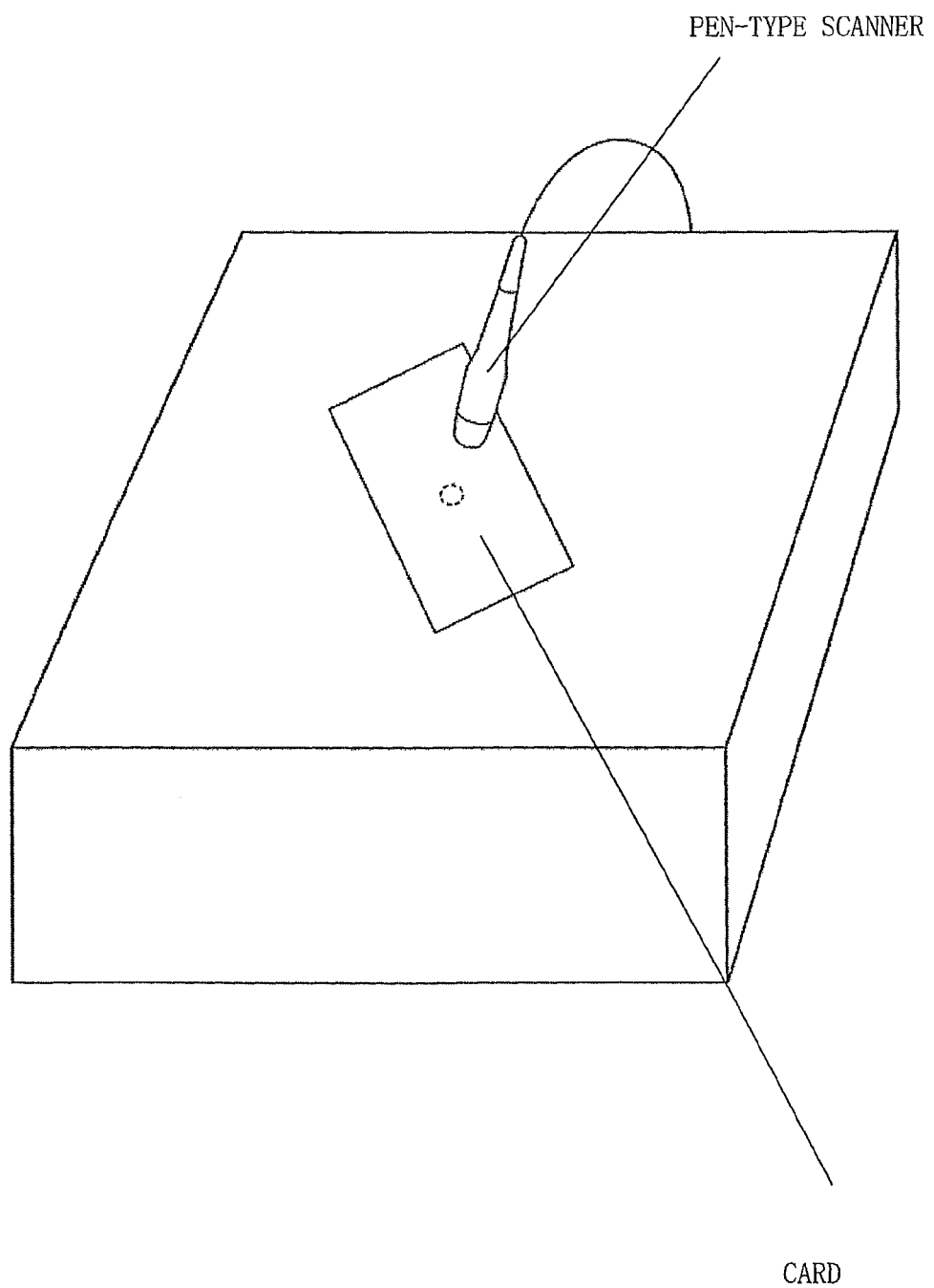
FIG. 48 is a second diagram illustrating a card game machine according to another embodiment of the invention in which a dot pattern is disposed on both sides of a card.

As shown in FIG. 47, the dot patterns may be printed on both sides of the card, the dot pattern of the bottom surface of the card may be read by a main body of the game machine, and the dot pattern of the bottom surface of the card may be read by a pen-type scanner. Since the same structure is used in FIG. 48, the repetitive description is omitted.

Figure 49:
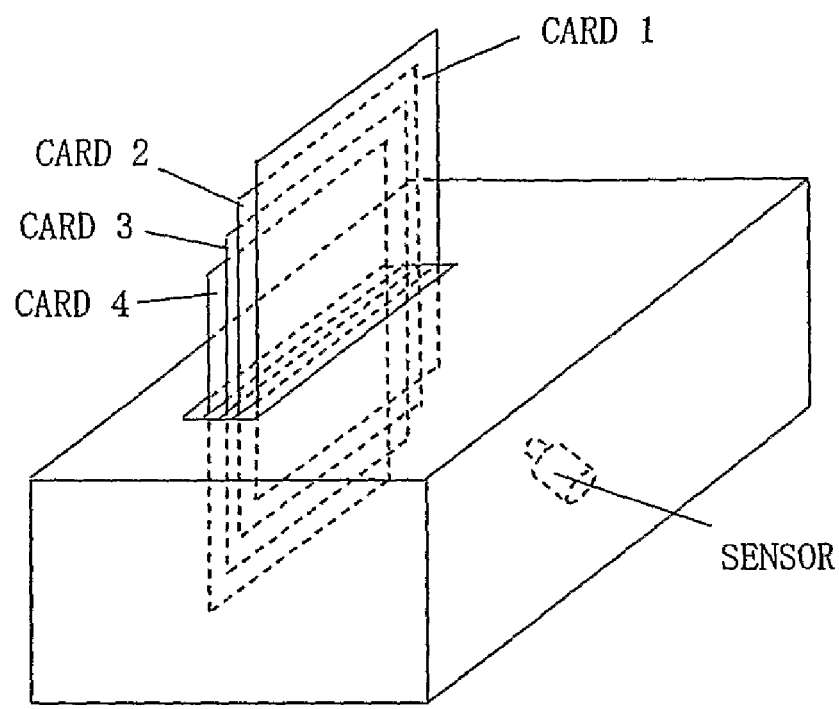
FIG. 49 is a diagram illustrating a structure in which dot patterns of a plurality of sheets of cards are simultaneously read in a card game machine.
Figure 50:
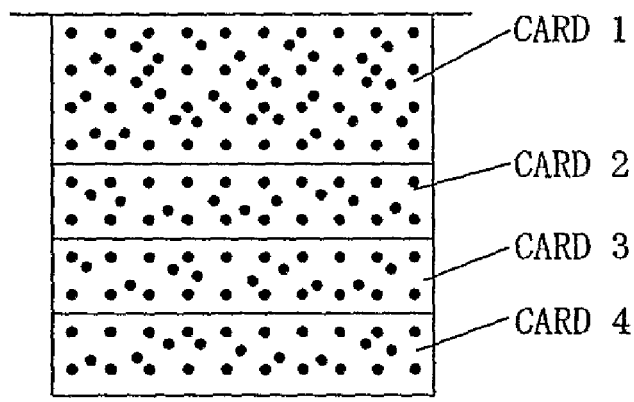
FIG. 50 is a diagram illustrating dot patterns of a plurality of sheets of cards.

FIGS. 49 and 50 are diagrams illustrating a game machine in which a plurality of cards are disposed in a sensor unit and thus dot patterns of the plurality of cards are simultaneously read by the sensor unit. As such, the plurality of cards are simultaneously read by combining the plurality of cards, and thus a combination of parameters of the game becomes further complicated.

Figure 51:
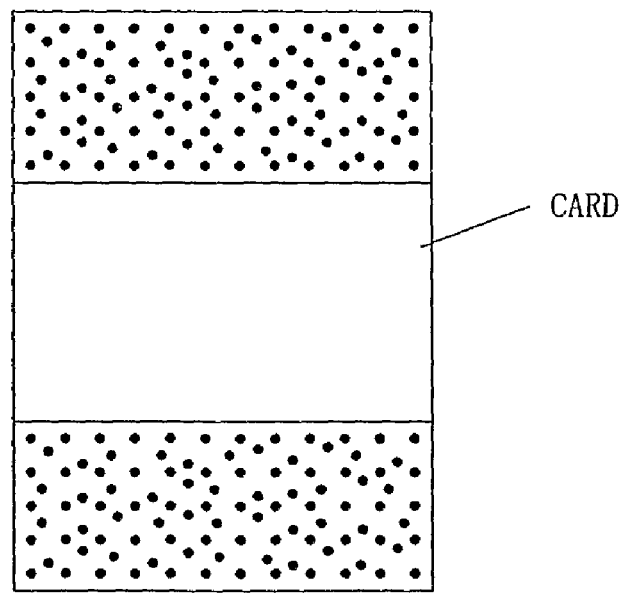
FIG. 51 is a diagram illustrating a printing state of dot patterns of a card on the assumption of performing reading by overlapping.
Figure 52:
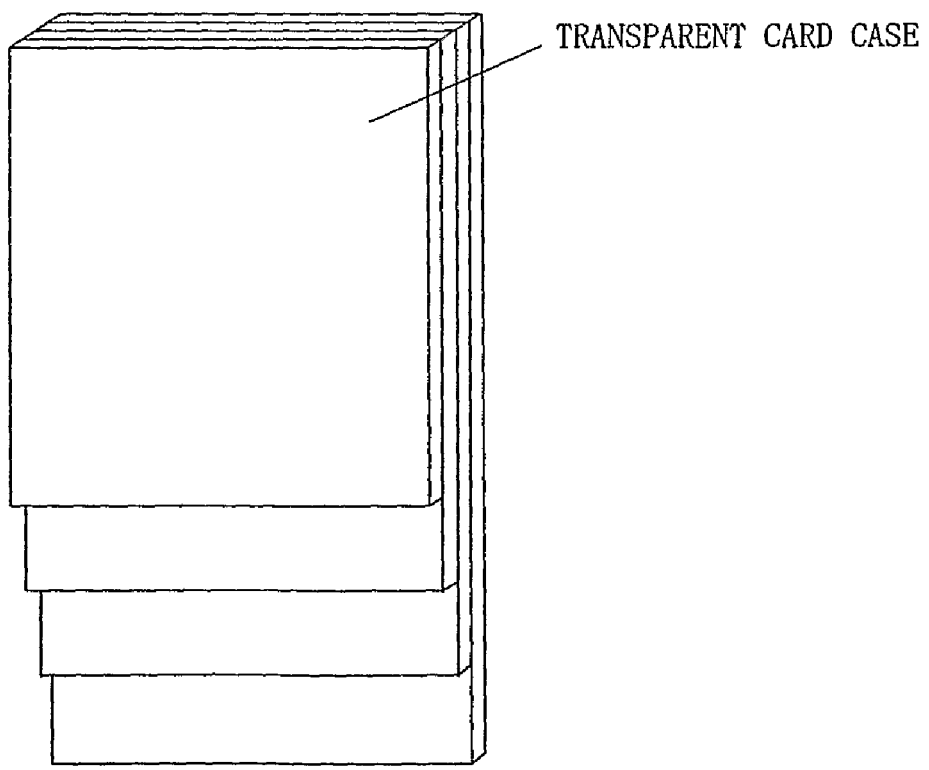
FIG. 52 is a diagram illustrating a transparent card case on the assumption of performing reading by overlapping.

In this case, the cards are set in the game machine while moving slightly in a longitudinal direction. As shown in FIG. 52, a transparent card case for accommodating a plurality of cards at slightly shifted locations may be prepared. FIG. 51 is a diagram illustrating dot pattern forming surfaces of the used card.

Figure 53A:
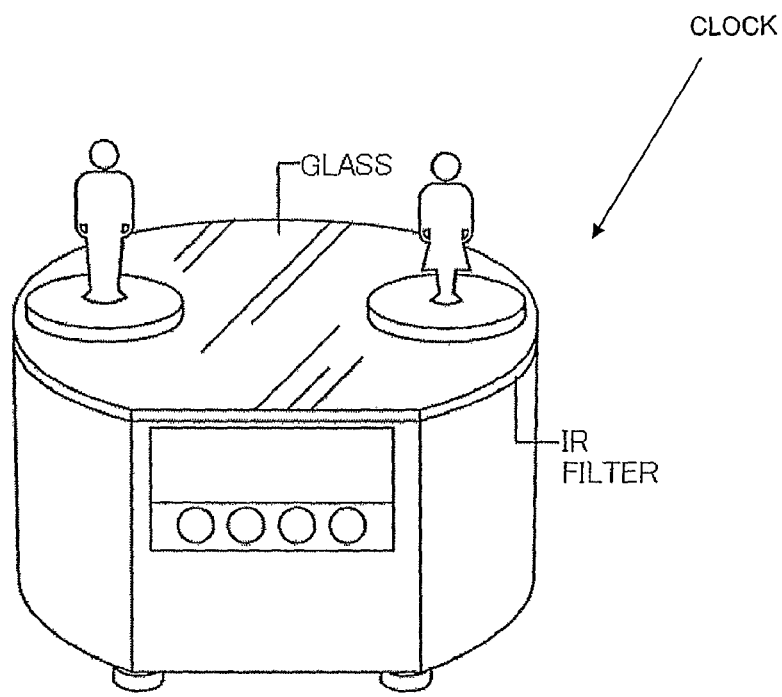
FIG. 53 is a perspective view and a cross-sectional view illustrating a stage in a case in which a medium is set to a figure.
Figure 53B:
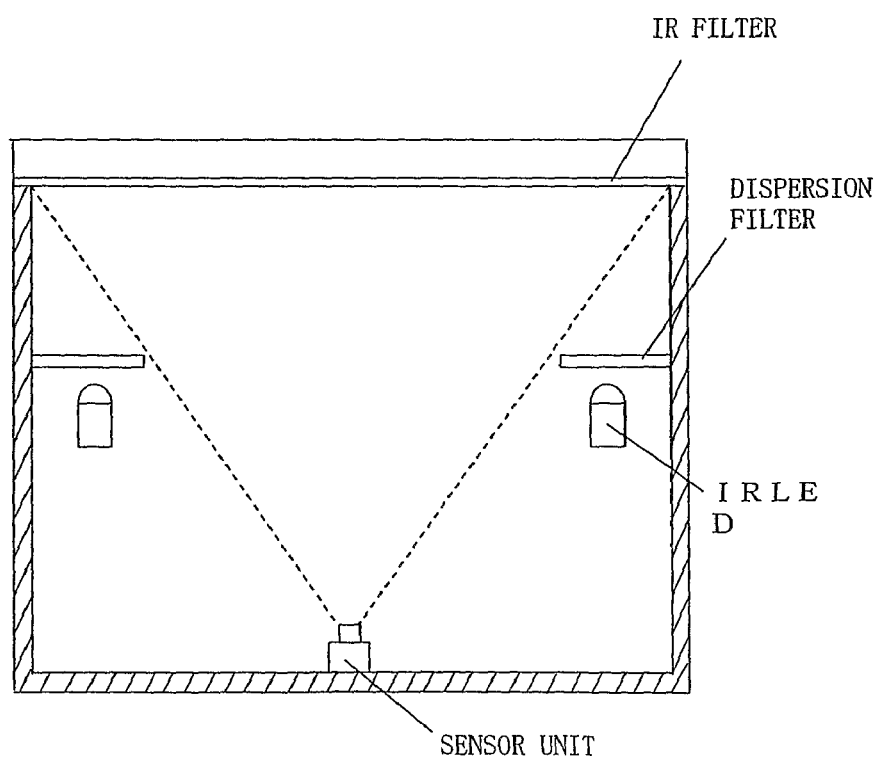

Further, as shown in FIGS. 53A and 53B, instead of the card, the medium may be a figure that has a bottom surface on which dot patterns are formed. The stage is formed in a circular shape, and the top surface of the stage serves as the stage surface on which the figure can be disposed. On the stage surface, the glass plate and the IR filter are laminated. In an inner space of the stage, IRLEDs, dispersion filters, and a sensor unit are provided.

As such, even when the figures are used instead of the cards, output information according to the locations of the figures, the directions of the figures, and the distance between the figures on the stage surface, for example, words may vary. For example, a conversation when figures are placed in face to face and a conversation when the figures are placed in back to back may be different from each other in conversation contents. At this time, the directions of the figures or the distance between the figures is the same as that in the case of the card illustrated in FIG. 32, and thus the description thereof will be omitted.

<Embodiment with Changed Infrared Characteristic>

FIGS. 54 to 68 are diagrams illustrating an embodiment when one system of dot pattern or a plurality of systems of dot patterns of two or more of systems of dot patterns formed of at least two kinds of inks having different reactivity, printed on the medium, are selectively or overlappingly read.

Figure 54:
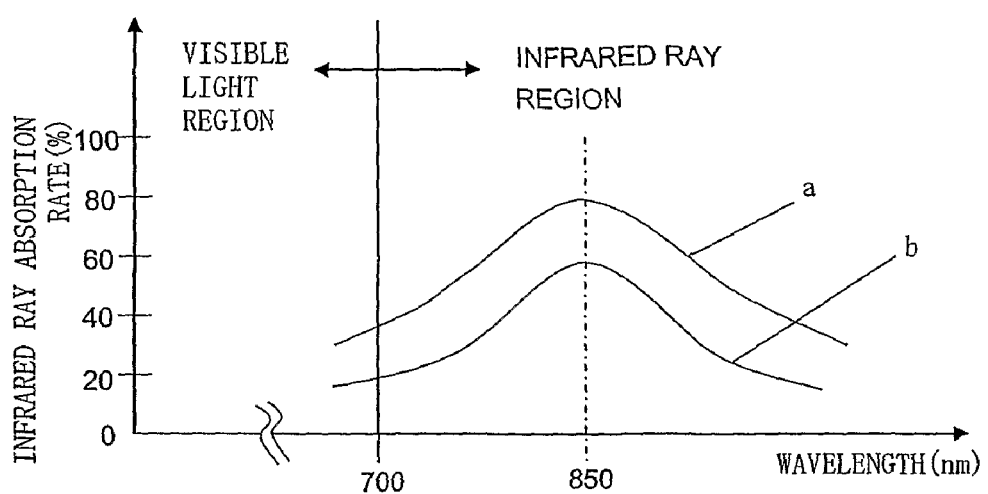
FIG. 54 is a graph illustrating the difference between infrared ray absorptivity of two kinds of inks.

FIG. 54 is a diagram illustrating an example when dot patterns are formed by using two kinds of inks having different infrared ray absorptivity. The difference between the infrared ray absorptivity can be made by controlling a carbon component contained in the ink.

FIG. 54 shows an example when as at least two kinds of inks having different reactivity, two kinds of inks having different infrared ray absorptivity are used in all frequency bands, that is, any frequency.

In the present embodiment, the structure of the information output device is the same as that of other embodiments.

In FIG. 54, an ink a has infrared ray absorptivity of about 80% in a peak wavelength of 850 nm, and an ink b has infrared ray absorptivity of about 60% in the same peak wavelength.

Figure 55:
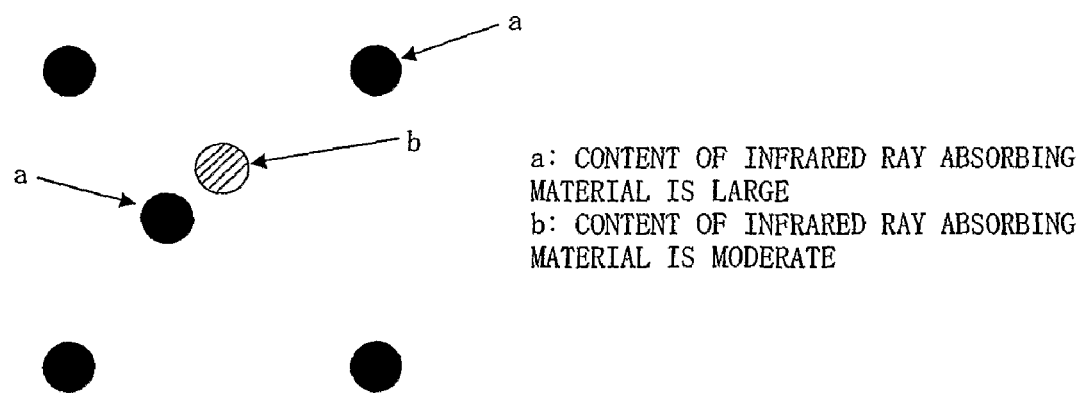
FIG. 55 is a diagram illustrating a recognition state of a dot pattern that uses characteristic ink used in FIG. 54.

When the dot patterns are printed by using two kinds of inks a and b, as shown in FIG. 55, the dot of ink a that has high infrared ray absorptivity of about 80% in a peak wavelength is recognized to be dark, and the dot of ink b that has low infrared ray absorptivity of about 60% in a peak wavelength is recognized to be bright. The dot formed by the ink b is assumed as a false dot, and a dot pattern having the meaning in only the dot formed by the ink a is formed. Generally, at the time of fabrication, the dot of the ink b is also copied without being discriminated from the dot of the ink a. Therefore, the noise due to the ink b permeates into the copied dot pattern, and the reproducibility of the dot pattern by the ink a cannot be ensured. As a result, it is not possible to raise the security.

Figure 56:
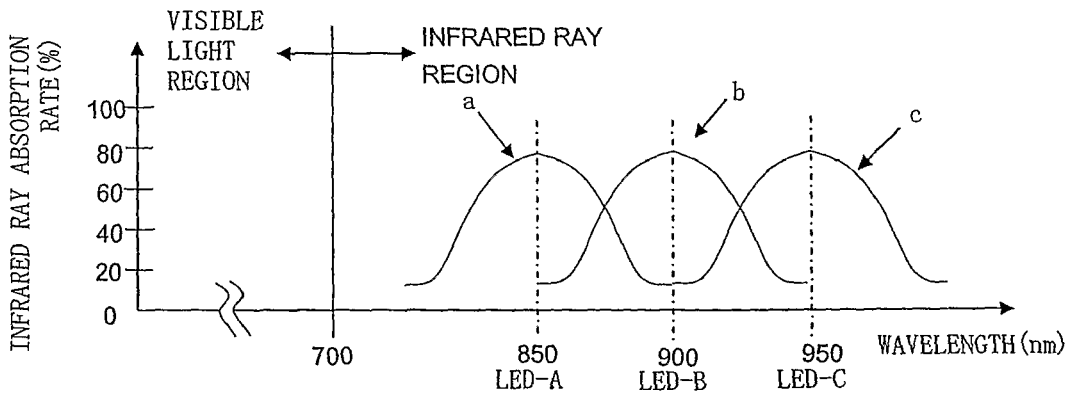
FIG. 56 is a graph illustrating three kinds of inks whose peak wavelength characteristics are different from one another.

FIG. 56 is a diagram illustrating a case in which three kinds of inks, each of which has different peak value wavelength characteristic of infrared ray absorptivity, are used.

The ink a has a peak wavelength of 850 nm, the ink b has a peak wavelength of 900 nm, and the ink c has a peak wavelength of 950 nm. The dot patterns are printed by the inks a, b, and c.

Figure 57A:
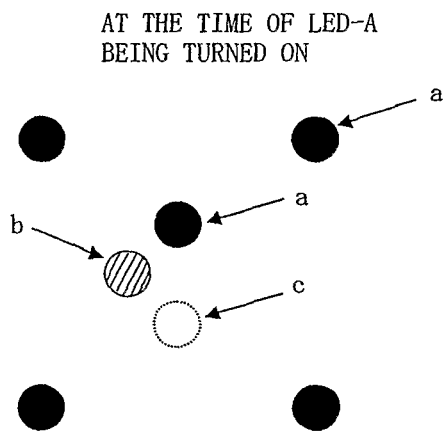
FIG. 57 is a first diagram illustrating a recognition state of a dot pattern that uses characteristic ink shown in FIG. 56.
Figure 57B:
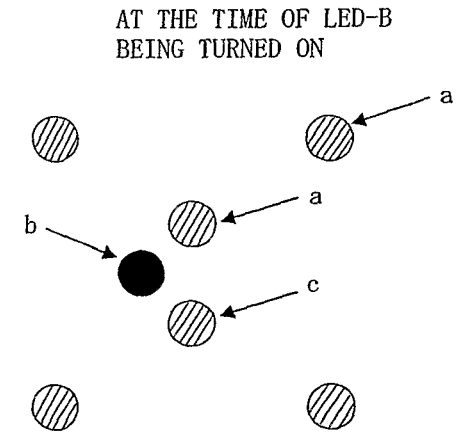
Figure 57C:
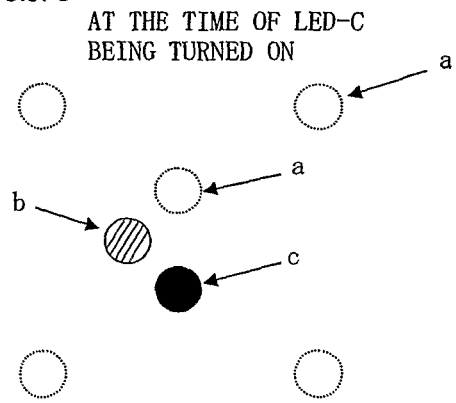

Meanwhile, the LED that serves as the infrared ray irradiating unit selectively or overlappingly irradiates light onto the dot patterns by using an LED-A having wavelength characteristic of 850 nm, an LED-B having wavelength characteristic of 900 nm, and an LED-C having wavelength characteristic of 950 nm. FIGS. 57A to 57C show darkness and brightness of the dot in a case in which light is selectively irradiated by using the LED-A to the LED-C.

Figure 58A:
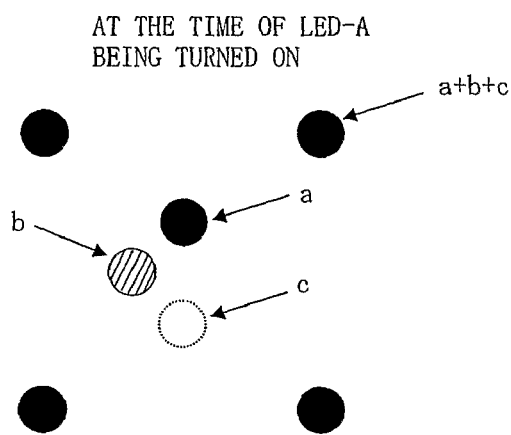
FIG. 58 is a second diagram illustrating a recognition state of a dot pattern that uses characteristic ink shown in FIG. 56.
Figure 58B:
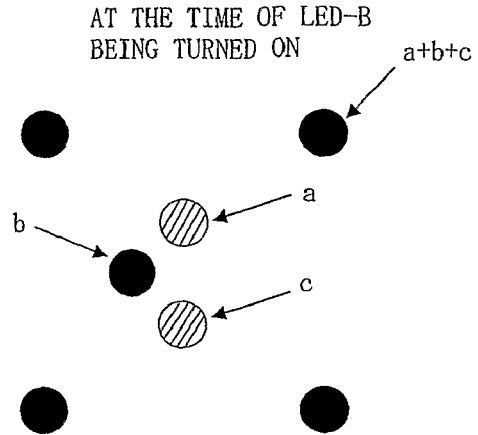
Figure 58C:
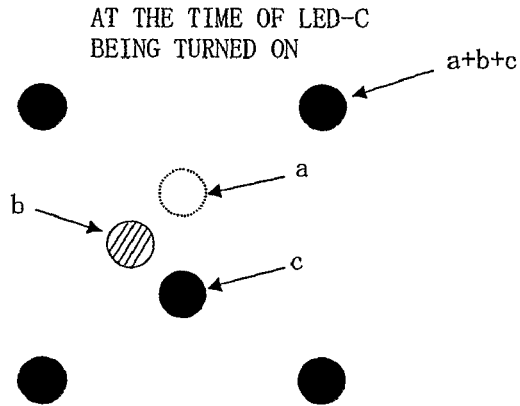

FIG. 58 is a diagram illustrating brightness of the dot in a case in which printing is performed by overlapping the inks a, b, and c with respect to the lattice point dots (four corners). As such, since the lattice dots are printed by all inks, even when light is irradiated by any LED, only the lattice point dot may be obviously recognized. For this reason, if the lattice point dot is recognized, the location of the lattice point dot may be stored in the memory, and thus even the light source is changed, the reading efficiency can be improved.

Figure 59A:
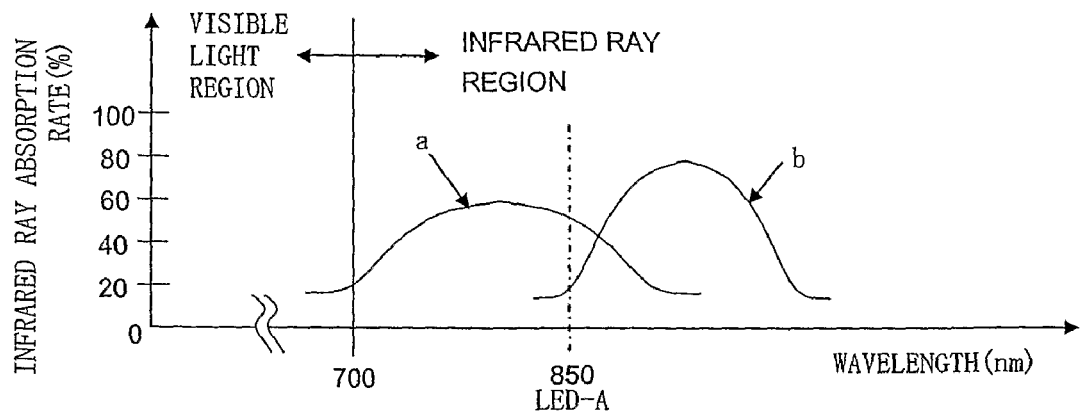
FIG. 59 is a graph illustrating characteristics of two kinds of inks whose infrared absorbing rates and peak wavelengths are different from each other.

FIG. 59A is a diagram illustrating a case in which a first ink (ink a) having a small peak value of infrared ray absorptivity and a small wavelength and a second ink (ink b) having a large peak value of infrared ray absorptivity and a large wavelength are used.

In the present embodiment, an infrared ray entire region light source (first illumination unit), and a second illumination unit (LED-A) are prepared. The second illumination unit is suitable for a wavelength (in this case, 850 nm) in which the infrared ray absorptivity of the first ink is higher than infrared ray absorptivity of the second ink.

Figure 60A:
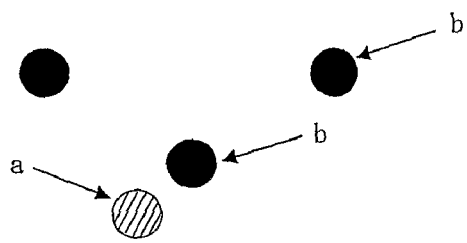
FIG. 60 is a first diagram illustrating a recognition state of a dot pattern that uses characteristic ink shown in FIG. 59.
Figure 60B:
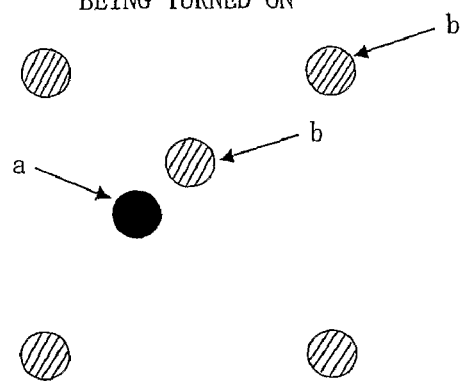
Figure 61A:
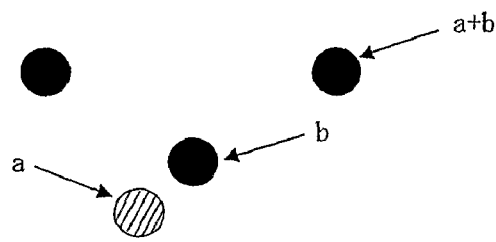
FIG. 61 is a second diagram illustrating a recognition state of a dot pattern that uses characteristic ink shown in FIG. 59.
Figure 61B:
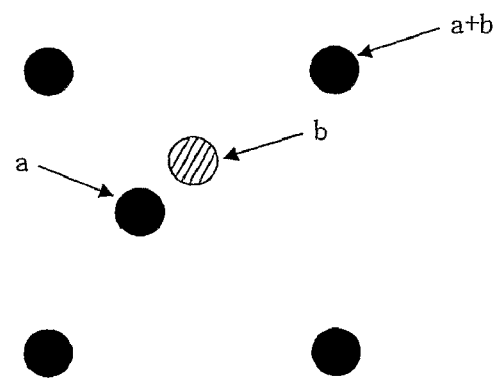

FIGS. 60A to 61B are diagrams illustrating recognized degrees of the dots, when an infrared ray entire region light source is turned on (FIG. 60A and FIG. 61A), and when the LED-A is turned on (FIG. 60B and FIG. 61B).

As can be understood from these drawings, when the infrared ray entire region light source is turned on, the ink b having the high infrared ray absorptivity is recognized to be dark, and when the LED-A is turned on, the ink a having the high infrared ray absorptivity in a wavelength of 850 nm is recognized to be dark. Further, when the inks a and b are printed to overlap each other with respect to the lattice point dot, even when any light source is turned on, the lattice point dot is recognized to be dark.

Figure 59B:
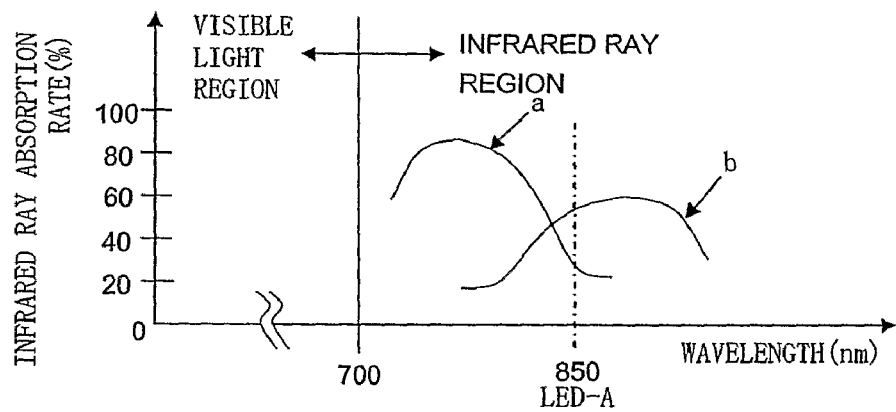

Further, in the present embodiment, as shown in FIG. 59B, an ink having a large peak value of infrared ray absorptivity and a small wavelength may be used as a first ink, and an ink having a small peak value of infrared ray absorptivity and a large wavelength may be used as a second ink.

Figure 62:
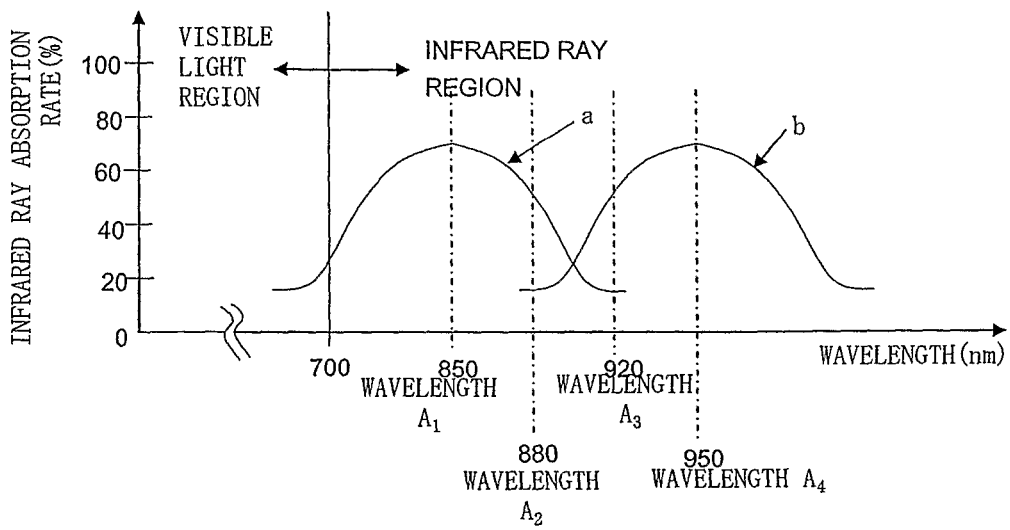
FIG. 62 is a graph illustrating characteristics of two kinds of inks whose infrared absorbing rates and peak wavelengths are different from each other.
Figure 63A:
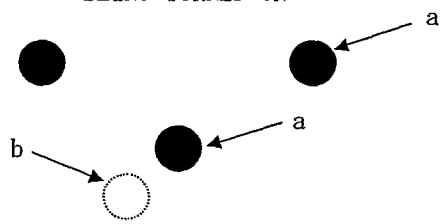
FIG. 63 is a first diagram illustrating a recognition state of a dot pattern that uses characteristic ink shown in FIG. 62.
Figure 63B:
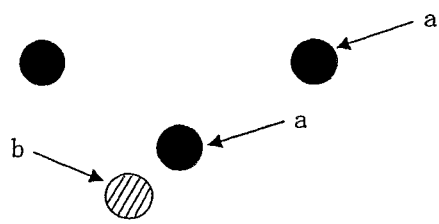
Figure 63A:
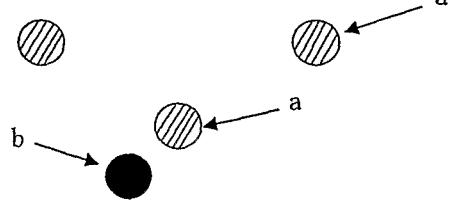
Figure 63B:
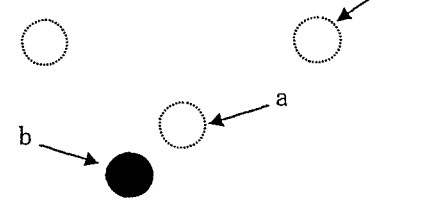
Figure 64A:
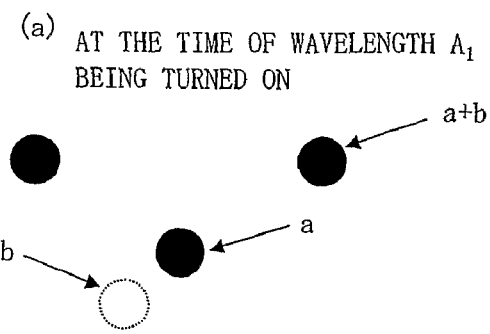
FIG. 64 is a second diagram illustrating a recognition state of a dot pattern that uses characteristic ink shown in FIG. 62.
Figure 64B:
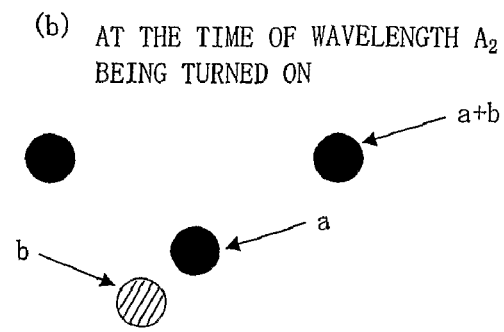
Figure 64C:
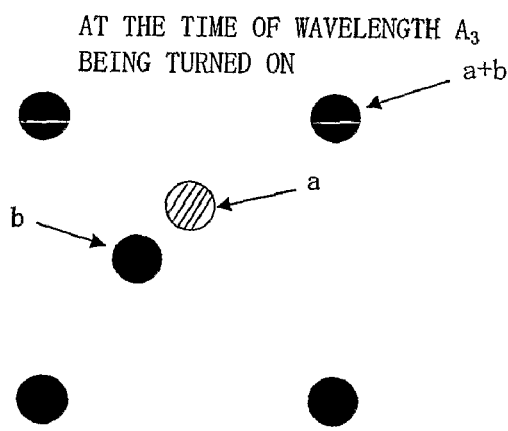
Figure 64D:
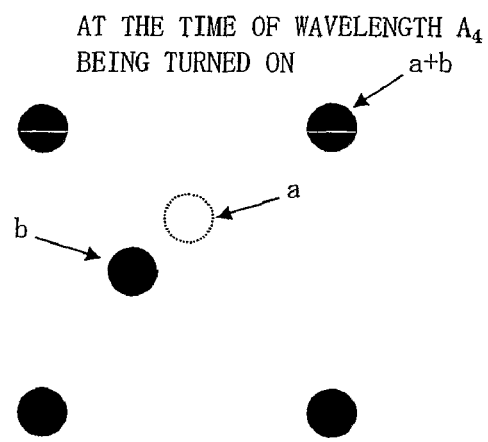

FIGS. 62 to 64 are diagrams illustrating a control method in a case in which a single infrared ray irradiating light source whose wavelength characteristic varies is used, when the inks a and b, each of which has different peak wavelength characteristic, are used.

As shown in FIGS. 63 and 64, by changing the wavelength characteristic, recognized degrees for the inks a and b may be different from each other.

Figure 65A:
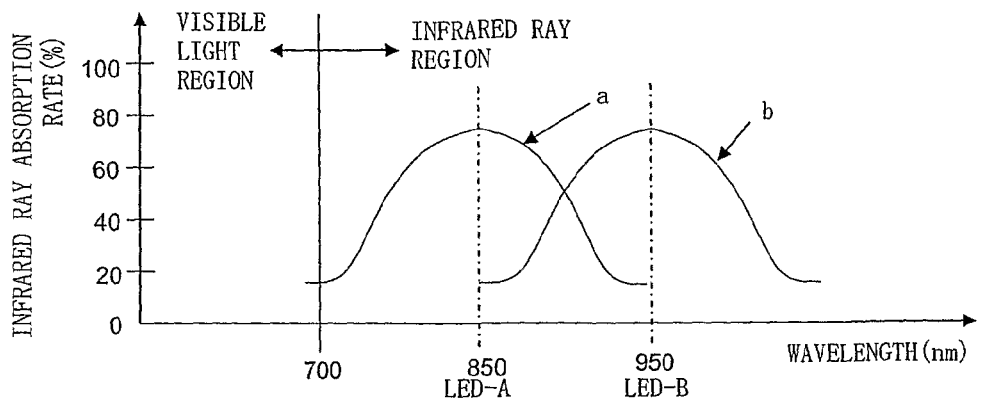
FIG. 65 is a diagram illustrating characteristic of two kinds of inks whose peak wavelength characteristics are different from each other, and characteristic of an infrared ray transmitting rate of a filter.
Figure 65B:
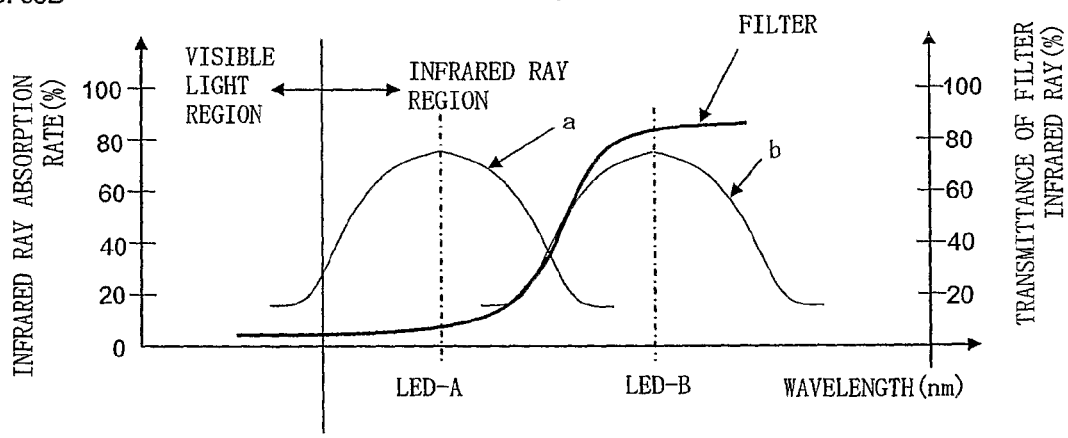
Figure 66A:
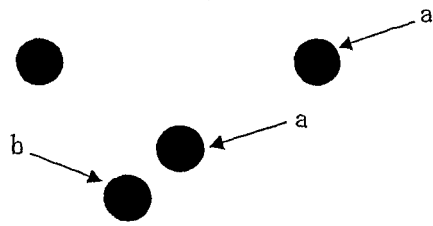
FIG. 66 is a first diagram illustrating a recognition state of a dot pattern that uses characteristic ink shown in FIG. 65.
Figure 66B:
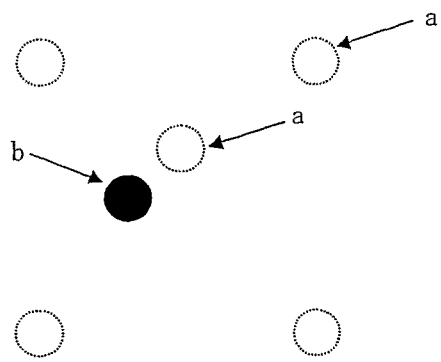
Figure 67A:
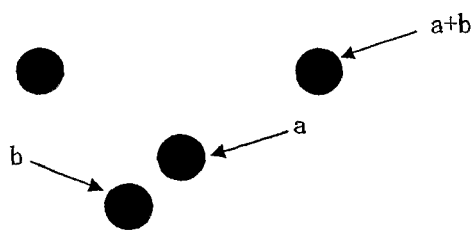
FIG. 67 is a second diagram illustrating a recognition state of a dot pattern that uses characteristic ink shown in FIG. 65.
Figure 67B:
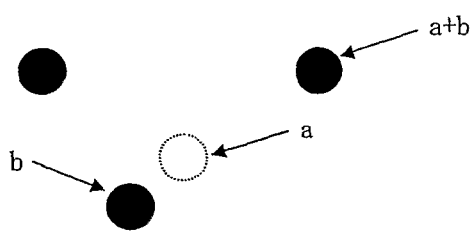

FIGS. 65 to 67 are diagrams illustrating variation of the dot recognition degree when using inks a and b with different peak wavelength characteristic, the infrared ray irradiating light sources LED-A and LED-B suitable for the inks a and b, and an infrared filter transmitting only the infrared light by the LED-B.

As such, the filter that selectively transmits the infrared wavelength of the ink b is used. As shown in FIGS. 66 and 67, the filter is selectively disposed, and the dot recognition degrees by the inks a and b may be different from each other.

Figure 68:
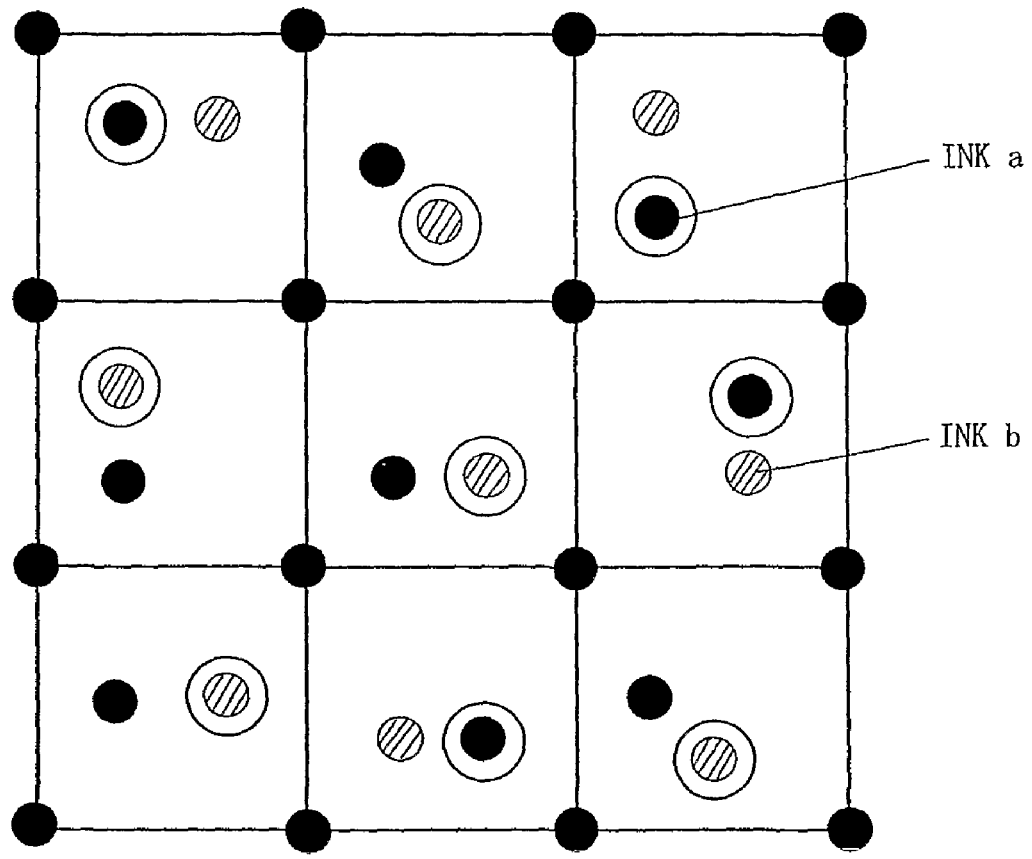
FIG. 68 is a diagram illustrating a case in which a security is raised by selectively reading dots by inks having different infrared absorbing rates.

FIG. 68 is a diagram illustrating an example of the dot pattern in a case in which the two kinds of dots using the difference between the infrared ray wavelength characteristics by the above-described inks are selectively adopted.

For example, FIG. 68 shows a case in which when the two kinds of dots having the different infrared ray absorptivity are recognized, as described in FIGS. 54 and 55, the dots printed by the ink a and recognized to be dark (dots printed to be dark in FIG. 68), and the dots printed by the ink b and recognized to be bright (dots hatched in FIG. 68) are selectively read. In FIG. 68, the dots surrounded by ○ are selected. That is, the selection table is set on the memory of the information output device, and for example, in the lattice block of FIG. 68, the dot of the ink a is selected in a lattice region of the left of an upper stage, the dot of the ink b is selected in a lattice region of the center of the upper stage, the dot of the ink a is selected in a lattice region of the right of the upper stage, the dot of the ink b is selected in a lattice region of the center of a middle stage, the dot of the ink a is selected in a lattice region of the right of the middle stage, the dot of the ink b is selected in a lattice region of the left of a lower stage, the dot of the ink a is selected in a lattice region of the center of the lower stage, and the dot of the ink b is selected in a lattice region of the right of the lower stage. In this way, the dots are selectively read. As such, the dots are read on the basis of the selection table such that correction information is first outputted. Therefore, it is possible to ensure very high security.

Figure 69:
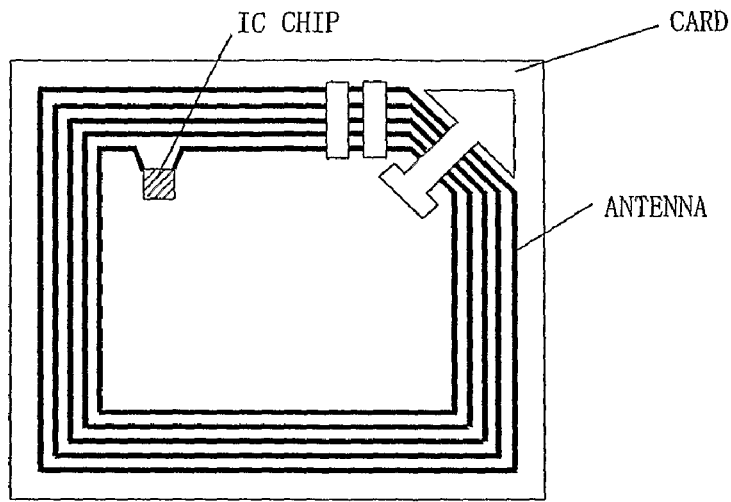
FIG. 69 is a diagram illustrating a case in which an RFID is built in a card where a dot pattern is formed.
Figure 70:
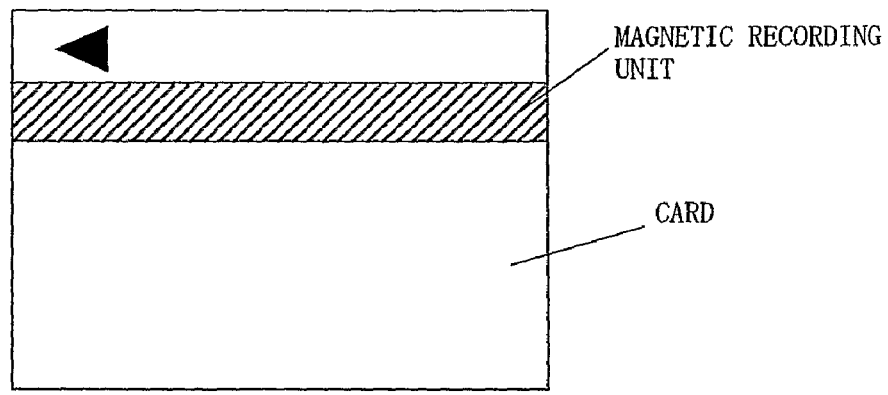
FIG. 70 is a diagram illustrating a case in which a magnetic recording portion is provided on a card where a dot pattern is formed.
Figure 71:
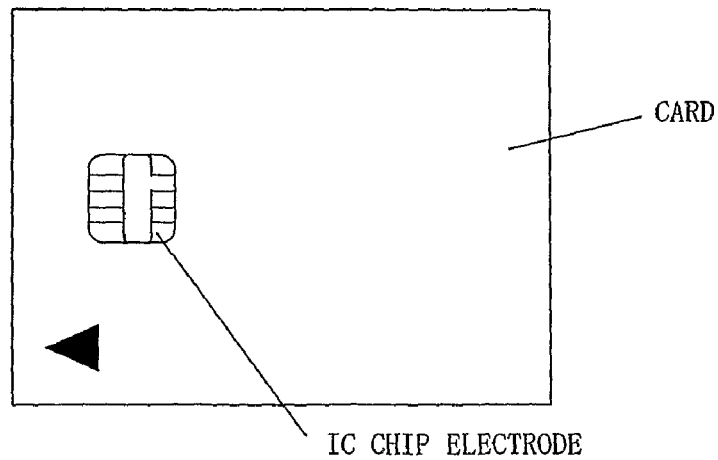
FIG. 71 is a diagram illustrating a case in which an IC chip is built in a card where a dot pattern is formed.

In the above-described description, the case in which the dot patterns are printed on the card as the medium has been described, but the invention is not limited thereto. For example, instead of the dot patterns, a RFID chip shown in FIG. 69, a magnetic recording unit made of magnetic stripes shown in FIG. 70, and an IC chip shown in FIG. 71 may be complexly built in the card.

The composite card having the storage unit is used, and thus the score of the player may be stored.

Figure 72:
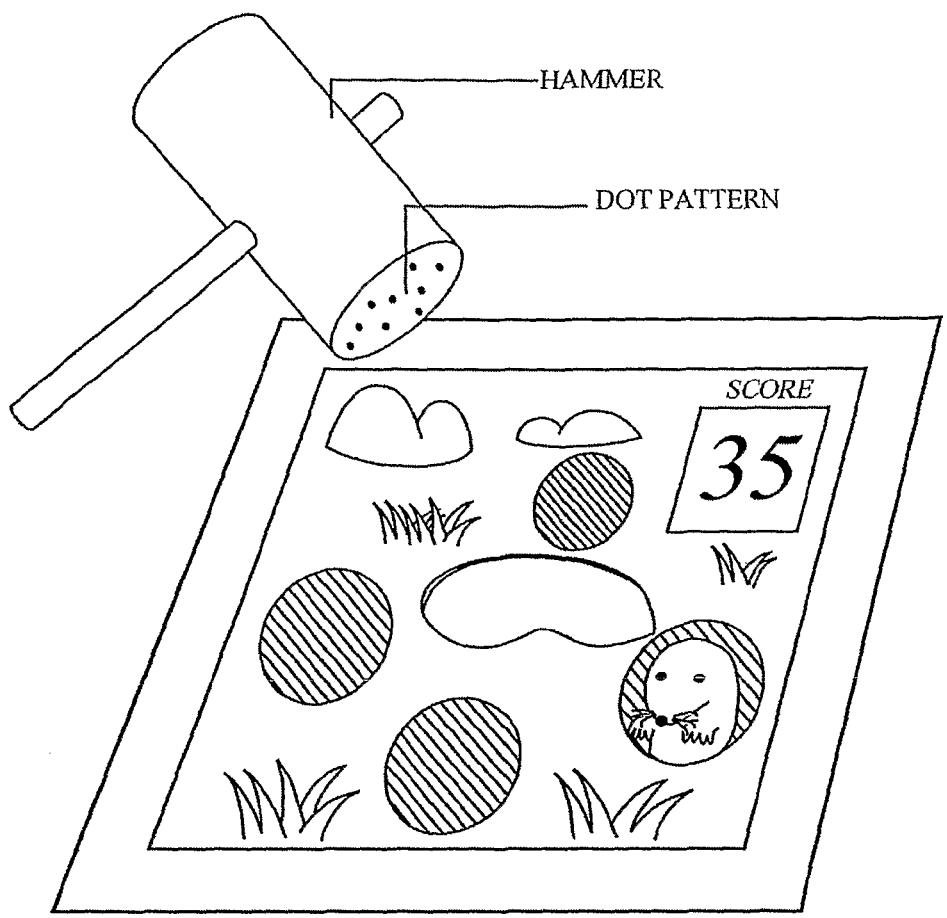
FIG. 72 is a diagram illustrating a Wack-A-Mole game machine that uses a dot pattern.
Figure 73:
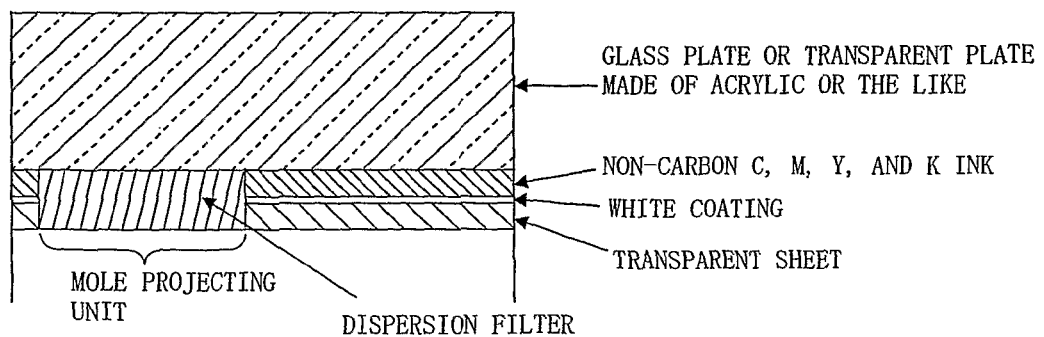
FIG. 73 is a cross-sectional view illustrating a plane of a stage of a Wack-A-Mole game machine shown in FIG. 72.

FIG. 72 is a diagram illustrating a specific example of a Whack-A-Mole game machine using the embodiment of the invention, and FIG. 73 is a cross-sectional view illustrating the stage surface of the Whack-A-Mole game machine.

In the present embodiment, dot patterns are printed on a surface of a hammer held by the player. Further, on the transparent sheet of the stage surface that is coated by a white color, a background color of a field of grass is printed, and mole projection portions are provided at several locations of the stage surface. As shown in FIG. 73, in the mole projection portion, a dispersion filter is inserted, instead of a transparent sheet layer coated by a white color and a CMYK ink layer that does not contain carbon. In addition, a glass plate or a transparent plate made of acrylic or the like is disposed on the CMYK ink layer that does not carbon and the dispersion filter.

In the mole projection portions, the characters of the moles are randomly projected from the bottom surface of the stage by the projector per predetermined time. In a case in which the characters of the moles are projected, when the surface of the hammer is located on the mole projection portion, the dot pattern of the hammer surface is read by a sensor unit provided in the space below the bottom surface of the stage. In this case, the dot pattern is analyzed, and converted into a code value set for each hammer surface, and the score is added by the game microprocessor unit. Further, in a case in which the characters of the moles are not projected in the mole projection portions, even when the hammer surface is located on the mole projection portion, the score at this time is not added. Further, when the mole characters are not projected in the mole projection portions, the sensor unit may be programmed such that the sensor unit does not perform the imaging process of the dot pattern.

As described above, the different code values are printed as the dot patterns for every hammer surface. When a hammer for a high-level player (a hammer where a dot pattern indicating a code value for a high-level player is printed on a hammer surface) is used in a game, the game microprocessor unit that has read the dot pattern of the surface of the hammer for the high-level player performs control for reducing the projection time of the characters of the moles at the mole projection portions with respect to the projector, such that a degree of difficulty of the game is raised.

In the above-described description, the dot patterns are formed on the hammer surfaces. However, the dot patterns may be printed on the cards, or the dot patterns may be printed on the bottom surfaces of the figures.

In the above-described embodiments, as the media, the cards, the figures, the hammers for a game, and the like have been exemplified. The different ink characteristic or the irradiation light of the different characteristic is used, and the selectivity of the dot pattern is widen, which results in raising the security. Therefore, the invention may be applied to the counterfeit preventing subject media, such as a tag, a certificate (identification certificate, and a passport), an exchange ticket for money, a ticket, and the like. Further, any one of the RFID tag, the magnetic storage unit, or a memory composed of an IC chip may be built in the counterfeit preventing subject media.

Another Embodiment

Corresponding to the Thirty Second Aspect of the Invention

FIGS. 74A to 74D are diagrams illustrating a case in which the cards are used as the media. In FIGS. 74A to 74D, on the surfaces of these cards, a kind of a trump as a picture (corresponding to FIG. 74A), an alphabetic letter like A (corresponding to FIG. 74B), a two-dimensional code (corresponding to FIG. 74C), and the dot pattern (FIG. 74D) are printed. However, if they are photographed by the imaging unit and then reproducible as code information by the information processing unit, it is possible to use any one of pictures, characters, diagrams, codes, and patterns.

The pictures, the characters, the diagrams, the codes, and the patterns are printed by the inks having the infrared ray absorbing characteristic.

Figure 75:
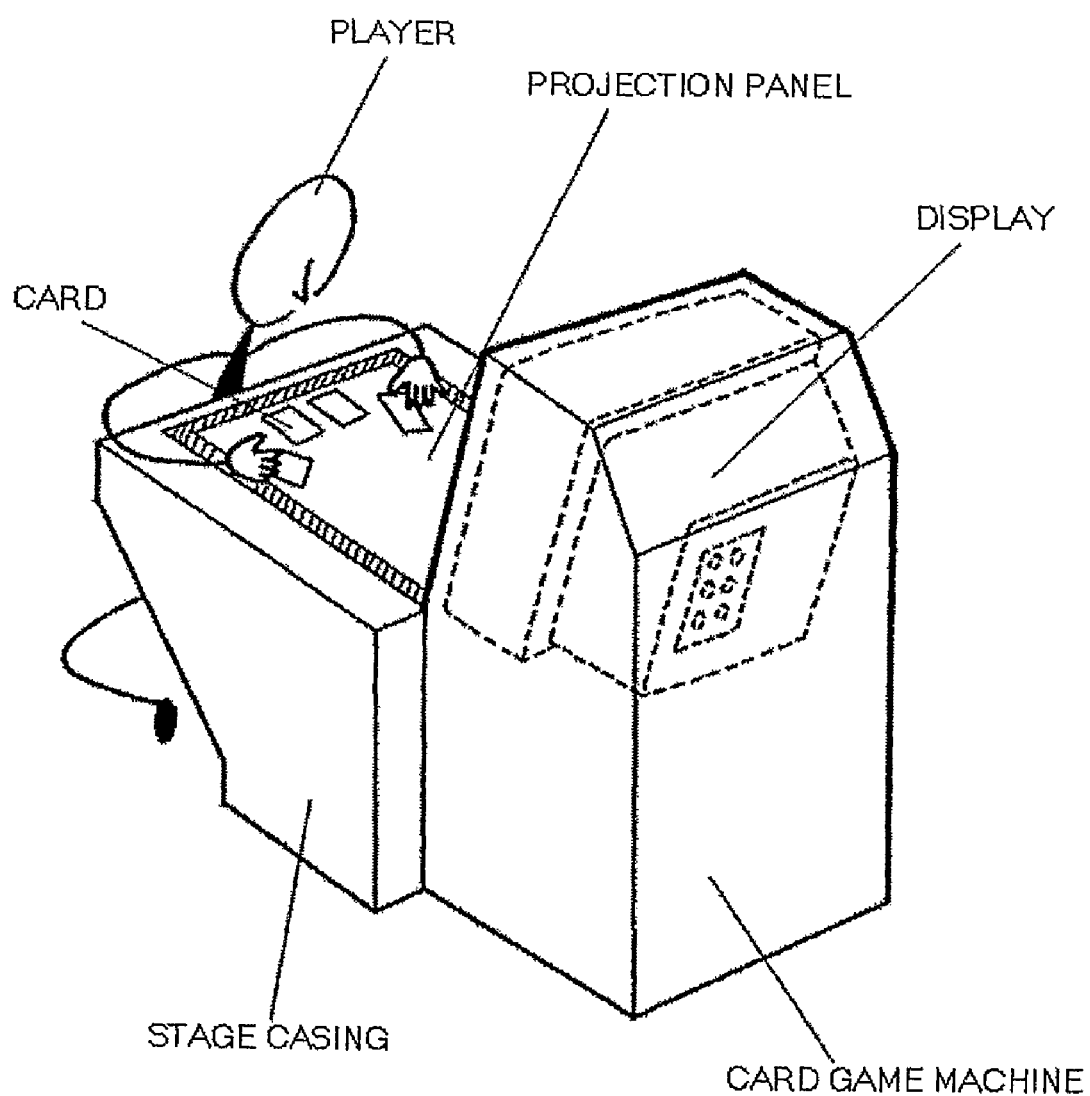
FIG. 75 is a perspective view illustrating a card game machine according to an embodiment of the invention.
Figure 76:
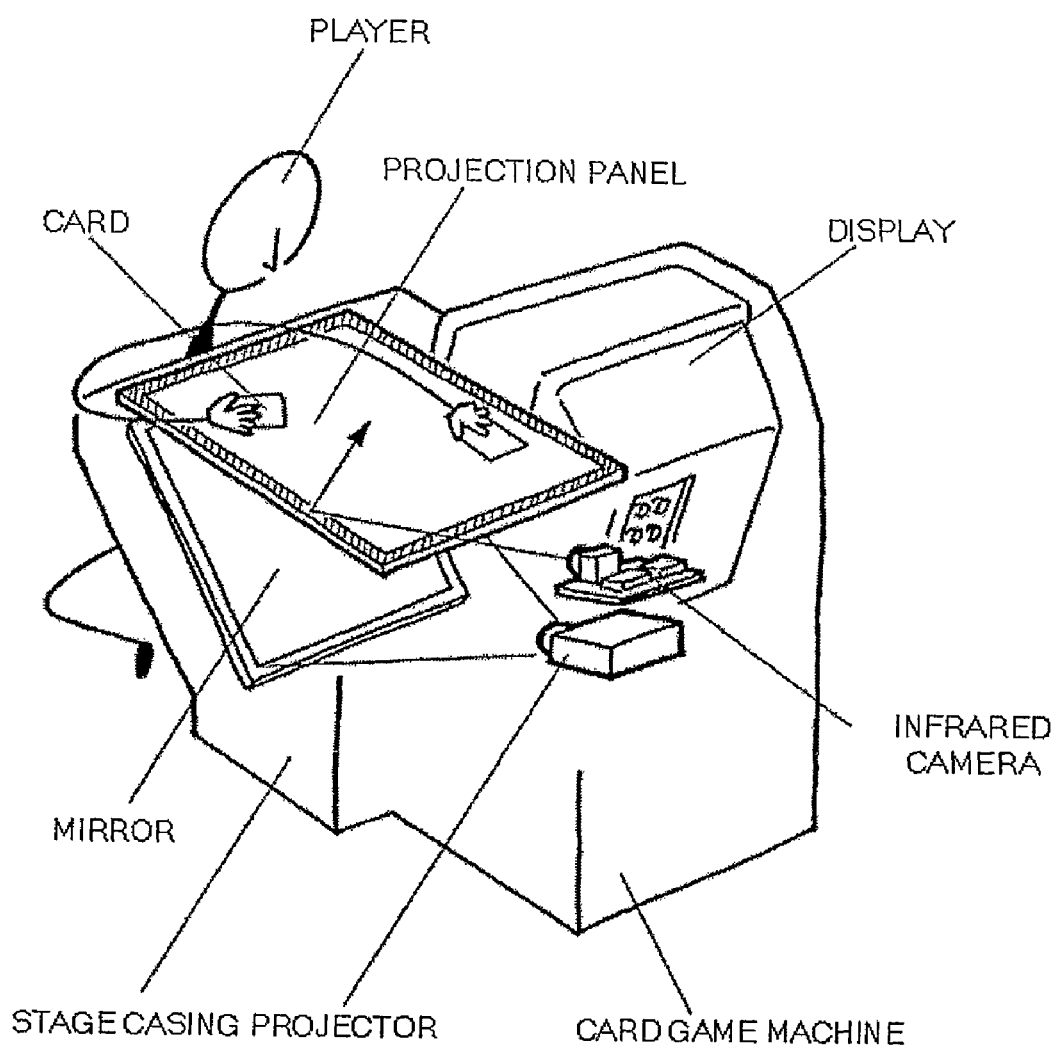
FIG. 76 is a perspective view illustrating a portion of a card game machine according to an embodiment of the invention in which a front surface of a stage is used as a projection region of a projection panel and an infrared ray photographic region.
Figure 77:
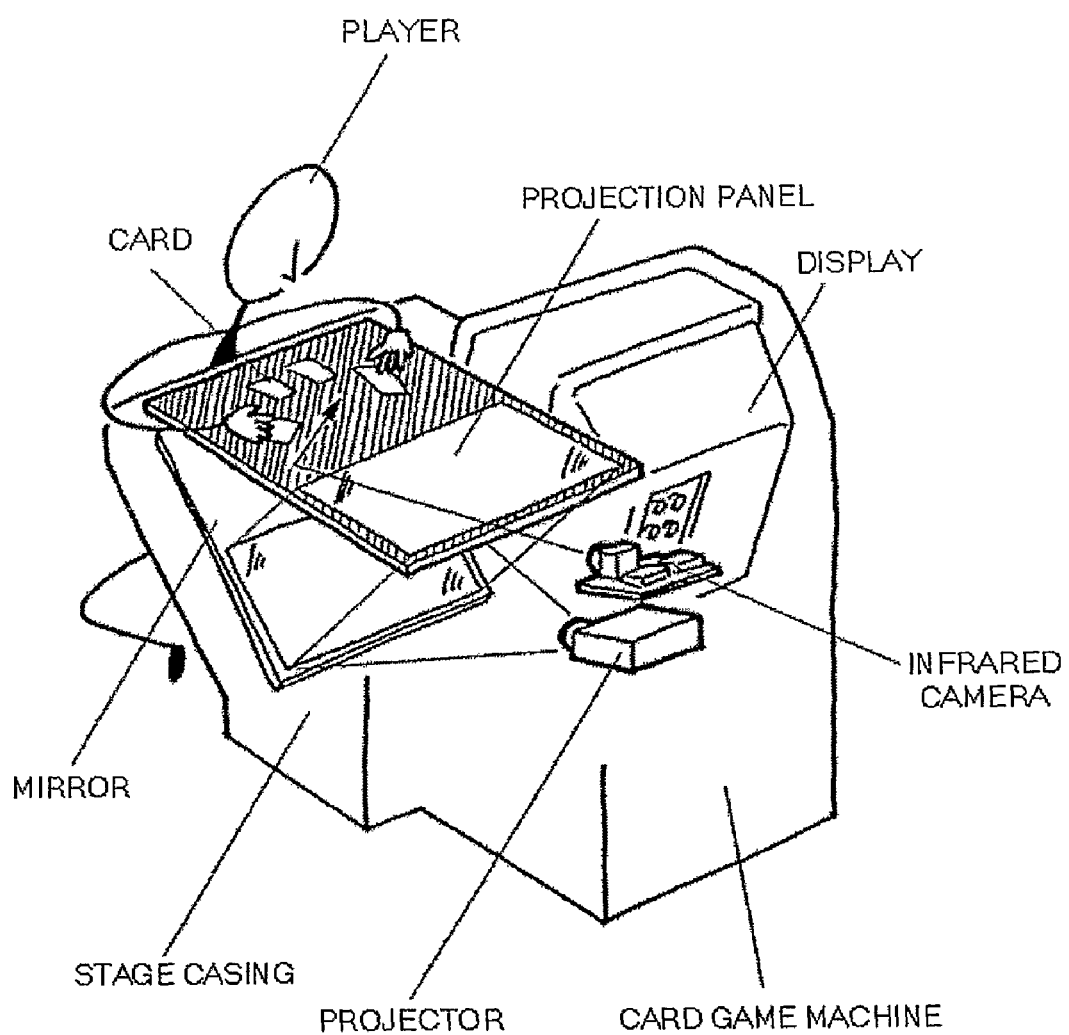
FIG. 77 is a perspective view illustrating a portion of a card game machine according to an embodiment of the invention in which a portion of a stage is used as a projection region of a projection panel and an infrared ray photographic region.

FIG. 75 is a perspective view illustrating a card game machine according to the present embodiment. FIGS. 76 and 77 are perspective views illustrating a portion of the card game machine.

The main body of the card game machine has a stage casing, and a projection panel serving as a stage surface is formed on the top surface of the stage casing in a horizontal direction.

Further, in the casing, an infrared camera serving as an imaging unit is provided. The bottom surface of the projection panel is photographed through the mirror that is disposed in an oblique direction. Further, a projector is provided in parallel to the infrared camera, and the multimedia information, such as characters, diagrams, images, moving pictures, and the like, can be displayed on the bottom surface of the projection panel through the mirror.

Further, at the side opposite to the side where the player is located with respect to the projection panel, the display is provided, and the player can play a game while viewing the projection panel and the display at hand.

Although not shown in FIGS. 75 to 77, the infrared camera, the projector, and the display may be connected to the information processing device, such as a personal computer and the like, so as to be controlled.

Figure 36:
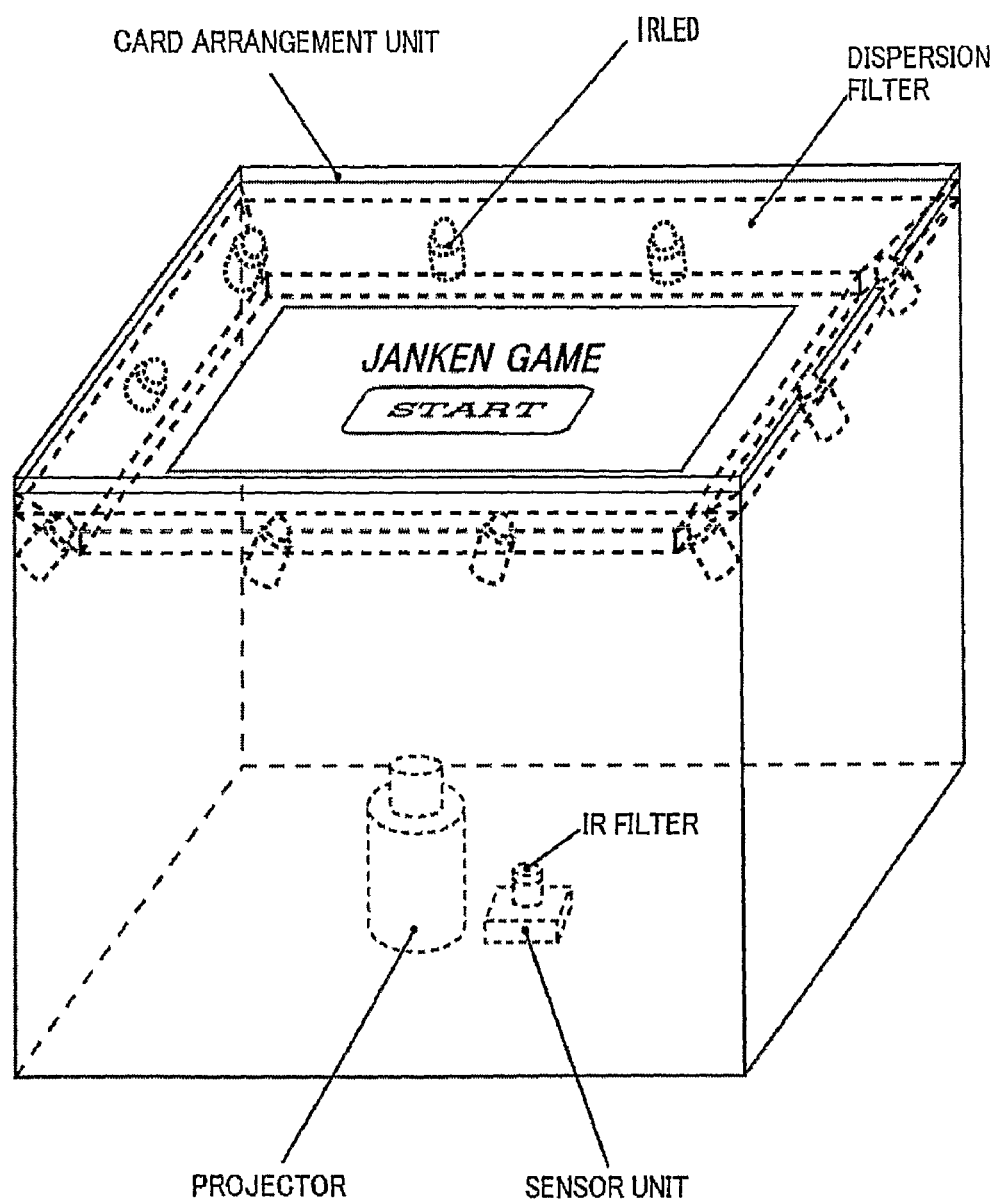
FIG. 36 is a perspective view illustrating a card game machine in which only one sensor is provided and an image is displayed on a card arrangement panel.

Further, although not shown in the drawings, in the casing, the infrared ray irradiation units, such as the IRLEDs, that irradiates light onto the bottom surface of the stage, are disposed with the same structure as those shown in FIGS. 36 to 38.

In addition, to the information processing device, on the basis of the projection image from the infrared camera, the location information of the card serving as the medium on the stage surface, the direction information of the card or medium state information such as a state of the contact surface between the projection panel surface and the card, and information of codes printed on the medium surface are inputted, and the medium state information, multimedia information, such as characters, images, moving pictures, and the like, that corresponds to the code information, are outputted and displayed on an entire surface or a portion of the stage surface composed of a projection panel by the projector.

As such, the code information printed on the card is photographed by the infrared camera, and multimedia information, such as sounds, characters, images or moving pictures, corresponding to the code information, is displayed on the surface of the stage on which the medium is disposed, and the display production associated with the code information of the card can be made.

Figure 78:
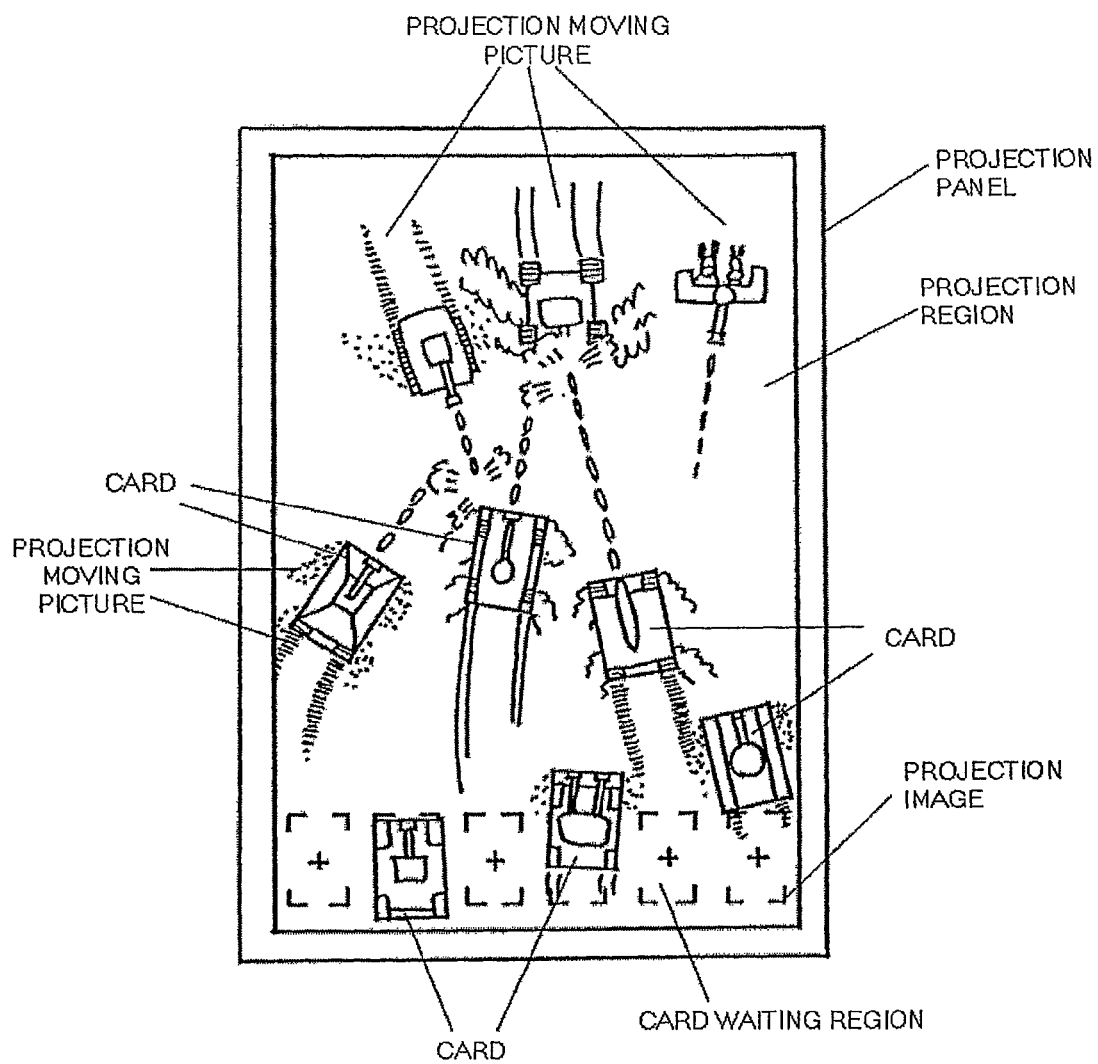
FIG. 78 is a diagram illustrating a card disposed on an entire surface of a projection panel and multimedia information projected onto an entire surface of the projection panel.

FIG. 78 is a diagram illustrating the card on the projection panel and a display example of the multimedia information. In this case, marks indicating the card waiting regions are displayed at the player side, and the cards are disposed in the waiting regions in an initial state of a game. The top surface of a tank is printed on the surface of the card, and the code information of the tank is printed on the back surface of the card as the dot pattern shown in FIGS. 16 to 27.

If the player moves the card from the waiting region, the moving state is photographed by the infrared camera, and the movement of the card is recognized by the information processing device. At this time, the arrangement or movement of the card can be recognized by methods shown in FIGS. 28 to 34.

In the information processing device, the arrangement or movement state of the card is recognized, and image or moving picture information that is associated with the arrangement location or the operation state is read from a storage device (hard disk device (not shown)), or sequentially calculated, and displayed on the projection panel through the projector. At this time, image or moving picture information corresponds to an image of a shell from the tank or an image of desert dusts when the tank moves in the desert, and an image of a caterpillar trace remaining in the desert. These images are associated with the cards, and projected onto the peripheral portions of the cards. As a result, when the card game is performed, the realistic sensation of the game can be raised.

Figure 85:
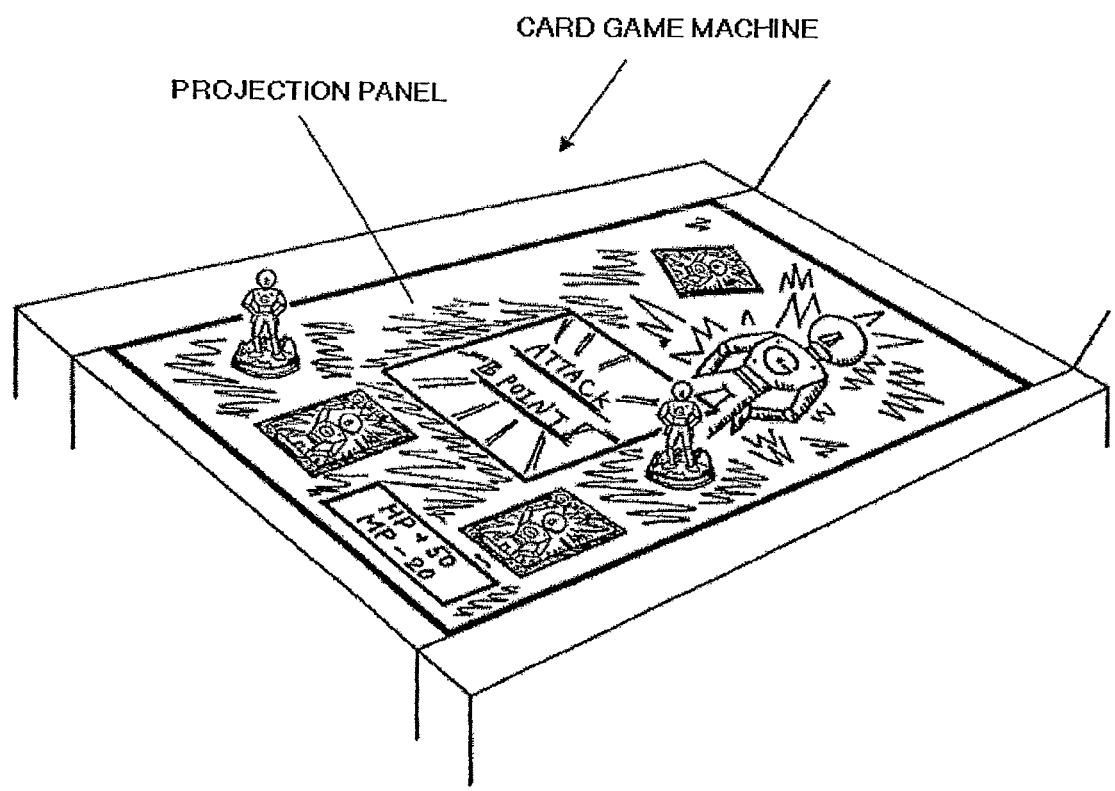
FIG. 85 is a diagram illustrating a state in which a score or a parameter varied by operating a card or a figure disposed on a projection panel is displayed on a projection panel while avoiding a location of a card or a figure.
Figure 86:
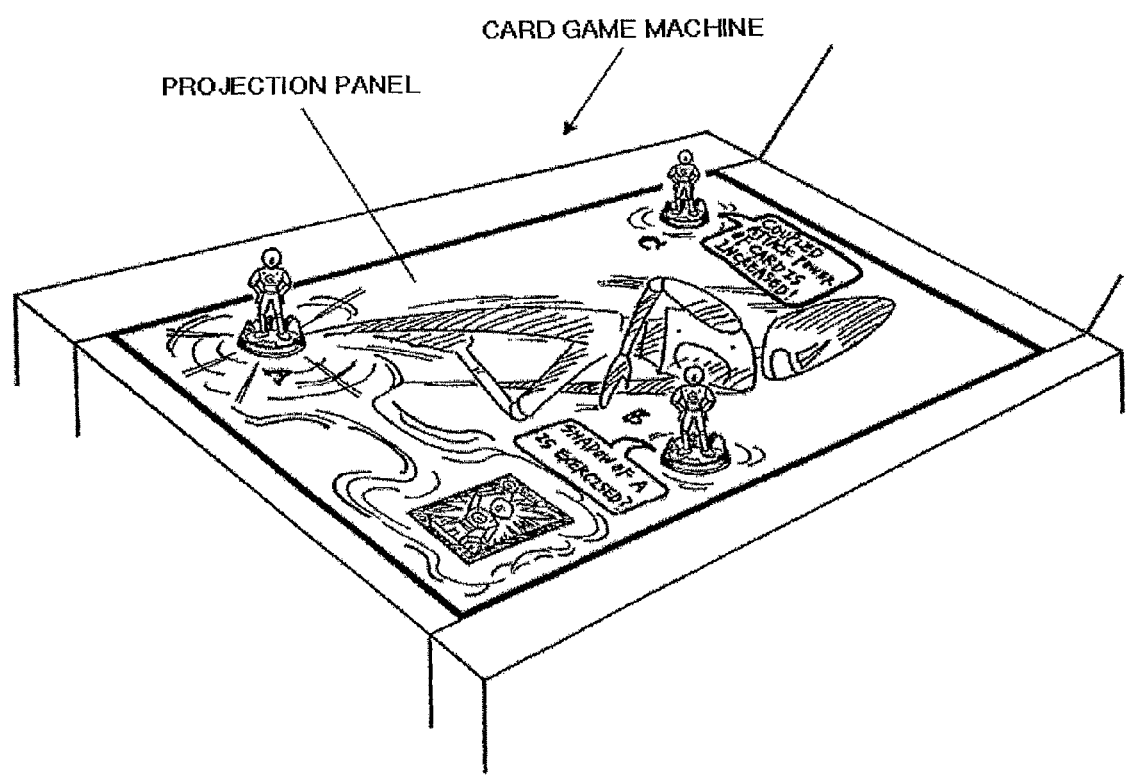
FIG. 86 is a diagram illustrating a state in which a shadow or word from a card or a figure disposed on a projection panel is displayed.
Figure 87:
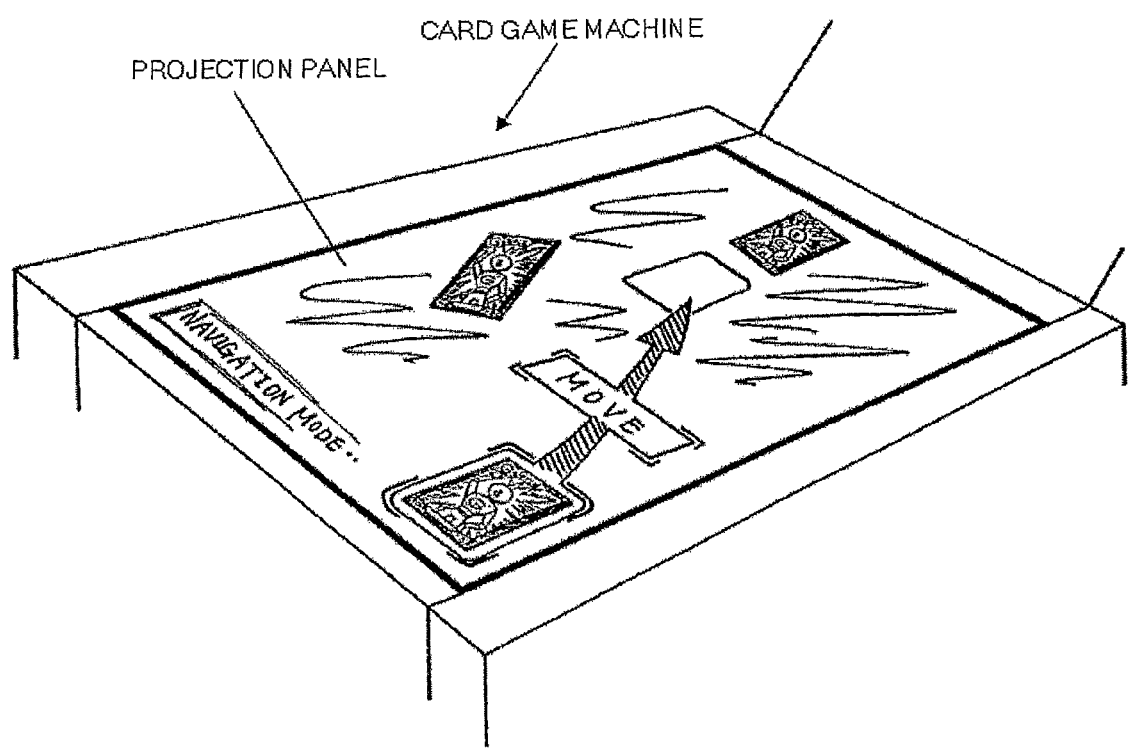
FIG. 87 is a subsequently disposed location or an operation instruction is displayed from a card or a figure disposed on an operation panel.

FIGS. 85 to 87 are diagrams illustrating different multimedia information. That is, on the surface of the projection panel, an instruction necessary when the game is performed, such as 'attack a B point', or the score or parameter of the game varied by the cards or the figures disposed on the projection panel, such as 'HP+50', 'MP−20', and the like, can be displayed (see FIG. 85), the balloon display of the statement of the figure of 'Does shadow of A act?' are made (see FIG. 86), and the instruction indicating the movement and the movement destination of the card (see FIG. 87) can be displayed.

As such, the arrangement or operation instruction of the medium is made by the multimedia information displayed on the projection panel surface, and thus the medium can be easily operated. The stage effect of the game or the like can be raised.

Further, the information processing device outputs information indicating the characters, diagrams, images or moving pictures associated with the card or figure at the locations that do not overlap the contacting surface of the recoding medium or the card previously disposed on the projection panel surface.

For example, when the plurality of cards are disposed on the surface of the projection panel, the multimedia information indicating characters, diagrams, images, moving pictures, or the like can be displayed at the locations shifted from the disposed cards (see FIGS. 85 and 87). It can be achieved, when the information processing device can recognize the location of the card on the projection panel surface illustrated in FIG. 31.

Further, in the case of the figure (doll) having a bottom surface on which the code information is printed, when the player views the figure from the oblique upper side, the multimedia information indicating characters, diagrams, images, moving pictures, or the like can be displayed at the locations where the shadow of the figure is not formed, when viewed from an eye line (see FIG. 85).

Further, in the dot pattern that is printed on the medium surface of the card or the figure, medium information that indicates a kind of a medium, a shape of the medium, or the shape of the medium surface is defined, and on the basis of the medium information, information indicating the characters, the diagrams, the images or the moving pictures may be created.

FIG. 95 is a diagram illustrating an example of a format of the dot code when information indicating the kind of the medium, the material quality of the medium, and the shape of the medium surface, and other information are contained. FIG. 96 is a diagram illustrating an example of the medium that is defined by the dot code.

In the code information, the medium information indicating the kind or shape of the medium is contained. When the code information is photographed by the imaging unit, since the information processing device can recognize the kind or shape of the medium, the multimedia information corresponding to the code information containing the kind or shape of the medium can be outputted.

For example, when using the information indicating kind of the medium of the figure or the card, in the case of the figure, words composed of characters can be displayed on the projection panel surface (see FIG. 86), and in the case of the card, the score can be displayed on the projection panel surface (see FIG. 85).

Further, when the shape of the medium or the shape of the medium surface is stored as medium information, an algorithm in which the imaging unit directly recognizes the shape of the medium from the photographed image can be omitted. The information indicating the characters, the images, the moving pictures, and the like in consideration with the shape of the medium or the shape of the medium surface can be displayed on the panel surface.

Figure 79:
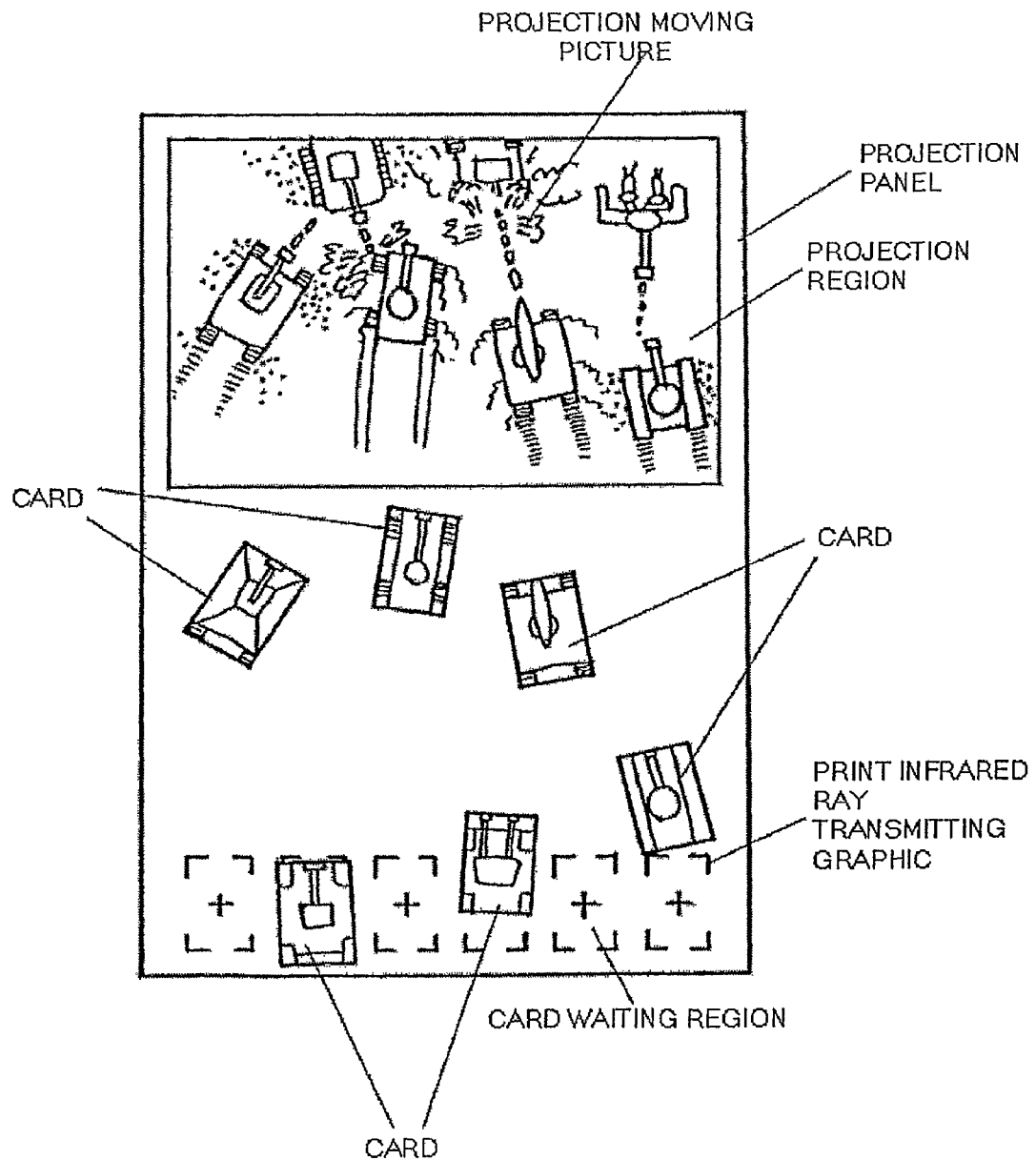
FIG. 79 is a diagram illustrating a disposed card in a state in which a projection panel is divided into a lower half serving as an infrared ray photographic region and an upper half serving as a projection region, and projected multimedia information.

FIG. 78 is a diagram illustrating an example in which the entire surface of the stage is used as the projection region of the projection panel and the infrared ray photographic region. As shown in FIG. 79, the projection panel may be divided into the projection region (upper half of FIG. 79) and the infrared ray photographic region (lower half of FIG. 79).

That is, in the projection region of the upper half, the still image or the moving picture from the projector is displayed, and the infrared ray transmitting printing is performed in the lower half and the still images or moving pictures are not displayed. However, the dot pattern of the back surface of the card disposed in the portions corresponding to the lower half can be read by the infrared camera.

In the structure of the projection panel, pictures or characters are printed on a portion or an entire surface of the top surface of the projection panel by using an infrared ray transmitting ink. Alternatively, the infrared ray transmitting sheet that is printed by using the infrared ray transmitting ink may be attached.

As such, the pictures or the characters are previously printed on the top surface of the projection panel by using the infrared ray transmitting ink, and thus it is possible to raise the stage effect combined with multimedia information projected from the lower side.

Further, the infrared ray transmitting sheet is attached, and thus the surface of the projection panel can protected from the damage. Even when the infrared ray transmitting sheet is damaged, it can be easily exchanged with a new one.

Figure 80A:
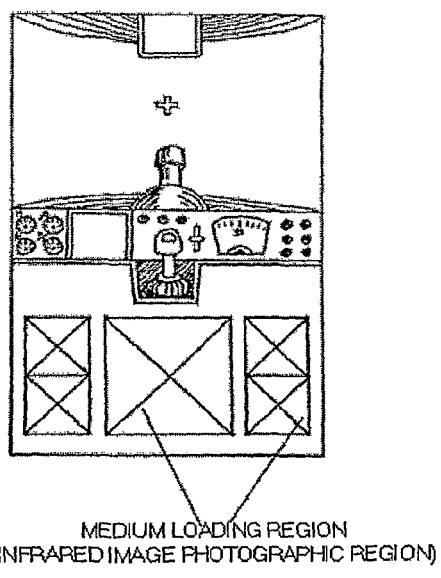
FIG. 80 is a diagram illustrating a card disposed on a projection region where a region for displaying multimedia information is determined and divided by arbitrarily performing non-projection/infrared ray transmitting printing, and multimedia information associated with the card.
Figure 80B:
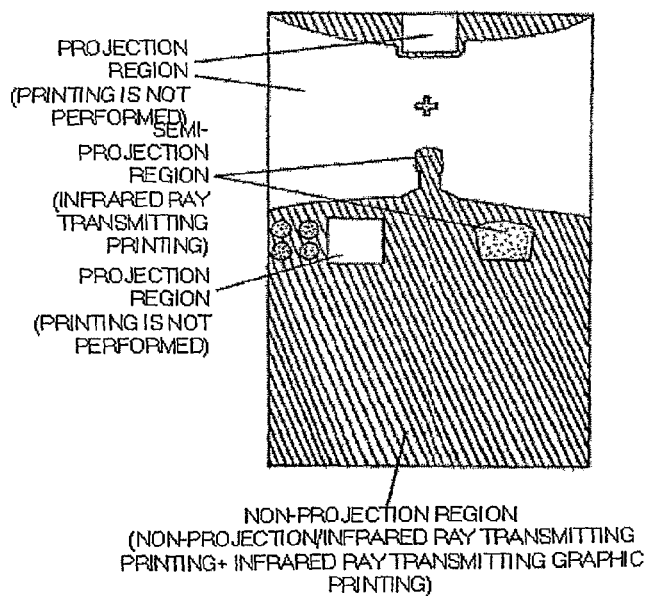

FIGS. 80A and 80B are diagrams illustrating another application example. As shown in FIG. 80A, in the projection panel, an image of a cockpit in the tank is printed, and as shown in FIG. 80B, the projection panel region is divided into a projection region where the printing is not performed, a semi-projection region where the infrared ray transmitting printing is performed and the overlapping projection can be performed, and a non-projection region where the infrared ray transmitting printing is performed but the projection is not performed.

As such, the still images or the moving pictures are projected onto the semi-projection region and the projection region by the projector, and thus it is possible to produce the realistic sensation according to the progress of the card game.

Figure 81A:
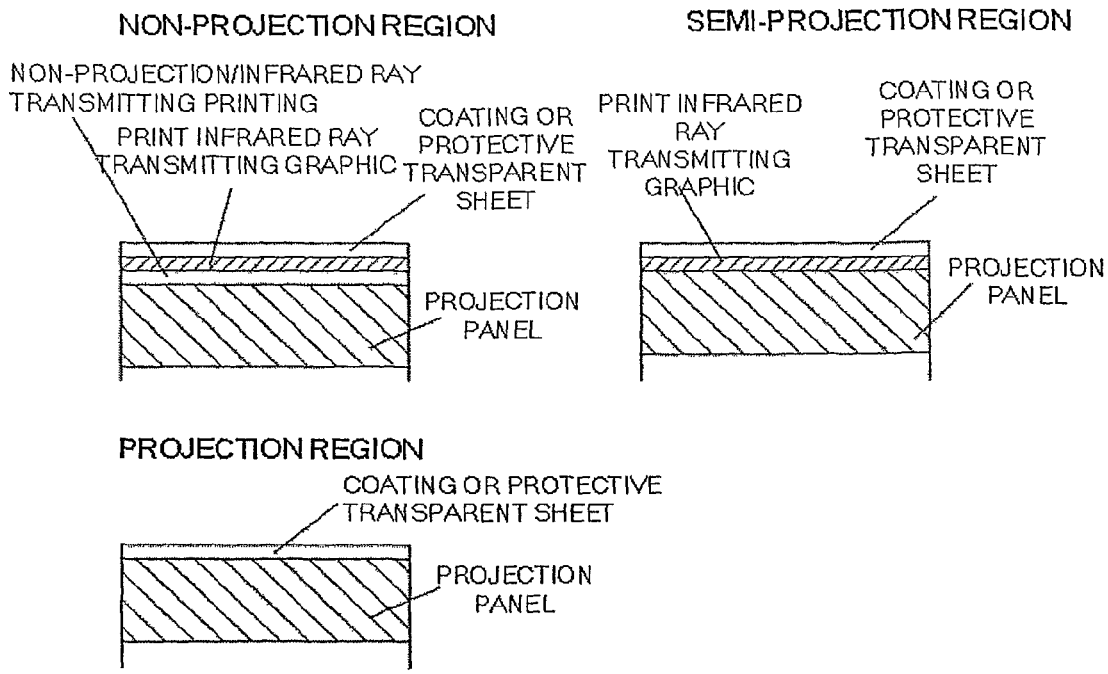
FIG. 81 is a diagram illustrating a sectional structure of a projection region, a semi-projection region, and a non-projection region in a projection panel.

FIG. 81A is a diagram illustrating a sectional structure of each region in the projection panel. As shown in FIG. 81A, in the non-projection region, on the top surface of the projection panel, the non-projection/infrared ray transmitting printing is performed by using the ink that does not transmit the projection light, and then the infrared ray transmitting graphic printing is performed thereon. The uppermost layer is coated (or made of a protective transparent sheet), and the surface is protected. Further, in the semi-projection region, the infrared ray transmitting printing is performed on the top surface of the projection panel, and the uppermost layer is coated. Further, in the projection region, only the coating is performed on the projection panel.

Figure 81B:
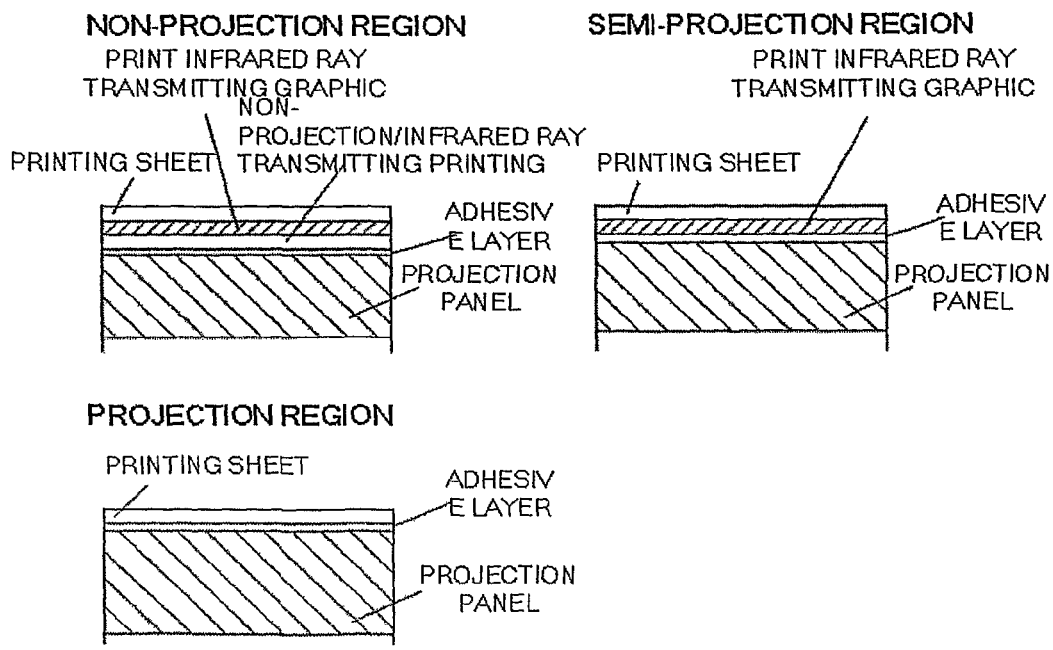

In a structure shown in FIG. 81B, the graphic printing sheet is attached to the top surface of the projection panel. In the non-projection region, the sheet where the infrared ray transmitting graphic printing and the non-projection/infrared ray transmitting printing are performed is disposed on the adhesive layer formed on the surface of the projection panel in a state in which a printing surface is downward. In the semi-projection region, the sheet where the infrared ray transmitting graphic printing is performed is disposed on the adhesive layer at the projection panel surface side in a state in which the printing surface is downward.

Further, in the projection region, the sheet is attached to the projection panel with the adhesive layer therebetween. As such, in all the regions, the sheet is disposed on the uppermost layer, and thus the surface of the projection panel can be protected from the damage.

FIGS. 83A to 83D are diagrams illustrating cases in which a frame designating the projection region projected by the projector or marks designating the four corners of the projection region are printed on the top surface of the projection panel or the infrared ray transmitting sheet.

As such, the frame or the marks that are previously provided on the top surface of the projection panel or the infrared ray transmitting sheet are used as earmarks, and the frame or the marks indicating four corners are projected onto the projection panel from the projector. The designated projection region and the projection region of the projection image, that is, marks of them are corrected such that they align with each other.

Thereby, it is possible to easily correct (calibrate) the deviation of the projector with respect to the projection panel.

Figure 84:
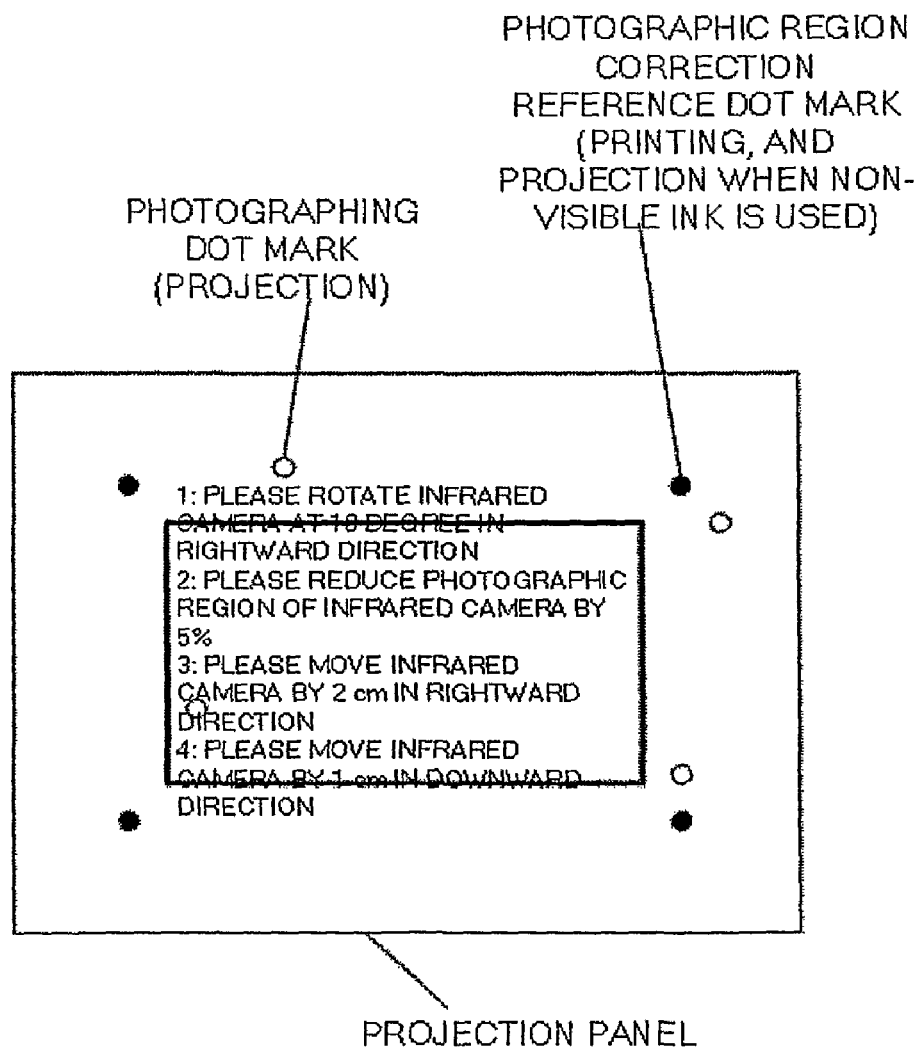
FIG. 84 is a diagram illustrating printing (or projection) of a dot mark for designating an photographic region photographed by an infrared camera, and a dot mark projected for correction and a correction instruction.

FIG. 84 is a diagram illustrating a state in which the dot mark designating the four corners of the region for photographing the infrared image is printed on the top surface of the projection panel or the infrared ray transmitting sheet by using the infrared ray absorbing ink.

The information processing unit recognizes the coordinates of the four corners on the basis of the dot marks photographed by the infrared camera, determines whether the coordinates of the four corners are at the same locations as the corner information of the photographic region previously stored in the storage unit, and allows the result information and the adjustment instruction information to be displayed on the projection panel by the projection unit. Specifically, as shown in FIG. 84, the character information instructing the adjustment of the deviation can be displayed on the projection panel as follows: (1) Please rotates an infrared camera at the right side by 10°. (2) Please reduces a photographic region of the infrared camera downward by 5%. (3) Please moves the infrared camera at a right side by 2 cm. (4) Please moves the infrared camera downward by 1 cm. Further, numerals surrounded by ( ) refer to numerals surrounded by circles in the corresponding drawing.

Figure 82A:
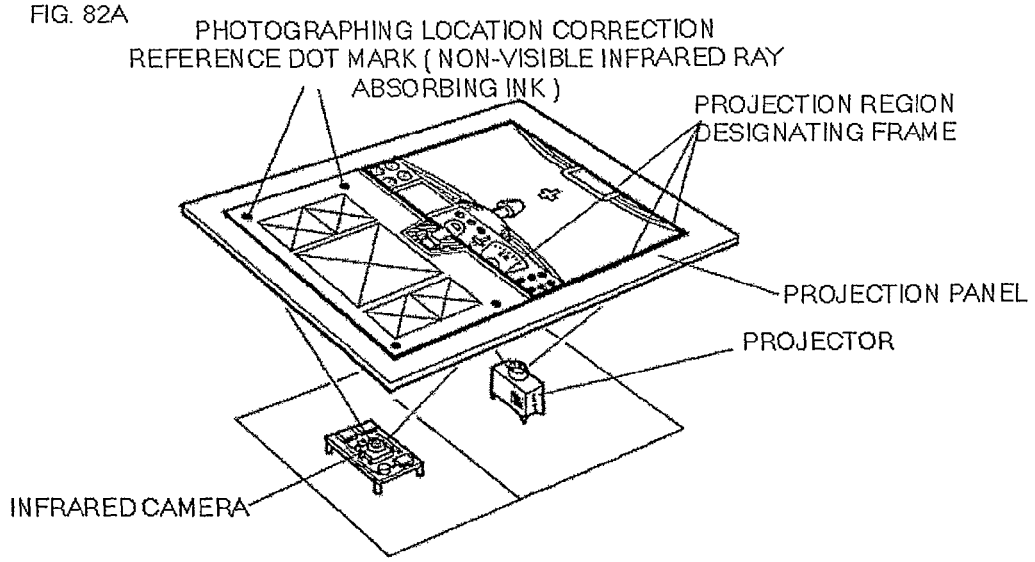
FIG. 82 is a diagram illustrating a structure of a projection panel where a projection region designating frame and an photographing location correction dot mark are printed so as to correct a deviation of a projection panel with respect to a projector and an infrared camera.
Figure 82B:
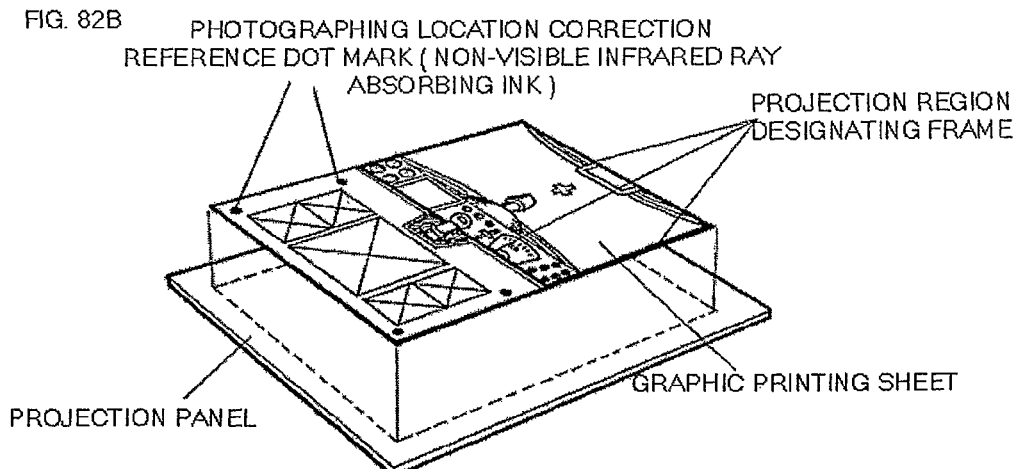
Figure 82C:
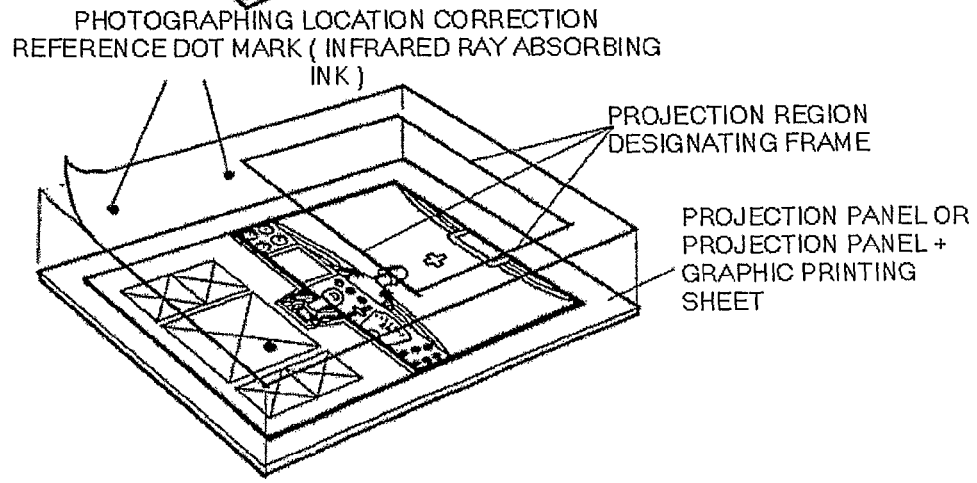

FIGS. 82A to 82C are diagrams illustrating examples of printing the projection region instructing frame and the photographic location correction dot mark for correcting the deviation of the projection panel with respect to the projector and the infrared camera. FIG. 82C is a diagram illustrating a correcting transparent sheet used when the projection region instructing frame and the photographic location correction reference dot mark are not printed on the projection panel or the infrared ray transmitting sheet. In this case, after the correction, the correcting transparent sheet may be removed.

FIGS. 88 to 94 illustrate the manipulation or operation of the card or the figure on the projection panel or a method of recognizing them.

Figure 88A:
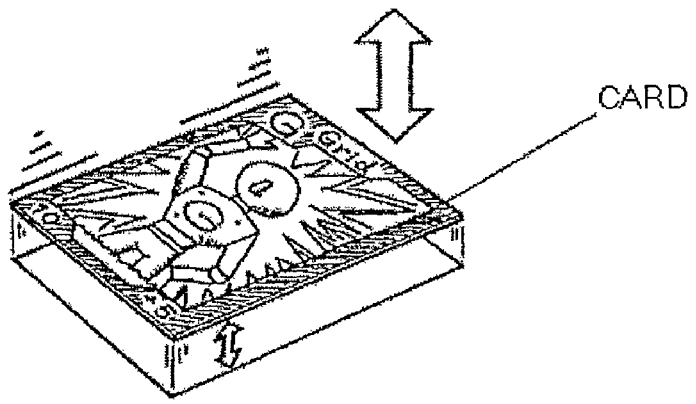
FIG. 88 is a diagram illustrating a grid tapping operation that operates a card or a figure disposed on a projection panel.
Figure 88B:
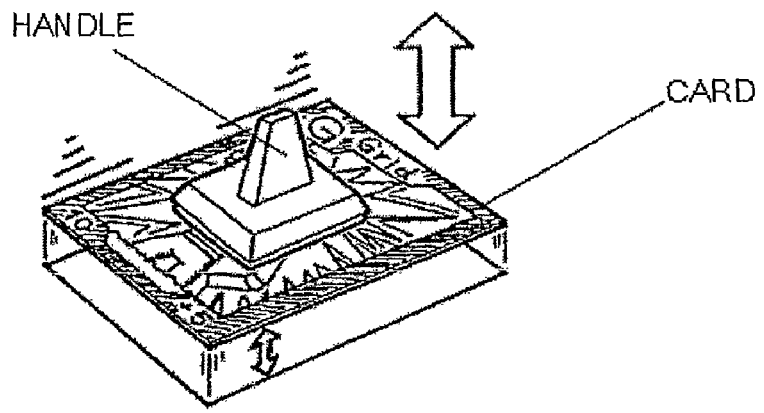
Figure 88C:
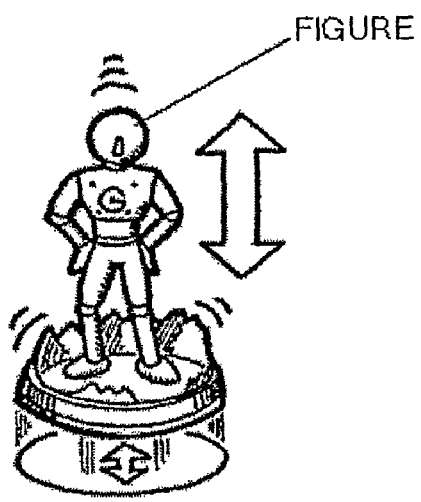

FIG. 88 is a diagram illustrating a grid tapping operation of the medium on the surface of the projection panel, that is, an example when XY coordinate information and/or code information calculated in the same region as the location whether the medium is disposed or in the designated region is read many times in the predetermined time. FIG. 88A shows an example of a card, FIG. 88B shows a handle which has an adhesive layer to be freely attached to or detached from the surface of the card (surface opposite to the back surface on which the dot pattern is printed), and FIG. 88C shows an example of the figure.

When the grid tapping operation by the card or the figure is performed on the surface of the projection panel, first, the infrared camera reads the dot pattern printed on the back surface of the card or the bottom surface of the figure, and recognizes the dot codes. Then, when the brightness of the reflective light by the infrared camera vary in a range of the same bottom surface shape as the shape of the bottom surface of the medium, the information processing device determines that the grid tapping operation is performed on the surface of the projection panel, and performs the process corresponding to the operation, for example, a process for increasing a parameter of a striking power.

Figure 89A:
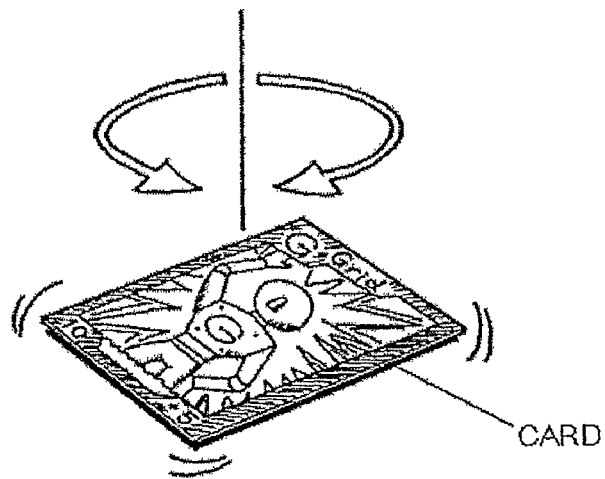
FIG. 89 is a diagram illustrating a grid twisting operation that operates a card or a figure disposed on a projection panel.
Figure 89B:
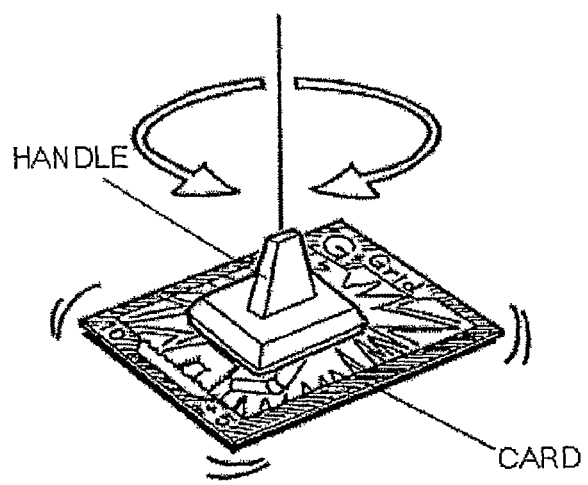
Figure 89C:
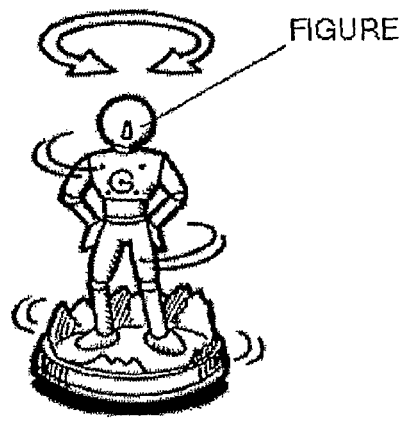

FIG. 89 shows a grip twist operation.

The grid twist operation corresponds to an operation for rotating the medium on the basis of any location of the medium surface on the surface of the projection panel. In this case, the rotation angle of the medium with respect to the direction of the imaging unit or the trace of the rotation angle is repeatedly recognized in a predetermined time, and the information processing device determines that the grid twist operation is performed and performs a process corresponding to the operation, for example, a process of increasing a parameter of a defensive skill.

Figure 90A:
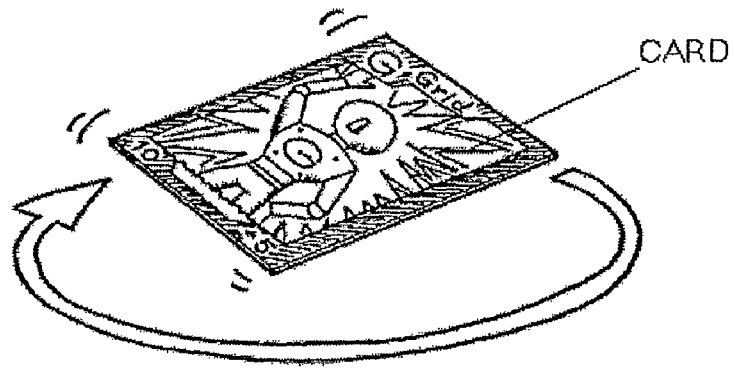
FIG. 90 is a diagram illustrating a grid sliding operation that operates a card or a figure disposed on a projection panel.
Figure 90B:
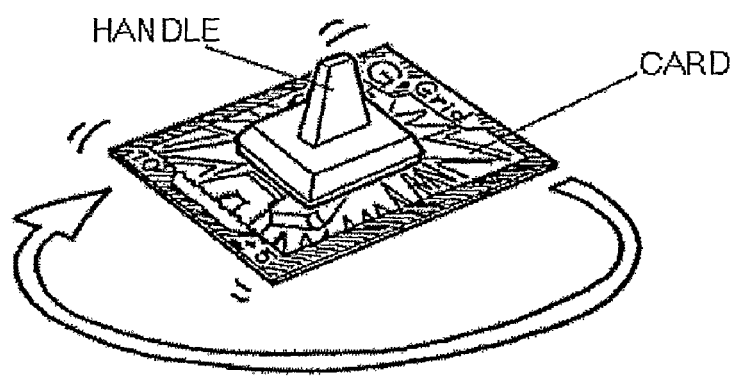
Figure 90C:
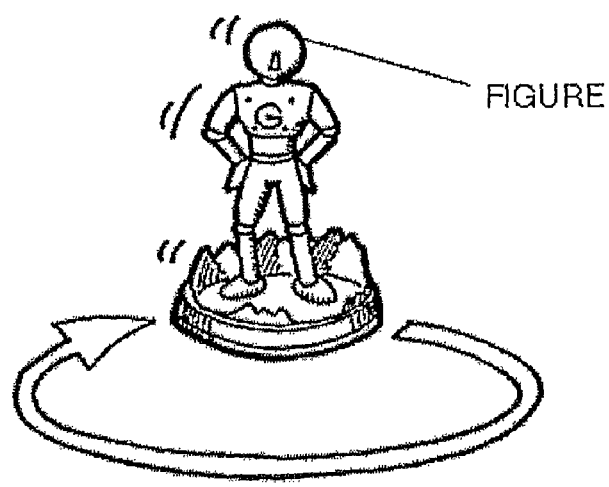

FIG. 90 is a diagram illustrating a grid sliding operation.

The grid sliding operation can be determined by sliding the medium on the surface of the projection panel in a circular shape and recognizing the trace of the XY coordinate information calculated in the predetermined time in a substantially circular shape. When the information processing device determines that the grid sliding operation is performed, the information processing device performs a process corresponding to the grid sliding operation, for example, a process of increasing a parameter of a magic skill.

Figure 91A:
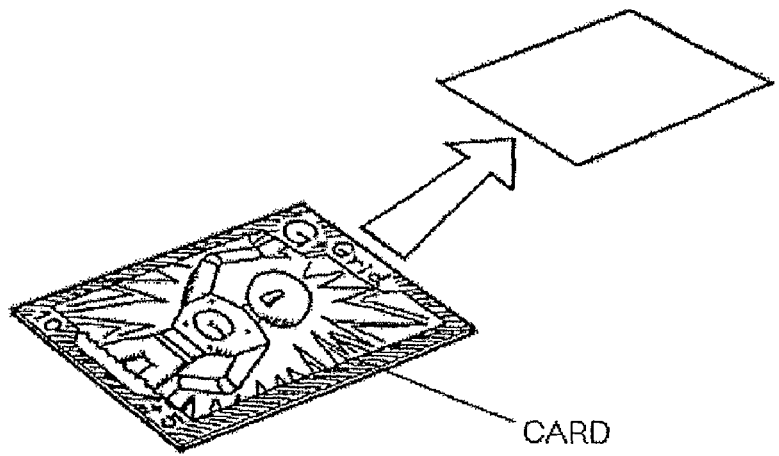
FIG. 91 is a diagram illustrating a grid scrolling operation that operates a card or a figure disposed on a projection panel.
Figure 91B:
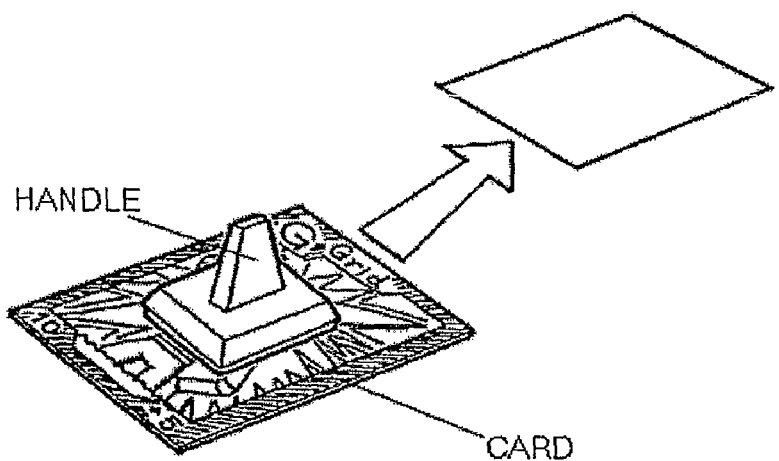
Figure 91C:
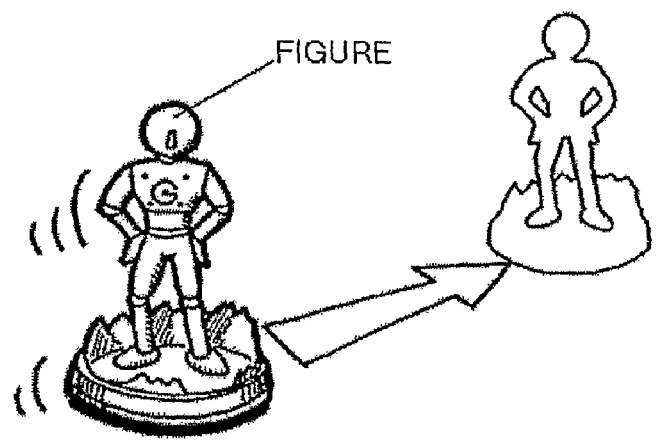

FIG. 91 shows a grid scrolling operation.

The grid scrolling operation is determined by recognizing the trace of the XY coordinate information calculated in a predetermined time as a substantially straight line shape, by the straight-line-shaped scrolling operation of the medium on the surface of the projection panel. When the information process device determines that the grid scrolling operation is performed, the information processing device performs a process corresponding to the scrolling operation, for example, a process, such as attack by the character designated by the player.

Figure 92A:
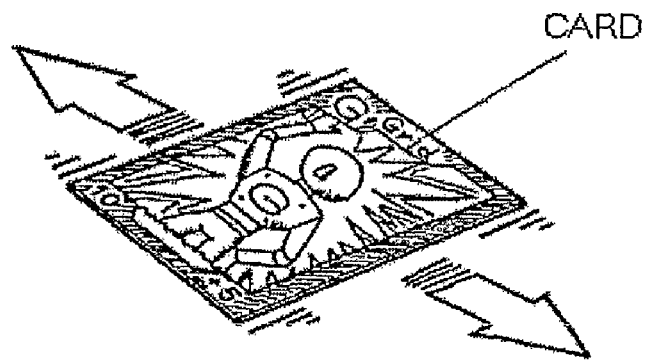
FIG. 92 is a diagram illustrating a grid scratching operation that operates a card or a figure disposed on a projection panel.
Figure 92B:
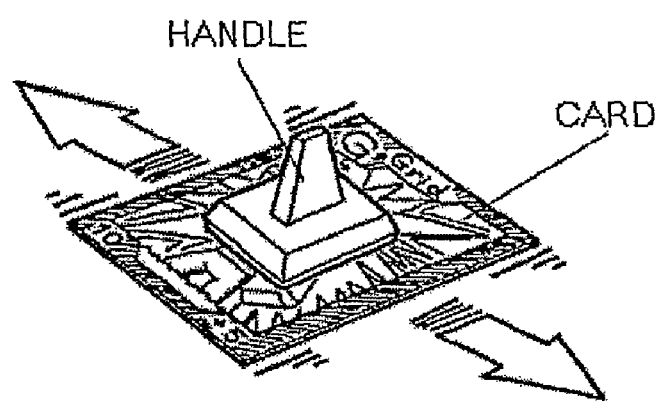
Figure 92C:
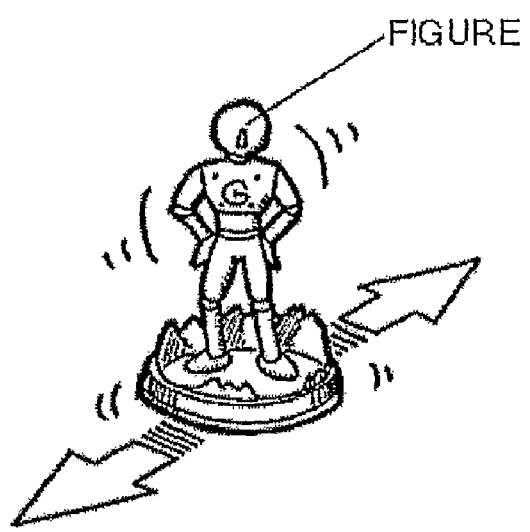

FIG. 92 shows a grid scratching operation.

The grid scratching operation is determined by repeatedly recognizing the traces of the XY coordinate information calculated in the predetermined time in a straight line shape, by means of a repetitive scratching operation of the medium on the projection panel in a straight line shape. When the information processing device determines that the grid scratching operation is performed, the information processing device performs the process corresponding to the grid scratching operation, for example, a process, such as cancellation of the instruction of the player.

FIG. 93 shows a grid tilting operation.

The grid tilting operation is determined by recognizing the variation of the inclination of the medium with respect to the vertical line of the projection panel in a predetermined time, by means of a tilting operation of the medium on the surface of the projection panel.

Specifically, as shown in FIG. 93D, in the image photographed by the infrared camera by inclining the medium surface with respect to the surface of the projection panel, one side (raised side) becomes dark, and the other (side close to the surface of the panel) becomes bright. As such, by the brightness or the darkness of the photographed image, the information processing device can determine that the grid tilting operation is performed.

Figure 94A:
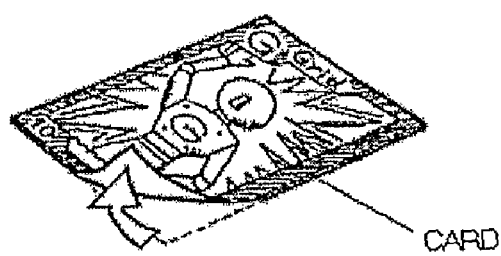
FIG. 94 is a diagram illustrating a grid turnover operation that operates a card or a figure disposed on a projection panel, and brightness of an infrared image obtained by photographing a grid turnover operation state and an image projected onto a region of a surface of a projection panel whose medium surface is reversed.
Figure 94B:
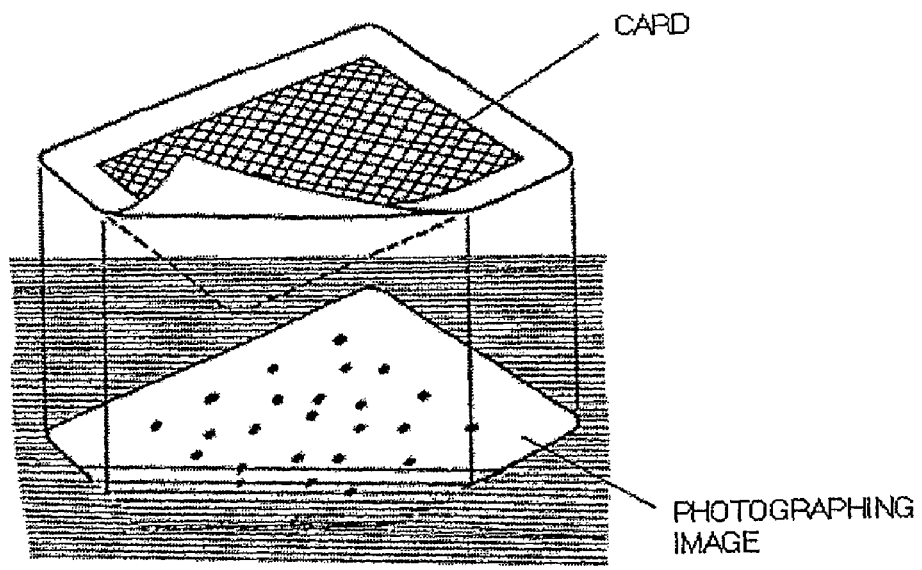

FIG. 94 shows a grid turnover operation.

The grid turnover operation refers to an operation of turning over a portion of the surface of the medium on the surface of the projection panel. Specifically, the information processing device can determine the grid turnover operation by recognizing the area ratio of the medium surface turned over from the surface of the projection panel in a predetermined time (see FIG. 94B).

Figure 94C:
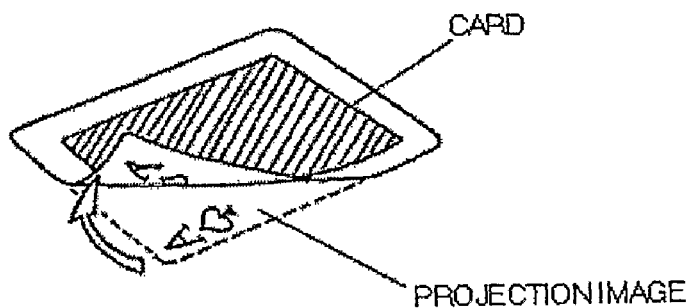
Figure 96A:
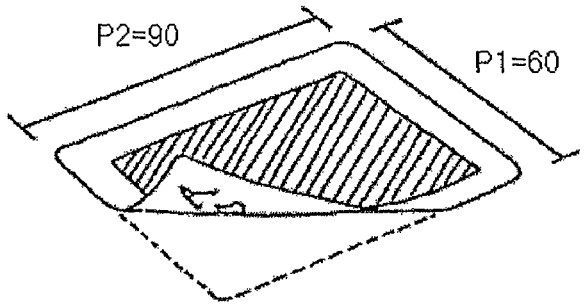
FIG. 96 is a diagram illustrating an example of a medium that is defined by a dot code of FIG. 95.
Figure 96B:
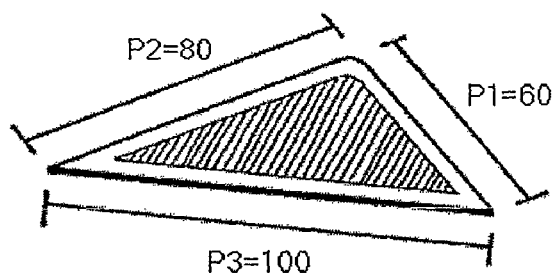
Figure 96C:
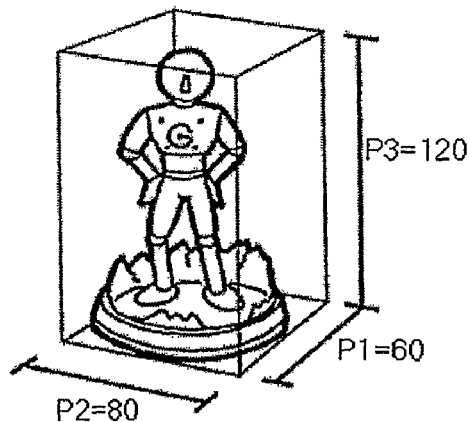
Figure 96D:
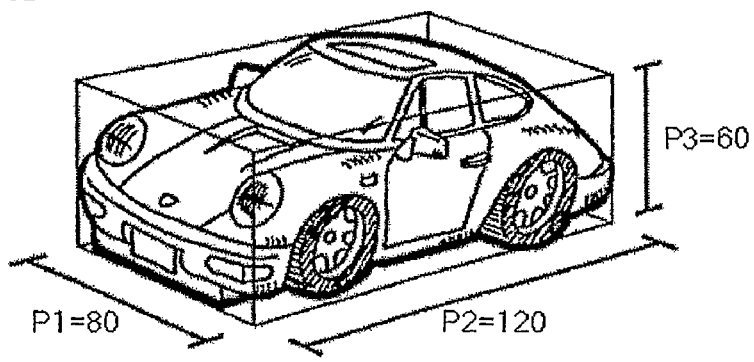

At this time, when the card such as the trump is used as the medium, as shown in FIG. 94C, the image of the portion turned over from the surface of the projection panel (a kind and a numeral of the card printed at the corners of the trump) is displayed in a region of the projection panel surface where the medium surface is turned over, and it is possible to raise the display stage effect on the surface of the projection panel accompanied by the card operation by the player.

Further, the information processing unit detects operations of the medium on the surface of the projection panel, that is, a grid tapping operation, a grid twist operation, a grid sliding operation, a grid scrolling operation, a grid scratching operation, a grid tilting operation, a grid turnover operation, and the like, and it is possible to vary the multimedia information, such as characters, diagrams, images, moving pictures, and the like, displayed on the surface of the projection panel in accordance with these operations. A variety of stage effects can be achieved.

As such, a grid tapping operation, a grid twist operation, a grid sliding operation, a grid scrolling operation, a grid scratching operation, a grid tilting operation, a grid turnover operation, and the like are repeatedly performed, and the multimedia information, such as characters, diagrams, images, moving pictures, and the like, displayed on the surface of the projection panel is varied depending on the number of times of the operations or the speed of the operations. As a result, it is possible to further raise a stage effect with respect to the player.

In addition, an operation history of the grid tapping operation, the grid twist operation, the grid sliding operation, the grid scrolling operation, the grid scratching operation, the grid tilting operation, the grid turnover operation, and the like is stored in a memory of the information processing unit or a storage unit of the hard disk device, and by the combination of these operations, the multimedia information, such as characters, diagrams, images, moving pictures, and the like, displayed on the surface of the projection panel is varied. As a result, it is possible to further raise a stage effect with respect to the player.

The medium recognized on the stage surface may be a fingertip of an operator or a player, in addition to the above-described card. As such, when the fingertip touches on the stage surface, since the brightness of the stage surface corresponding to the touched portion varies, it can be recognized that the finger tip is touched. It will be described in FIG. 97 and FIG. 98 in detail.

Figure 97A:
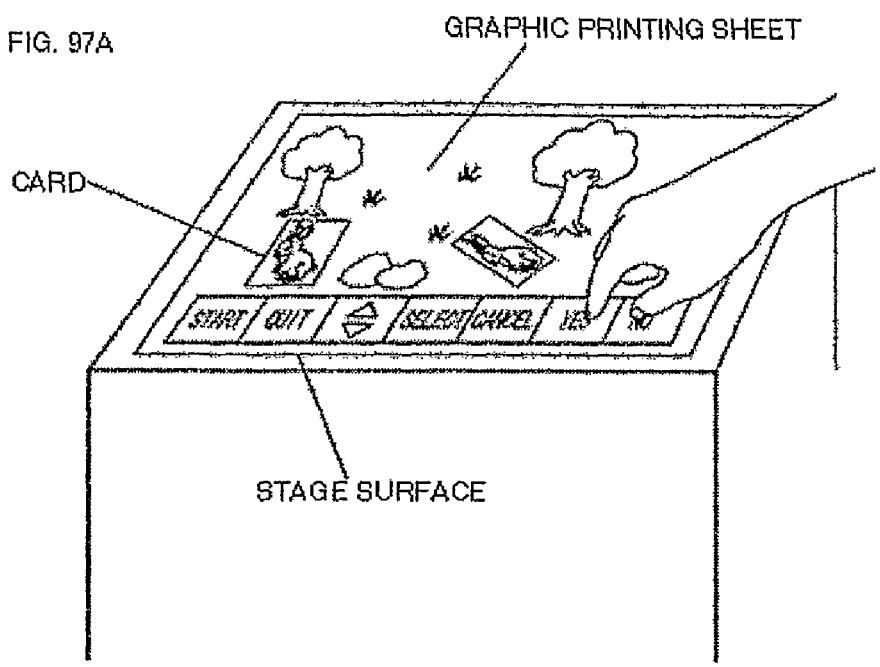
FIG. 97 is a diagram illustrating a method of recognizing a shape of a medium disposed on a stage surface.
Figure 97B:
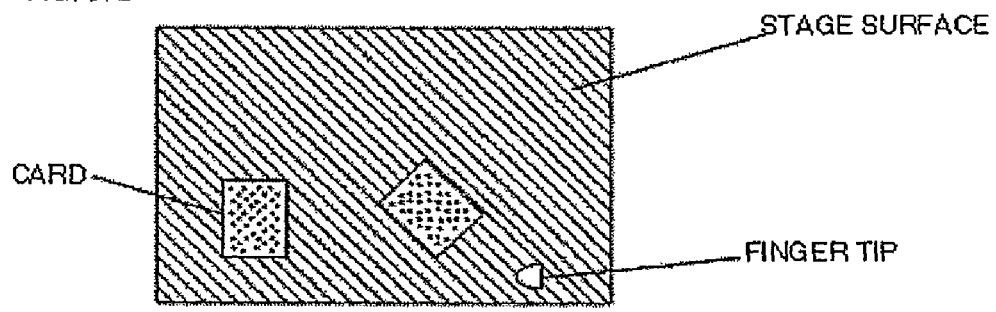

As shown in FIG. 97A, a player or an operator loads the card or touches an image projected onto the stage surface by a fingertip, and the game is performed. FIG. 97B is a diagram illustrating a case in which the state shown in FIG. 97A is viewed from the lower side of the stage surface. FIG. 98 is similar to the case of FIG. 97.

Figure 97C:
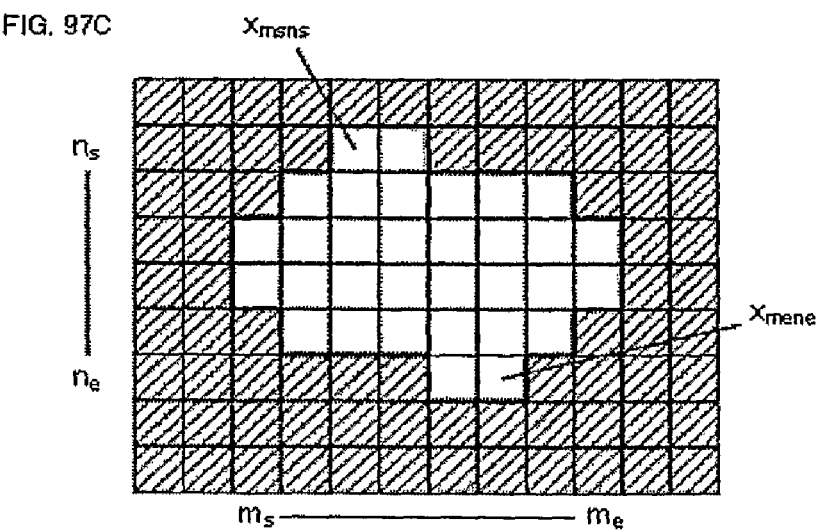
Figure 98A:
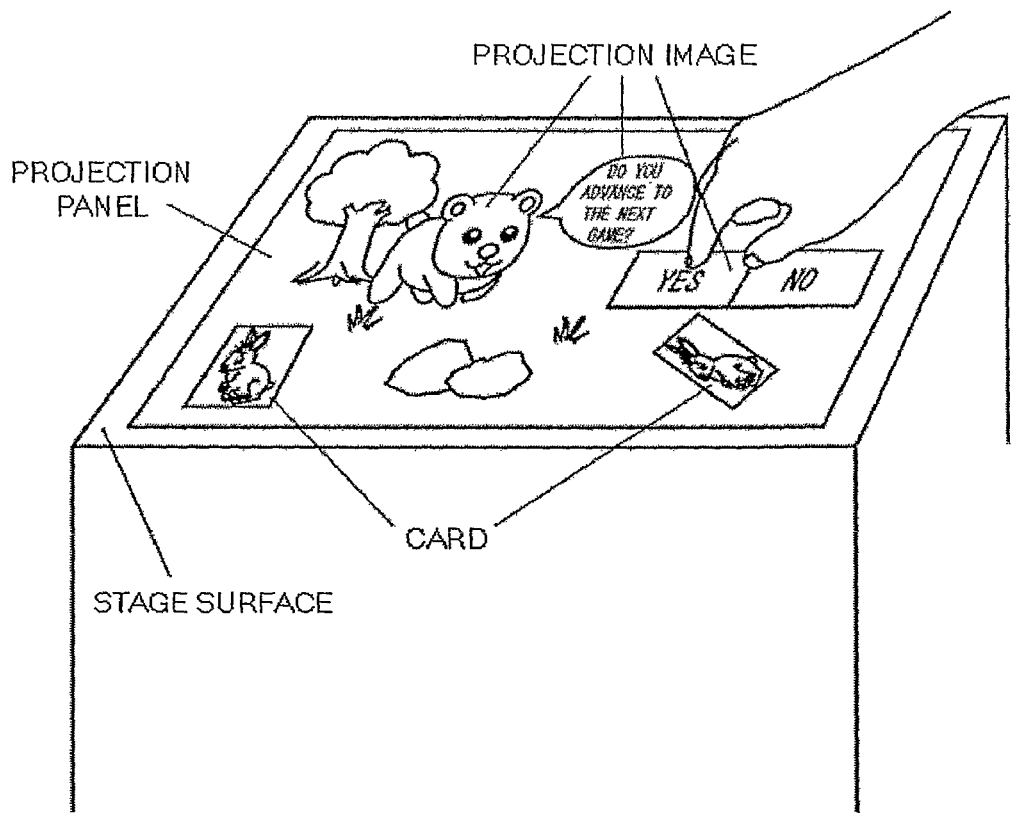
FIG. 98 is a diagram illustrating a method of recognizing a shape of a medium disposed on a stage surface.
Figure 98B:
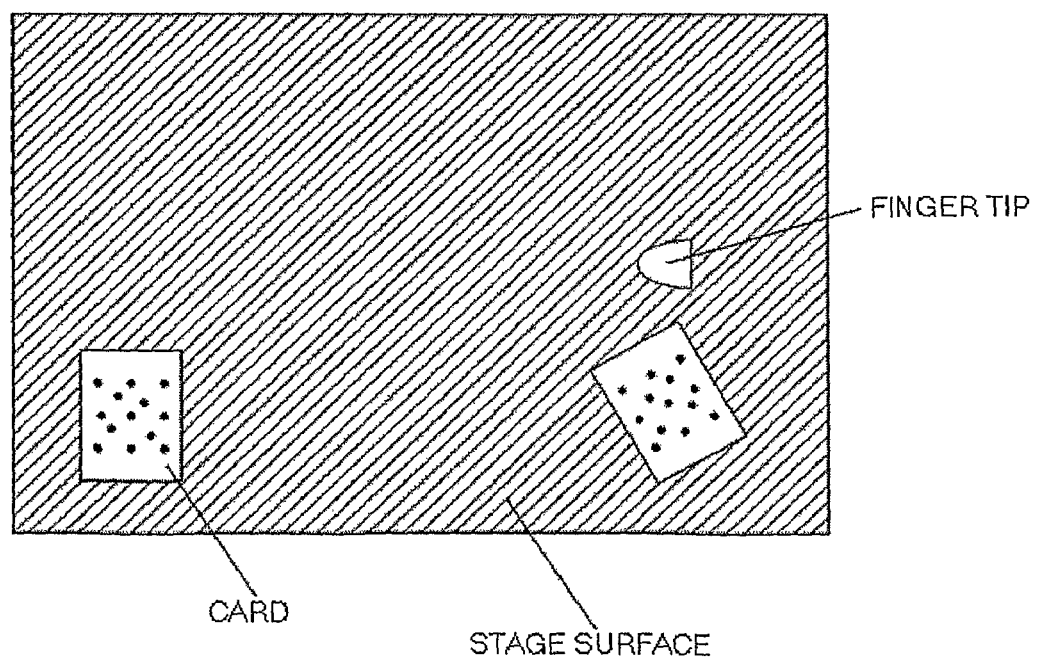

FIG. 97C is a method of recognizing a shape of the medium. The brightness and the darkness photographed by the infrared ray are stored in the storage region, and the region of the brightness exceeding any threshold value is set to a contacting surface with the stage surface. One contact surface is set to the region where at least one of the longitudinal side, the horizontal side, the upper side, and the lower side of the pixel exceeding the threshold value among the pixels forming the storage region is continuous.

Specifically, as shown in FIG. 97C, a region surrounded by the thick line corresponds to the region of the pixel that exceeds the threshold value, and the shape of the medium is shown.

Further, by the image recognized by FIG. 97C, the centroid of the medium is calculated by the recognized image, such that the operation corresponding to the coordinates of the centroid can be performed. Hereinafter, a method of calculating centroid will be described.

First, the numerical value of an X coordinate of the pixel matrix exceeding the threshold value is calculated. The values of the X coordinates in each row are $X_{msns}$ to $X_{mene}$. In addition, the numerical values of all X coordinates are added. The value that is obtained by driving the values obtained by addition by the number of the pixel matrices becomes a value of an X coordinate of centroid.

The Y coordinate of centroid is also calculated by the same method.

INDUSTRIAL APPLICABILITY

The invention can be used in a card game machine, a reading device of a seal, a tag, a certificate (an identification certificate and a passport), an exchange ticket for money, and a ticket, and the like.

What is claimed is:

1. An information output device, comprising:
a stage surface on which media are disposed in a state where the media are opposite to the stage surface, the media being printed with dot patterns in which a plurality of reference lattice point dots are provided within an area of a block where information dots are arranged, the plurality of reference lattice point dots defining a plurality of lattice areas each defining a respective virtual lattice point therein, wherein information represented by the information dots is defined by distances and directions of the information dots from the virtual lattice points, and a direction of the block is defined by a shape formed by a first number of the lattice areas, the first number of lattice areas being identifiable by the distance and direction that the information dot in each of the first number of lattice areas is arranged with respect to the virtual lattice point defined, in each respective lattice area of the first number of lattice areas, the dot patterns are read by an imaging unit disposed in a space below the stage, code values indicating the dot patterns and directions of the media obtained from the analyzed result of the dot patterns are calculated from photographed images obtained by the imaging unit and locations of the media disposed on the stage surface defined by XY coordinates are calculated, and information corresponding to the calculated results is outputted, wherein in the space below the stage, a projection unit is disposed, in addition to the imaging unit, and the projection unit controls images or moving pictures projected on the stage surface by calculating the code values of the dot patterns obtained from the photographed images by the imaging unit and the direction of the card obtained from the analyzed results of the dot patterns and calculating the location of the medium disposed on the stage surface defined by XY coordinates.

2. The information output device according to claim 1, wherein an upper layer of the stage is composed of a transparent plate, and a lower layer of the stage is composed of a projection sheet for a projection unit.

3. The information output device according to claim 1 or 2, wherein in the space below the stage, at locations that avoid projected light from the projection unit to the stage surface, light irradiation light sources that irradiate irradiated light onto the dot patterns of the medium surface on the stage surface, and a dispersion filter that disperses the irradiated light of the light irradiation light source into the bottom surface of the stage are provided.

4. The information output device according to claim 1, wherein a magic mirror is obliquely provided in the space below the stage, a projection unit is disposed at one surface side of the magic mirror, projection images or moving pictures from the projection unit are reflected on the one surface to be projected onto the stage surface, and an imaging unit is disposed on the other surface side of the magic mirror, and photographed light of the dot patterns of the medium surface on the stage surface transmits the magic mirror to be incident on the imaging unit.

5. The information output device according to claim 1, wherein mirrors are obliquely provided in the space below the stage, a projection unit and an imaging unit are disposed on one surface side of the mirror, and projection images or moving pictures from the projection unit are reflected on the one surface to be projected onto the bottom surface of the stage.

6. An information input/output device, comprising:

a stage surface on which medium surfaces of a plurality of media where code information indicating characters or numerical values, such as the characters, pictures, two-dimensional codes, and the like, or numerical values are printed by ink having infrared ray absorbing characteristic are disposed, the stage surface transmitting infrared rays in a state in which the media surfaces are opposite to the stage surface, infrared rays are irradiated onto a bottom surface of the stage by an infrared ray irradiating unit provided at an inner circumference of the space below the stage surface, reflected light is photographed by an infrared ray imaging unit, and an information processing unit for outputting multimedia information, such as sounds, characters, images, moving pictures, and the like, on the basis of photographed images obtained from the infrared ray imaging unit, is provided, wherein the code information is a dot pattern in which a plurality of reference lattice point dots are provided within an area of a block where information dots are arranged, the plurality of reference lattice point dots defining a plurality of lattice areas each defining a respective virtual lattice point therein, wherein information represented by the information dots is defined by distances and directions of the information dots from the virtual lattice points, and a direction of the block is defined by a shape formed by a first number of the lattice areas, the first number of lattice areas being identifiable by the distance and direction that the information dot in each of the first number of lattice areas is arranged with respect to the virtual lattice point defined in each respective lattice area of the first number of lattice areas, on the basis of projection images from the infrared ray imaging unit, the information processing unit inputs positional information of a medium on the stage surface, direction information or medium state information indicating a contact state between the stage surface and the medium, and code information printed on the medium surface, and the information processing unit outputs and displays the medium state information and multimedia information, such as characters, images, moving pictures, and the like, corresponding to the code information, to and on an entire surface or a portion of the stage surface composed of a projection panel with respect to the projection unit disposed below the stage surface.

7. The information input/output device according to claim 6, wherein the multimedia information is information that indicates medium arrangement on the projection panel surface and an operation instruction.

8. The information input/output device according to claim 6, wherein pictures or characters are printed on a portion and all of a top surface of the projection panel by using an infrared ink or an infrared ray transmitting sheet printed by the infrared ray transmitting ink is attached to the portion and all of the top surface of the projection panel.

9. The information input/output device according to claim 6, wherein a frame designating a projection region for projecting light by the projection unit or marks designating four corners of the projection region are printed on the top surface of the projection panel by using visible infrared ray transmitting ink, or a removable infrared ray transmitting sheet printed by the ink is attached, and the information processing unit allows the projection unit to project a frame indicating a projection region or marks indicating four corners of the projection region onto the projection panel, and corrects a visibly designated projection region and a projection region of the projection image to be equal to each other.

10. The information input/output device according to claim 6, wherein dot marks designating four corners of a region to be photographed as an infrared image are printed by using an infrared ray absorbing ink or a removable infrared ray transmitting sheet printed with the dot marks using the ink is attached on the top surface of the projection panel, and the information processing unit recognizes coordinates of the four corners on the basis of the dot marks photographed by the infrared ray imaging unit, determines whether the coordinates are at the same locations as information of four corners of the photographic regions previously stored in a storage unit, and displays the result information and instruction information on the projection panel by the projection unit.

11. The information input/output device according to claim 6,
wherein the information processing unit outputs to the projection unit information indicating characters, diagrams, images or moving pictures that are associated with the medium disposed on the surface of the projection panel.

12. The information input/output device according to claim 11,
wherein the information processing unit outputs to the projection unit information indicating characters, diagrams, images or moving pictures associated with the medium to locations the projection panel surface that do not overlap a contact surface of the medium.

13. The information input/output device according to claim 6,
wherein medium information indicating a kind and a shape of the medium or a shape of the medium surface is defined in the code information printed on the printing surface, and
information indicating characters, diagrams, images or moving pictures projected onto the projection panel surface is created on the basis of the medium information.

14. The information input/output device according to claim 6,
wherein the information processing unit detects an operation of the medium that operates by a user on a stage surface on the basis of state information of the medium, and
after the information processing unit analyzes codes printed on the medium surface to specify the medium, and
calculates XY coordinates indicating a location of the medium on the projection panel,
the information processing unit recognizes a grid tapping operation of the medium on the projection panel, that is, reads XY coordinate information calculated in substantially the same region as the location where the medium is disposed in a predetermined time or a designated region and/or code information many times to recognize the XY coordinates and the code information.

15. The information input/output device according to claim 6,
the information processing unit detects an operation of the medium that operates by a user on a projection panel on the basis of state information of the medium, and
after the information processing unit analyzes codes printed on the medium surface to specify the medium, and
calculates XY coordinates indicating a location of the medium on the stage surface, and
the information processing unit performs a grid twist operation that rotates the medium on the basis of any location of the medium surface on the projection panel surface, such that a rotation angle of the medium or traces of the rotation angle with respect to the direction of the imaging unit are repeatedly recognized in a predetermined time.

16. The information input/output device according to claim 6,
wherein the information processing unit detects an operation of the medium that operates by a user on a the projection panel surface on the basis of state information of the medium, and
after the information processing unit analyzes codes printed on the medium surface to specify the medium, and calculates XY coordinates indicating a location of the medium on the stage surface, and
the information processing unit performs a circular grid sliding operation of the medium surface on the projection panel surface, such that traces of the XY information calculated in a predetermined time is recognized as a substantially circular shape.

17. The information input/output device according to claim 6,
wherein the information processing unit detects an operation of the medium that operates by a user on the projection panel surface on the basis of state information of the medium, and
after the information processing unit analyzes codes printed on the medium surface to specify the medium, and calculates XY coordinates indicating a location of the medium on the stage surface, and
the information processing unit performs a straight-line-shaped grid scrolling operation of the medium on the projection panel surface, such that traces of the XY coordinate information calculated in a predetermined time is recognized as a substantially straight line shape.

18. The information input/output device according to claim 6,
wherein the information processing unit detects an operation of the medium that operates by a user on the projection panel surface on the basis of state information of the medium, and
after the information processing unit analyzes codes printed on the medium surface to specify the medium, and calculates XY coordinates indicating a location of the medium on the stage surface, and
the information processing unit performs a grid scratching operation of the medium repetitively in a straight line shape on the projection panel surface, such that it is recognized that traces of the XY information calculated in a predetermined time is repeated in a substantially straight line shape.

19. The information input/output device according to claim 6,
wherein the information processing unit detects an operation of the medium that operates by a user on the projection panel surface on the basis of state information of the medium, and
after the information processing unit analyzes codes printed on the medium surface to specify the medium, and calculates XY coordinates indicating a location of the medium on the stage surface, and
the information processing unit performs a grid tilting operation of inclining the medium on the projection panel surface, such that a variation of inclination of the medium with respect to a vertical line of the projection panel in a predetermined time is recognized.

20. The information input/output device according to claim 6,
wherein the information processing unit detects an operation of the medium that operates by a user on the projection panel surface on the basis of state information of the medium, and
after the information processing unit analyzes codes printed on the medium surface to specify the medium, and calculates XY coordinates indicating a location of the medium on the projection panel surface, and
the information processing unit performs a grid turnover operation of turning over a portion of the medium surface on the projection panel surface, such that a variation of an area ratio of the medium surface turned over from the projection panel surface in a predetermined time is recognized.

21. The information input/output device according to claim 19 or 20,
wherein the information processing unit performs the operation of the medium according to claim 19 or 20, such that characters, diagrams, images or moving pictures corresponding to the code information are projected onto a region of the projection panel surface from which the medium surface is turned over, by means of the projection unit.

22. The information input/output device according to claim 19 or 20,
wherein the inclination according to claim 19 or the area ratio according to claim 20 is recognized by brightness of the infrared image obtained by photographing a region where the medium is turned over the stage surface, by means of the imaging unit.

23. The information input/output device according to claim 14,
wherein the operation of the medium is based on the recognition of the number of times or speed of the operation repeated in a predetermined time.

24. The information input/output device according to claim 14,
wherein the operation of the medium is based on a history stored in a storage unit.

25. The information input/output device according to claim 8,
wherein a frame designating a projection region for projecting light by the projection unit or marks designating four corners of the projection region are printed on the infrared ray transmitting sheet by using visible infrared ray transmitting ink, or a removable infrared ray transmitting sheet printed by the ink is attached, and
the information processing unit allows the projection unit to project a frame indicating a projection region or marks indicating four corners of the projection region onto the projection panel, and corrects a visibly designated projection region and a projection region of the projection image to be equal to each other.

26. The information input/output device according to claim 8,
wherein dot marks designating four corners of a region to be photographed by an infrared imaging unit are printed by using an infrared ray absorbing ink or a removable infrared ray transmitting sheet printed with the dot marks using the ink is attached on the infrared ray transmitting sheet, and
the information processing unit recognizes coordinates of the four corners on the basis of the dot marks photographed by the infrared ray imaging unit, determines whether the coordinates are at the same locations as information of four corners of the photographic regions previously stored in a storage unit, and displays the result information and instruction information on the projection panel by the projection unit.

27. The information output device of claim 1, wherein the information dots in a second number of lattice areas are arranged differently than the information dots in the first number of lattice areas are arranged.

28. The information input/output device of claim 6, wherein the information dots in a second number of lattice areas are arranged differently than the information dots in the first number of lattice areas are arranged.

* * * * *